(12) United States Patent
Giobbi

(10) Patent No.: US 11,922,395 B2
(45) Date of Patent: Mar. 5, 2024

(54) LINKED ACCOUNT SYSTEM USING PERSONAL DIGITAL KEY (PDK-LAS)

(71) Applicant: Proxense, LLC, Bend, OR (US)

(72) Inventor: John J. Giobbi, Bend, OR (US)

(73) Assignee: PROXENSE, LLC, Bend, OR (US)

( * ) Notice: Subject to any disclaimer, the term of this patent is extended or adjusted under 35 U.S.C. 154(b) by 0 days.

(21) Appl. No.: 17/578,272

(22) Filed: Jan. 18, 2022

(65) Prior Publication Data

US 2022/0217138 A1 Jul. 7, 2022

Related U.S. Application Data

(63) Continuation of application No. 14/666,268, filed on Mar. 23, 2015, now Pat. No. 11,258,791, which is a continuation of application No. 10/598,735, filed as application No. PCT/US2005/007535 on Mar. 8, 2005, now Pat. No. 9,020,854.

(Continued)

(51) Int. Cl.
| | |
|---|---|
| *G06Q 20/32* | (2012.01) |
| *G06F 21/10* | (2013.01) |
| *H04L 9/40* | (2022.01) |
| *H04W 12/0431* | (2021.01) |
| *H04W 12/06* | (2021.01) |

(52) U.S. Cl.
CPC ......... *G06Q 20/32* (2013.01); *H04L 63/0428* (2013.01); *H04L 63/0853* (2013.01); *H04L 63/0869* (2013.01); *H04W 12/0431* (2021.01); *H04W 12/06* (2013.01); *G06F 21/1014* (2023.08); *G06F 21/109* (2023.08); *G06F 2221/2137* (2013.01); *G06Q 2220/00* (2013.01); *G06Q 2220/10* (2013.01); *G06Q 2220/14* (2013.01); *H04L 2463/101* (2013.01); *H04L 2463/103* (2013.01)

(58) Field of Classification Search
None
See application file for complete search history.

(56) References Cited

U.S. PATENT DOCUMENTS

| | | |
|---|---|---|
| 3,665,313 A | 5/1972 | Trent |
| 3,739,329 A | 6/1973 | Lester |

(Continued)

FOREIGN PATENT DOCUMENTS

| | | |
|---|---|---|
| EP | 1536306 A1 | 6/2005 |
| EP | 2937805 A1 | 10/2015 |

(Continued)

OTHER PUBLICATIONS

C. Serrao, J. Marqes, M. Balestri, P. Kudumakis and T. Baker, "Protecting digital music delivery and consumption using the OCCAMM project framework," Second International Conference on Web Delivering of Music, 2002. WEDELMUSIC 2002. Proceedings., 2002, pp. 38-45, doi: 10.1109/WDM.2002.1176192. (Year: 2002).*

(Continued)

*Primary Examiner* — Jacob C. Coppola
*Assistant Examiner* — Eduardo Castilho
(74) *Attorney, Agent, or Firm* — PATENT LAW WORKS LLP

(57) ABSTRACT

One embodiment of the invention includes a system comprising: a personal digital key and a computer readable medium that is accessible when authenticated by the personal digital key.

20 Claims, 15 Drawing Sheets

Related U.S. Application Data

(60) Provisional application No. 60/551,320, filed on Mar. 8, 2004.

(56) References Cited

U.S. PATENT DOCUMENTS

| | | | |
|---|---|---|---|
| 3,761,883 A | 9/1973 | Alvarez et al. |
| 3,906,166 A | 9/1975 | Cooper et al. |
| 4,101,873 A | 7/1978 | Anderson et al. |
| 4,430,705 A | 2/1984 | Cannavino et al. |
| 4,476,469 A | 10/1984 | Lander |
| 4,598,272 A | 7/1986 | Cox |
| 4,661,821 A | 4/1987 | Smith |
| 4,759,060 A | 7/1988 | Hayashi et al. |
| 4,814,742 A | 3/1989 | Morita et al. |
| 4,871,997 A | 10/1989 | Adriaenssens et al. |
| 4,993,068 A | 2/1991 | Piosenka et al. |
| 5,043,702 A | 8/1991 | Kuo |
| 5,052,049 A | 9/1991 | Andros et al. |
| 5,187,352 A | 2/1993 | Blair et al. |
| 5,224,164 A | 6/1993 | Elsner |
| 5,296,641 A | 3/1994 | Stelzel |
| 5,307,349 A | 4/1994 | Shloss et al. |
| 5,317,572 A | 5/1994 | Satoh |
| 5,325,285 A | 6/1994 | Araki |
| 5,392,287 A | 2/1995 | Tiedemann et al. |
| 5,392,433 A | 2/1995 | Hammersley et al. |
| 5,410,588 A | 4/1995 | Ito |
| 5,416,780 A | 5/1995 | Patel |
| 5,422,632 A | 6/1995 | Bucholtz et al. |
| 5,428,684 A | 6/1995 | Akiyama et al. |
| 5,450,489 A | 9/1995 | Ostrover et al. |
| 5,473,690 A | 12/1995 | Grimonprez et al. |
| 5,481,265 A | 1/1996 | Russell |
| 5,506,863 A | 4/1996 | Meidan et al. |
| 5,517,502 A | 5/1996 | Bestler et al. |
| 5,541,583 A | 7/1996 | Mandelbaum |
| 5,544,321 A | 8/1996 | Theimer et al. |
| 5,552,776 A | 9/1996 | Wade et al. |
| 5,563,947 A | 10/1996 | Kikinis |
| 5,589,838 A | 12/1996 | McEwan |
| 5,594,227 A | 1/1997 | Deo |
| 5,598,474 A | 1/1997 | Johnson |
| 5,611,050 A | 3/1997 | Theimer et al. |
| 5,615,277 A | 3/1997 | Hoffman |
| 5,619,251 A | 4/1997 | Kuroiwa et al. |
| 5,623,552 A | 4/1997 | Lane |
| 5,629,980 A | 5/1997 | Stefik et al. |
| 5,644,354 A | 7/1997 | Thompson et al. |
| 5,666,412 A | 9/1997 | Handelman et al. |
| 5,689,529 A | 11/1997 | Johnson |
| 5,692,049 A | 11/1997 | Johnson et al. |
| 5,719,387 A | 2/1998 | Fujioka |
| 5,729,237 A | 3/1998 | Webb |
| 5,760,705 A | 6/1998 | Glessner et al. |
| 5,760,744 A | 6/1998 | Sauer |
| 5,773,954 A | 6/1998 | Vanhorn |
| 5,784,464 A | 7/1998 | Akiyama et al. |
| 5,799,085 A | 8/1998 | Shona |
| 5,821,854 A | 10/1998 | Dorinski et al. |
| 5,825,876 A | 10/1998 | Peterson, Jr. |
| 5,835,595 A | 11/1998 | Fraser et al. |
| 5,838,306 A | 11/1998 | O'Connor et al. |
| 5,854,891 A | 12/1998 | Postlewaite et al. |
| 5,857,020 A | 1/1999 | Peterson, Jr. |
| 5,886,634 A | 3/1999 | Muhme |
| 5,892,825 A | 4/1999 | Mages et al. |
| 5,892,900 A * | 4/1999 | Ginter ............ G06Q 20/02 |
| | | | 726/26 |
| 5,894,551 A | 4/1999 | Huggins et al. |
| 5,898,880 A | 4/1999 | Ryu |
| 5,910,776 A | 6/1999 | Black |
| 5,917,913 A | 6/1999 | Wang |
| 5,923,757 A | 7/1999 | Hocker et al. |
| 5,928,327 A | 7/1999 | Wang et al. |
| 5,942,985 A | 8/1999 | Chin |
| 5,991,399 A | 11/1999 | Graunke et al. |
| 5,991,749 A | 11/1999 | Morrill, Jr. |
| 6,016,476 A | 1/2000 | Maes et al. |
| 6,018,739 A | 1/2000 | McCoy et al. |
| 6,025,780 A | 2/2000 | Bowers et al. |
| 6,035,038 A | 3/2000 | Campinos et al. |
| 6,035,329 A | 3/2000 | Mages et al. |
| 6,038,334 A | 3/2000 | Hamid |
| 6,038,549 A * | 3/2000 | Davis ............ G06Q 20/40 |
| | | | 713/172 |
| 6,038,666 A | 3/2000 | Hsu et al. |
| 6,040,786 A | 3/2000 | Fujioka |
| 6,041,410 A | 3/2000 | Hsu et al. |
| 6,042,006 A | 3/2000 | Van Tilburg et al. |
| 6,045,039 A | 4/2000 | Stinson et al. |
| 6,055,314 A | 4/2000 | Spies et al. |
| 6,068,184 A | 5/2000 | Barnett |
| 6,069,647 A | 5/2000 | Sullivan et al. |
| 6,070,796 A | 6/2000 | Sirbu |
| 6,076,164 A | 6/2000 | Tanaka et al. |
| 6,088,450 A | 7/2000 | Davis et al. |
| 6,088,730 A | 7/2000 | Kato et al. |
| 6,104,290 A | 8/2000 | Naguleswaran |
| 6,104,334 A | 8/2000 | Allport |
| 6,110,041 A | 8/2000 | Walker et al. |
| 6,121,544 A | 9/2000 | Petsinger |
| 6,134,283 A | 10/2000 | Sands et al. |
| 6,137,480 A | 10/2000 | Shintani |
| 6,138,010 A | 10/2000 | Rabe et al. |
| 6,148,142 A | 11/2000 | Anderson |
| 6,148,210 A | 11/2000 | Elwin et al. |
| 6,161,179 A | 12/2000 | Seidel |
| 6,175,921 B1 * | 1/2001 | Rosen ............ G06Q 20/204 |
| | | | 713/168 |
| 6,177,887 B1 | 1/2001 | Jerome |
| 6,185,316 B1 | 2/2001 | Buffam |
| 6,189,105 B1 | 2/2001 | Lopes |
| 6,209,089 B1 | 3/2001 | Selitrennikoff et al. |
| 6,219,109 B1 | 4/2001 | Raynesford et al. |
| 6,219,439 B1 | 4/2001 | Burger |
| 6,219,553 B1 | 4/2001 | Panasik |
| 6,237,848 B1 | 5/2001 | Everett |
| 6,240,076 B1 | 5/2001 | Kanerva et al. |
| 6,247,130 B1 | 6/2001 | Fritsch |
| 6,249,869 B1 | 6/2001 | Drupsteen et al. |
| 6,256,737 B1 | 7/2001 | Bianco et al. |
| 6,266,415 B1 | 7/2001 | Campinos et al. |
| 6,270,011 B1 | 8/2001 | Gottfried |
| 6,279,111 B1 | 8/2001 | Jensenworth et al. |
| 6,279,146 B1 | 8/2001 | Evans et al. |
| 6,295,057 B1 | 9/2001 | Rosin et al. |
| 6,307,471 B1 | 10/2001 | Xydis |
| 6,325,285 B1 | 12/2001 | Baratelli |
| 6,336,121 B1 | 1/2002 | Lyson et al. |
| 6,336,142 B1 | 1/2002 | Kato et al. |
| 6,343,280 B2 | 1/2002 | Clark |
| 6,345,347 B1 | 2/2002 | Biran |
| 6,363,485 B1 | 3/2002 | Adams et al. |
| 6,367,019 B1 | 4/2002 | Ansell et al. |
| 6,369,693 B1 | 4/2002 | Gibson |
| 6,370,376 B1 | 4/2002 | Sheath |
| 6,381,029 B1 | 4/2002 | Tipirneni |
| 6,381,747 B1 | 4/2002 | Wonfor et al. |
| 6,385,596 B1 * | 5/2002 | Wiser ............ G06Q 20/0855 |
| | | | 369/84 |
| 6,392,664 B1 | 5/2002 | White et al. |
| 6,397,387 B1 | 5/2002 | Rosin et al. |
| 6,401,059 B1 | 6/2002 | Shen et al. |
| 6,411,307 B1 | 6/2002 | Rosin et al. |
| 6,424,249 B1 | 7/2002 | Houvener |
| 6,424,715 B1 | 7/2002 | Saito |
| 6,425,084 B1 | 7/2002 | Rallis et al. |
| 6,434,403 B1 | 8/2002 | Ausems et al. |
| 6,434,535 B1 | 8/2002 | Kupka et al. |
| 6,446,004 B1 | 9/2002 | Cao et al. |
| 6,446,130 B1 | 9/2002 | Grapes |
| 6,456,958 B1 | 9/2002 | Xydis |
| 6,463,534 B1 | 10/2002 | Geiger et al. |

(56) References Cited

U.S. PATENT DOCUMENTS

| | | |
|---|---|---|
| 6,480,101 B1 | 11/2002 | Kelly et al. |
| 6,480,188 B1 | 11/2002 | Horsley |
| 6,484,182 B1 | 11/2002 | Dunphy et al. |
| 6,484,260 B1 | 11/2002 | Scott et al. |
| 6,484,946 B2 | 11/2002 | Matsumoto et al. |
| 6,487,663 B1 | 11/2002 | Jaisimha et al. |
| 6,490,443 B1 | 12/2002 | Freeny, Jr. |
| 6,510,350 B1 | 1/2003 | Steen et al. |
| 6,522,253 B1 | 2/2003 | Saltus |
| 6,523,113 B1 | 2/2003 | Wehrenberg |
| 6,529,949 B1 | 3/2003 | Getsin et al. |
| 6,546,418 B2 | 4/2003 | Schena et al. |
| 6,550,011 B1 | 4/2003 | Sims, III |
| 6,563,465 B2 | 5/2003 | Frecska |
| 6,563,805 B1 | 5/2003 | Ma et al. |
| 6,564,380 B1 | 5/2003 | Murphy |
| 6,577,238 B1 | 6/2003 | Whitesmith et al. |
| 6,593,887 B2 | 7/2003 | Luk et al. |
| 6,597,680 B1 | 7/2003 | Lindskog et al. |
| 6,607,136 B1 | 8/2003 | Atsmon et al. |
| 6,621,528 B1 | 9/2003 | Kessler et al. |
| 6,624,752 B2 | 9/2003 | Klitsgaard et al. |
| 6,628,302 B2 | 9/2003 | White et al. |
| 6,632,992 B2 | 10/2003 | Hasegawa |
| 6,633,981 B1 | 10/2003 | Davis |
| 6,645,077 B2 | 11/2003 | Rowe |
| 6,647,417 B1 | 11/2003 | Hunter et al. |
| 6,657,538 B1 | 12/2003 | Ritter |
| 6,658,566 B1 | 12/2003 | Hazard |
| 6,667,684 B1 | 12/2003 | Waggamon et al. |
| 6,669,096 B1 | 12/2003 | Saphar et al. |
| 6,671,808 B1 | 12/2003 | Abbott et al. |
| 6,683,954 B1 | 1/2004 | Searle |
| 6,697,944 B1 | 2/2004 | Jones et al. |
| 6,709,333 B1 | 3/2004 | Bradford et al. |
| 6,711,464 B1 | 3/2004 | Yap et al. |
| 6,714,168 B2 | 3/2004 | Berenbaum |
| 6,715,246 B1 | 4/2004 | Frecska et al. |
| 6,728,397 B2 | 4/2004 | McNeal |
| 6,737,955 B2 | 5/2004 | Ghabra et al. |
| 6,758,394 B2 | 7/2004 | Maskatiya et al. |
| 6,771,969 B1 | 8/2004 | Chinoy et al. |
| 6,775,655 B1 | 8/2004 | Peinado et al. |
| 6,785,474 B2 | 8/2004 | Hirt et al. |
| 6,788,640 B2 | 9/2004 | Celeste |
| 6,788,924 B1 | 9/2004 | Knutson et al. |
| 6,795,425 B1 | 9/2004 | Raith |
| 6,804,825 B1 | 10/2004 | White et al. |
| 6,806,887 B2 | 10/2004 | Chernock et al. |
| 6,819,219 B1 | 11/2004 | Bolle et al. |
| 6,839,542 B2 | 1/2005 | Sibecas et al. |
| 6,850,147 B2 | 2/2005 | Prokoski et al. |
| 6,853,988 B1 | 2/2005 | Dickinson et al. |
| 6,859,812 B1 | 2/2005 | Poynor |
| 6,861,980 B1 | 3/2005 | Rowitch et al. |
| 6,871,063 B1 | 3/2005 | Schiffer |
| 6,873,975 B1 | 3/2005 | Hatakeyama et al. |
| 6,879,567 B2 | 4/2005 | Callaway et al. |
| 6,879,966 B1 | 4/2005 | Lapsley et al. |
| 6,886,741 B1 | 5/2005 | Salveson |
| 6,889,067 B2 | 5/2005 | Willey |
| 6,891,822 B1 | 5/2005 | Gubbi et al. |
| 6,892,307 B1 | 5/2005 | Wood et al. |
| 6,930,643 B2 | 8/2005 | Byrne et al. |
| 6,947,003 B2 | 9/2005 | Huor |
| 6,950,941 B1 | 9/2005 | Lee et al. |
| 6,957,086 B2 | 10/2005 | Bahl et al. |
| 6,961,858 B2 | 11/2005 | Fransdonk |
| 6,963,270 B1 | 11/2005 | Gallagher et al. |
| 6,963,971 B1 | 11/2005 | Bush et al. |
| 6,973,576 B2 | 12/2005 | Giobbi |
| 6,975,202 B1 | 12/2005 | Rodriguez et al. |
| 6,980,087 B2 | 12/2005 | Zukowski |
| 6,983,882 B2 | 1/2006 | Cassone |
| 6,999,032 B2 | 2/2006 | Pakray et al. |
| 7,012,503 B2 | 3/2006 | Nielsen |
| 7,020,635 B2 | 3/2006 | Hamilton et al. |
| 7,031,945 B1 | 4/2006 | Donner |
| 7,049,963 B2 | 5/2006 | Waterhouse et al. |
| 7,055,171 B1 | 5/2006 | Martin et al. |
| 7,058,806 B2 | 6/2006 | Smeets et al. |
| 7,061,380 B2 | 6/2006 | Orlando et al. |
| 7,068,623 B1 | 6/2006 | Barany et al. |
| 7,072,900 B2 | 7/2006 | Sweitzer et al. |
| 7,079,079 B2 | 7/2006 | Jo et al. |
| 7,080,049 B2 | 7/2006 | Truitt et al. |
| 7,082,415 B1 | 7/2006 | Robinson et al. |
| 7,090,126 B2 | 8/2006 | Kelly et al. |
| 7,090,128 B2 | 8/2006 | Farley et al. |
| 7,100,053 B1 | 8/2006 | Brown et al. |
| 7,107,455 B1 | 9/2006 | Merkin |
| 7,107,462 B2 | 9/2006 | Fransdonk |
| 7,111,789 B2 | 9/2006 | Rajasekaran et al. |
| 7,112,138 B2 | 9/2006 | Hedrick et al. |
| 7,119,659 B2 | 10/2006 | Bonalle et al. |
| 7,123,149 B2 | 10/2006 | Nowak et al. |
| 7,130,668 B2 | 10/2006 | Chang et al. |
| 7,131,139 B1 | 10/2006 | Meier |
| 7,137,008 B1 | 11/2006 | Hamid et al. |
| 7,137,012 B1 | 11/2006 | Kamibayashi et al. |
| 7,139,914 B2 | 11/2006 | Arnouse |
| 7,150,045 B2 | 12/2006 | Koelle et al. |
| 7,155,416 B2 | 12/2006 | Shatford |
| 7,159,114 B1 | 1/2007 | Zajkowski et al. |
| 7,159,765 B2 | 1/2007 | Frerking |
| 7,167,987 B2 | 1/2007 | Angelo |
| 7,168,089 B2 | 1/2007 | Nguyen et al. |
| 7,176,797 B2 | 2/2007 | Zai et al. |
| 7,185,363 B1 | 2/2007 | Narin et al. |
| 7,188,110 B1 | 3/2007 | Ludtke et al. |
| 7,191,466 B1 | 3/2007 | Hamid et al. |
| 7,194,438 B2 | 3/2007 | Sovio et al. |
| 7,209,955 B1 | 4/2007 | Major et al. |
| 7,218,944 B2 | 5/2007 | Cromer et al. |
| 7,225,161 B2 | 5/2007 | Lam et al. |
| 7,230,908 B2 | 6/2007 | Vanderaar et al. |
| 7,231,068 B2 | 6/2007 | Tibor |
| 7,231,451 B2 | 6/2007 | Law et al. |
| 7,239,226 B2 | 7/2007 | Berardi et al. |
| 7,239,241 B2 | 7/2007 | Claudatos et al. |
| 7,242,923 B2 | 7/2007 | Perera et al. |
| 7,245,221 B2 | 7/2007 | Claudatos et al. |
| 7,249,177 B1 | 7/2007 | Miller |
| 7,272,723 B1 | 9/2007 | Abbott et al. |
| 7,277,737 B1 | 10/2007 | Vollmer et al. |
| 7,278,025 B2 | 10/2007 | Saito et al. |
| 7,283,650 B1 | 10/2007 | Sharma et al. |
| 7,295,106 B1 | 11/2007 | Jackson et al. |
| 7,295,119 B2 | 11/2007 | Rappaport et al. |
| 7,305,560 B2 | 12/2007 | Giobbi |
| 7,310,042 B2 | 12/2007 | Seifert |
| 7,314,164 B2 | 1/2008 | Bonalle et al. |
| 7,317,799 B2 | 1/2008 | Hammersmith et al. |
| 7,319,395 B2 | 1/2008 | Puzio et al. |
| 7,330,108 B2 | 2/2008 | Thomas |
| 7,333,002 B2 | 2/2008 | Bixler et al. |
| 7,333,615 B1 | 2/2008 | Jarboe et al. |
| 7,336,181 B2 | 2/2008 | Nowak et al. |
| 7,336,182 B1 | 2/2008 | Baranowski et al. |
| 7,337,326 B2 | 2/2008 | Palmer et al. |
| 7,341,181 B2 | 3/2008 | Bonalle et al. |
| 7,342,503 B1 | 3/2008 | Light et al. |
| 7,349,557 B2 | 3/2008 | Tibor |
| 7,356,393 B1 | 4/2008 | Schlatre et al. |
| 7,356,706 B2 | 4/2008 | Scheurich |
| 7,361,919 B2 | 4/2008 | Setlak |
| 7,363,494 B2 | 4/2008 | Brainard et al. |
| 7,370,366 B2 | 5/2008 | Lacan et al. |
| 7,378,939 B2 | 5/2008 | Sengupta et al. |
| 7,380,202 B1 | 5/2008 | Lindhorst et al. |
| 7,382,799 B1 | 6/2008 | Young et al. |
| 7,387,235 B2 | 6/2008 | Gilbert et al. |
| 7,401,731 B1 | 7/2008 | Pletz et al. |
| 7,404,088 B2 | 7/2008 | Giobbi |

(56) References Cited

U.S. PATENT DOCUMENTS

| | | |
|---|---|---|
| 7,408,799 B1 | 8/2008 | Kang |
| 7,424,134 B2 | 9/2008 | Chou |
| 7,437,330 B1 | 10/2008 | Robinson et al. |
| 7,447,911 B2 | 11/2008 | Chou et al. |
| 7,448,087 B2 | 11/2008 | Ohmori et al. |
| 7,458,510 B1 | 12/2008 | Zhou |
| 7,460,836 B2 | 12/2008 | Smith et al. |
| 7,461,444 B2 | 12/2008 | Deaett et al. |
| 7,464,053 B1 | 12/2008 | Pylant |
| 7,464,059 B1 | 12/2008 | Robinson et al. |
| 7,466,232 B2 | 12/2008 | Neuwirth |
| 7,472,280 B2 | 12/2008 | Giobbi |
| 7,477,285 B1 | 1/2009 | Johnson |
| 7,512,806 B2 | 3/2009 | Lemke |
| 7,525,413 B2 | 4/2009 | Jung et al. |
| 7,529,944 B2 | 5/2009 | Hamid |
| 7,533,809 B1 | 5/2009 | Robinson et al. |
| 7,545,312 B2 | 6/2009 | Kiang et al. |
| 7,565,329 B2 | 7/2009 | Lapsley et al. |
| 7,573,382 B2 | 8/2009 | Choubey et al. |
| 7,573,841 B2 | 8/2009 | Lee et al. |
| 7,574,734 B2 | 8/2009 | Fedronic et al. |
| 7,578,442 B2 | 8/2009 | Knowles et al. |
| 7,583,238 B2 | 9/2009 | Cassen et al. |
| 7,583,643 B2 | 9/2009 | Smith et al. |
| 7,587,502 B2 | 9/2009 | Crawford et al. |
| 7,587,611 B2 | 9/2009 | Johnson et al. |
| 7,594,611 B1 | 9/2009 | Arrington, III |
| 7,595,765 B1 | 9/2009 | Hirsch et al. |
| 7,603,564 B2 | 10/2009 | Adachi |
| 7,606,733 B2 | 10/2009 | Shmueli et al. |
| 7,617,523 B2 | 11/2009 | Das et al. |
| 7,620,184 B2 | 11/2009 | Marque Pucheu |
| 7,624,073 B1 | 11/2009 | Robinson et al. |
| 7,624,417 B2 | 11/2009 | Dua |
| 7,640,273 B2 | 12/2009 | Wallmeier et al. |
| 7,644,043 B2 | 1/2010 | Minowa |
| 7,644,443 B2 | 1/2010 | Matsuyama et al. |
| 7,646,307 B2 | 1/2010 | Plocher et al. |
| 7,652,892 B2 | 1/2010 | Shiu et al. |
| 7,653,883 B2 | 1/2010 | Hotelling et al. |
| 7,676,380 B2 | 3/2010 | Graves et al. |
| 7,689,005 B2 | 3/2010 | Wang et al. |
| 7,701,858 B2 | 4/2010 | Werb et al. |
| 7,706,896 B2 | 4/2010 | Music et al. |
| 7,711,152 B1 | 5/2010 | Davida et al. |
| 7,711,586 B2 | 5/2010 | Aggarwal et al. |
| 7,715,593 B1 | 5/2010 | Adams et al. |
| 7,724,713 B2 | 5/2010 | Del Prado Pavon et al. |
| 7,724,717 B2 | 5/2010 | Porras et al. |
| 7,724,720 B2 | 5/2010 | Korpela et al. |
| 7,764,236 B2 | 7/2010 | Hill et al. |
| 7,765,164 B1 | 7/2010 | Robinson et al. |
| 7,765,181 B2 | 7/2010 | Thomas et al. |
| 7,768,960 B1 | 8/2010 | Barratt |
| 7,773,754 B2 | 8/2010 | Buer et al. |
| 7,774,613 B2 | 8/2010 | Lemke |
| 7,780,082 B2 | 8/2010 | Handa et al. |
| 7,796,551 B1 | 9/2010 | Machiraju et al. |
| 7,813,822 B1 | 10/2010 | Hoffberg |
| 7,865,448 B2 | 1/2011 | Pizarro |
| 7,865,937 B1 | 1/2011 | White et al. |
| 7,883,003 B2 | 2/2011 | Giobbi et al. |
| 7,883,417 B2 | 2/2011 | Bruzzese et al. |
| 7,904,718 B2 | 3/2011 | Giobbi et al. |
| 7,943,868 B2 | 5/2011 | Anders et al. |
| 7,957,536 B2 | 6/2011 | Nolte |
| 7,961,078 B1 | 6/2011 | Reynolds et al. |
| 7,984,064 B2 | 7/2011 | Fusari |
| 7,996,514 B2 | 8/2011 | Baumert et al. |
| 8,026,821 B2 | 9/2011 | Reeder et al. |
| 8,036,152 B2 | 10/2011 | Brown et al. |
| 8,049,594 B1 | 11/2011 | Baranowski |
| 8,077,041 B2 | 12/2011 | Stern et al. |
| 8,081,215 B2 | 12/2011 | Kuo et al. |
| 8,082,160 B2 | 12/2011 | Collins et al. |
| 8,089,354 B2 | 1/2012 | Perkins |
| 8,112,066 B2 | 2/2012 | Ben Ayed |
| 8,117,125 B1 | 2/2012 | Kawan et al. |
| 8,125,624 B2 | 2/2012 | Jones et al. |
| 8,135,624 B1 | 3/2012 | Ramalingam et al. |
| 8,171,528 B1 | 5/2012 | Brown |
| 8,193,923 B2 | 6/2012 | Rork et al. |
| 8,200,980 B1 | 6/2012 | Robinson et al. |
| 8,215,552 B1 | 7/2012 | Rambadt |
| 8,219,129 B2 | 7/2012 | Brown et al. |
| 8,248,263 B2 | 8/2012 | Shervey et al. |
| 8,258,942 B1 | 9/2012 | Anzone et al. |
| 8,294,554 B2 | 10/2012 | Shoarinejad et al. |
| 8,296,573 B2 | 10/2012 | Bolle et al. |
| 8,307,414 B2 | 11/2012 | Zerfos et al. |
| 8,325,011 B2 | 12/2012 | Butler et al. |
| 8,327,151 B2 | 12/2012 | Awatsu et al. |
| 8,340,672 B2 | 12/2012 | Brown et al. |
| 8,352,730 B2 | 1/2013 | Giobbi |
| 8,373,562 B1 | 2/2013 | Heinze et al. |
| 8,387,124 B2 | 2/2013 | Smetters et al. |
| 8,390,456 B2 | 3/2013 | Puleston et al. |
| 8,395,484 B2 | 3/2013 | Fullerton |
| 8,410,906 B1 | 4/2013 | Dacus et al. |
| 8,412,949 B2 | 4/2013 | Giobbi et al. |
| 8,421,606 B2 | 4/2013 | Collins et al. |
| 8,424,079 B2 | 4/2013 | Adams et al. |
| 8,432,262 B2 | 4/2013 | Talty et al. |
| 8,433,919 B2 | 4/2013 | Giobbi et al. |
| 8,448,858 B1 | 5/2013 | Kundu et al. |
| 8,457,672 B2 | 6/2013 | Brown et al. |
| 8,467,969 B2 | 6/2013 | Nielsen et al. |
| 8,473,748 B2 | 6/2013 | Sampas |
| 8,484,696 B2 | 7/2013 | Gatto et al. |
| 8,494,576 B1 | 7/2013 | Bye et al. |
| 8,508,336 B2 | 8/2013 | Giobbi et al. |
| 8,511,555 B2 | 8/2013 | Babcock et al. |
| 8,519,823 B2 | 8/2013 | Rinkes |
| 8,522,019 B2 | 8/2013 | Michaelis |
| 8,558,699 B2 | 10/2013 | Butler et al. |
| 8,572,391 B2 | 10/2013 | Golan et al. |
| 8,577,091 B2 | 11/2013 | Ivanov et al. |
| 8,600,674 B1 | 12/2013 | Barbeau et al. |
| 8,646,042 B1 | 2/2014 | Brown |
| 8,659,427 B2 | 2/2014 | Brown et al. |
| 8,678,273 B2 | 3/2014 | McNeal |
| 8,717,346 B2 | 5/2014 | Claessen |
| 8,738,925 B1 | 5/2014 | Park et al. |
| 8,799,574 B2 | 8/2014 | Corda |
| 8,838,993 B2 | 9/2014 | Giobbi et al. |
| 8,856,539 B2 | 10/2014 | Weiss |
| 8,857,716 B1 | 10/2014 | Giobbi et al. |
| 8,886,954 B1 | 11/2014 | Giobbi |
| 8,907,861 B2 | 12/2014 | Hirt |
| 8,914,477 B2 | 12/2014 | Gammon |
| 8,918,854 B1 | 12/2014 | Giobbi |
| 8,931,698 B2 | 1/2015 | Ishikawa et al. |
| 8,979,646 B2 | 3/2015 | Moser et al. |
| 9,020,854 B2 | 4/2015 | Giobbi |
| 9,037,140 B1 | 5/2015 | Brown |
| 9,042,819 B2 | 5/2015 | Dua |
| 9,049,188 B1 | 6/2015 | Brown |
| 9,113,464 B2 | 8/2015 | Brown et al. |
| 9,165,233 B2 | 10/2015 | Testanero |
| 9,189,788 B1 | 11/2015 | Robinson et al. |
| 9,230,399 B2 | 1/2016 | Yacenda |
| 9,235,700 B1 | 1/2016 | Brown |
| 9,251,326 B2 | 2/2016 | Giobbi et al. |
| 9,251,332 B2 | 2/2016 | Giobbi |
| 9,265,043 B2 | 2/2016 | Brown et al. |
| 9,265,450 B2 | 2/2016 | Giobbi |
| 9,269,221 B2 | 2/2016 | Brown et al. |
| 9,276,914 B2 | 3/2016 | Woodward et al. |
| 9,298,905 B1 | 3/2016 | Giobbi |
| 9,305,312 B2 | 4/2016 | Kountotsis et al. |
| 9,322,974 B1 | 4/2016 | Giobbi |
| 9,405,898 B2 | 8/2016 | Giobbi |
| 9,418,205 B2 | 8/2016 | Giobbi |

(56) References Cited

U.S. PATENT DOCUMENTS

| | | |
|---|---|---|
| 9,430,624 B1 | 8/2016 | Mortensen et al. |
| 9,450,956 B1 | 9/2016 | Giobbi |
| 9,542,542 B2 | 1/2017 | Giobbi et al. |
| 9,613,483 B2 | 4/2017 | Giobbi |
| 9,679,289 B1 | 6/2017 | Brown |
| 9,728,080 B1 | 8/2017 | Giobbi et al. |
| 9,807,091 B2 | 10/2017 | Giobbi |
| 9,830,504 B2 | 11/2017 | Masood et al. |
| 9,892,250 B2 | 2/2018 | Giobbi |
| 9,898,662 B2 | 2/2018 | Tsuda et al. |
| 9,904,816 B1 | 2/2018 | Giobbi et al. |
| 9,990,628 B2 | 6/2018 | Giobbi |
| 10,026,253 B2 | 7/2018 | Giobbi |
| 10,073,960 B1 | 9/2018 | Brown |
| 10,110,385 B1 | 10/2018 | Rush et al. |
| 10,171,460 B2 | 1/2019 | Giobbi |
| 10,217,339 B1 | 2/2019 | Giobbi |
| 10,229,294 B1 | 3/2019 | Giobbi et al. |
| 10,313,336 B2 | 6/2019 | Giobbi |
| 10,334,541 B1 | 6/2019 | Brown |
| 10,362,483 B2 | 7/2019 | Frusina |
| 10,374,795 B1 | 8/2019 | Giobbi et al. |
| 10,383,112 B2 | 8/2019 | Brown et al. |
| 10,403,128 B2 | 9/2019 | Giobbi et al. |
| 10,437,976 B2 | 10/2019 | Giobbi |
| 10,455,533 B2 | 10/2019 | Brown |
| 10,469,456 B1 | 11/2019 | Giobbi |
| 10,567,965 B2 | 2/2020 | Boettcher et al. |
| 10,698,989 B2 | 6/2020 | Giobbi |
| 10,764,044 B1 | 9/2020 | Giobbi et al. |
| 10,769,939 B2 | 9/2020 | Brown et al. |
| 10,817,964 B2 | 10/2020 | Guillama et al. |
| 10,909,229 B2 | 2/2021 | Giobbi |
| 10,943,471 B1 | 3/2021 | Giobbi et al. |
| 11,086,979 B1 | 8/2021 | Giobbi |
| 11,212,797 B2 | 12/2021 | Brown et al. |
| 11,219,022 B2 | 1/2022 | Brown et al. |
| 11,562,644 B2 | 1/2023 | Brown et al. |
| 2001/0000535 A1 | 4/2001 | Lapsley et al. |
| 2001/0021950 A1 | 9/2001 | Hawley et al. |
| 2001/0024428 A1 | 9/2001 | Onouchi |
| 2001/0026619 A1 | 10/2001 | Howard et al. |
| 2001/0027121 A1 | 10/2001 | Boesen |
| 2001/0027439 A1 | 10/2001 | Holtzman et al. |
| 2001/0044337 A1 | 11/2001 | Rowe et al. |
| 2002/0004783 A1 | 1/2002 | Paltenghe et al. |
| 2002/0007456 A1 | 1/2002 | Peinado et al. |
| 2002/0010679 A1 | 1/2002 | Felsher |
| 2002/0013772 A1 | 1/2002 | Peinado |
| 2002/0014954 A1 | 2/2002 | Fitzgibbon et al. |
| 2002/0015008 A1 | 2/2002 | Kishida et al. |
| 2002/0015494 A1 | 2/2002 | Nagai et al. |
| 2002/0019811 A1 | 2/2002 | Lapsley et al. |
| 2002/0022455 A1 | 2/2002 | Salokannel et al. |
| 2002/0023032 A1 | 2/2002 | Pearson et al. |
| 2002/0023217 A1 | 2/2002 | Wheeler et al. |
| 2002/0026424 A1 | 2/2002 | Akashi |
| 2002/0037732 A1 | 3/2002 | Gous et al. |
| 2002/0052193 A1 | 5/2002 | Chetty |
| 2002/0055908 A1 | 5/2002 | Di Giorgio et al. |
| 2002/0056043 A1 | 5/2002 | Glass |
| 2002/0059114 A1 | 5/2002 | Cockrill et al. |
| 2002/0062249 A1 | 5/2002 | Iannacci |
| 2002/0065778 A1* | 5/2002 | Bouet ............... G06Q 20/123 380/204 |
| 2002/0068605 A1 | 6/2002 | Stanley |
| 2002/0069364 A1 | 6/2002 | Dosch |
| 2002/0071559 A1 | 6/2002 | Christensen et al. |
| 2002/0073042 A1 | 6/2002 | Maritzen et al. |
| 2002/0076051 A1* | 6/2002 | Nii .................. G06Q 20/367 380/232 |
| 2002/0080969 A1 | 6/2002 | Giobbi |
| 2002/0083178 A1 | 6/2002 | Brothers |
| 2002/0083318 A1 | 6/2002 | Larose |
| 2002/0086690 A1 | 7/2002 | Takahashi et al. |
| 2002/0089890 A1 | 7/2002 | Fibranz et al. |
| 2002/0091646 A1 | 7/2002 | Lake et al. |
| 2002/0095586 A1 | 7/2002 | Doyle et al. |
| 2002/0095587 A1 | 7/2002 | Doyle et al. |
| 2002/0097876 A1 | 7/2002 | Harrison |
| 2002/0098888 A1 | 7/2002 | Rowe et al. |
| 2002/0100798 A1 | 8/2002 | Farrugia et al. |
| 2002/0103027 A1 | 8/2002 | Rowe et al. |
| 2002/0103881 A1 | 8/2002 | Granade et al. |
| 2002/0104006 A1 | 8/2002 | Boate et al. |
| 2002/0104019 A1 | 8/2002 | Chatani et al. |
| 2002/0105918 A1 | 8/2002 | Yamada et al. |
| 2002/0108049 A1 | 8/2002 | Xu et al. |
| 2002/0109580 A1 | 8/2002 | Shreve et al. |
| 2002/0111919 A1 | 8/2002 | Weller et al. |
| 2002/0112183 A1 | 8/2002 | Baird et al. |
| 2002/0116615 A1 | 8/2002 | Nguyen et al. |
| 2002/0124251 A1 | 9/2002 | Hunter et al. |
| 2002/0128017 A1 | 9/2002 | Virtanen |
| 2002/0128057 A1 | 9/2002 | Walker et al. |
| 2002/0129262 A1 | 9/2002 | Kutaragi et al. |
| 2002/0138438 A1 | 9/2002 | Bardwell |
| 2002/0138445 A1* | 9/2002 | Laage .................. G06Q 20/382 705/67 |
| 2002/0138767 A1 | 9/2002 | Hamid et al. |
| 2002/0140542 A1 | 10/2002 | Prokoski et al. |
| 2002/0141586 A1 | 10/2002 | Margalit et al. |
| 2002/0143623 A1 | 10/2002 | Dayley |
| 2002/0143655 A1 | 10/2002 | Elston et al. |
| 2002/0144116 A1 | 10/2002 | Giobbi |
| 2002/0144117 A1 | 10/2002 | Faigle |
| 2002/0147653 A1 | 10/2002 | Shmueli et al. |
| 2002/0148892 A1 | 10/2002 | Bardwell |
| 2002/0150282 A1 | 10/2002 | Kinsella |
| 2002/0152391 A1 | 10/2002 | Willins et al. |
| 2002/0153996 A1 | 10/2002 | Chan et al. |
| 2002/0158121 A1 | 10/2002 | Stanford-Clark |
| 2002/0158750 A1 | 10/2002 | Almalik |
| 2002/0158765 A1 | 10/2002 | Pape et al. |
| 2002/0160820 A1 | 10/2002 | Winkler |
| 2002/0174348 A1 | 11/2002 | Ting |
| 2002/0177460 A1 | 11/2002 | Beasley et al. |
| 2002/0178063 A1 | 11/2002 | Gravelle et al. |
| 2002/0184208 A1 | 12/2002 | Kato |
| 2002/0187746 A1 | 12/2002 | Cheng et al. |
| 2002/0191816 A1 | 12/2002 | Maritzen et al. |
| 2002/0196963 A1 | 12/2002 | Bardwell |
| 2002/0199120 A1 | 12/2002 | Schmidt |
| 2003/0001016 A1* | 1/2003 | Fraier .............. G06Q 20/1235 235/462.03 |
| 2003/0022701 A1 | 1/2003 | Gupta |
| 2003/0024975 A1* | 2/2003 | Rajasekharan ..... G06F 16/9554 235/375 |
| 2003/0034877 A1 | 2/2003 | Miller et al. |
| 2003/0036416 A1 | 2/2003 | Pattabiraman et al. |
| 2003/0036425 A1 | 2/2003 | Kaminkow et al. |
| 2003/0046228 A1 | 3/2003 | Berney |
| 2003/0046237 A1 | 3/2003 | Uberti |
| 2003/0046552 A1 | 3/2003 | Hamid |
| 2003/0048174 A1 | 3/2003 | Stevens et al. |
| 2003/0051173 A1 | 3/2003 | Krueger |
| 2003/0054868 A1 | 3/2003 | Paulsen et al. |
| 2003/0054881 A1 | 3/2003 | Hedrick et al. |
| 2003/0055689 A1 | 3/2003 | Block et al. |
| 2003/0055792 A1 | 3/2003 | Kinoshita et al. |
| 2003/0061172 A1 | 3/2003 | Robinson |
| 2003/0063619 A1 | 4/2003 | Montano et al. |
| 2003/0079133 A1 | 4/2003 | Breiter et al. |
| 2003/0087601 A1 | 5/2003 | Agam et al. |
| 2003/0088441 A1 | 5/2003 | McNerney |
| 2003/0105719 A1 | 6/2003 | Berger et al. |
| 2003/0109274 A1 | 6/2003 | Budka et al. |
| 2003/0115351 A1 | 6/2003 | Giobbi |
| 2003/0115474 A1 | 6/2003 | Khan et al. |
| 2003/0117969 A1 | 6/2003 | Koo et al. |
| 2003/0117980 A1 | 6/2003 | Kim et al. |
| 2003/0120934 A1 | 6/2003 | Ortiz |
| 2003/0127511 A1 | 7/2003 | Kelly et al. |
| 2003/0128866 A1 | 7/2003 | McNeal |

(56) References Cited

U.S. PATENT DOCUMENTS

| | | |
|---|---|---|
| 2003/0137404 A1 | 7/2003 | Bonneau et al. |
| 2003/0139190 A1 | 7/2003 | Steelberg et al. |
| 2003/0142041 A1 | 7/2003 | Barlow et al. |
| 2003/0146835 A1 | 8/2003 | Carter |
| 2003/0149744 A1 | 8/2003 | Bierre et al. |
| 2003/0156742 A1 | 8/2003 | Witt et al. |
| 2003/0159040 A1 | 8/2003 | Hashimoto et al. |
| 2003/0163388 A1 | 8/2003 | Beane |
| 2003/0167207 A1 | 9/2003 | Berardi et al. |
| 2003/0169697 A1 | 9/2003 | Suzuki et al. |
| 2003/0172028 A1 | 9/2003 | Abell et al. |
| 2003/0172037 A1 | 9/2003 | Jung et al. |
| 2003/0174839 A1 | 9/2003 | Yamagata et al. |
| 2003/0176218 A1 | 9/2003 | Lemay et al. |
| 2003/0177102 A1 | 9/2003 | Robinson |
| 2003/0186739 A1 | 10/2003 | Paulsen et al. |
| 2003/0187787 A1* | 10/2003 | Freund ................... G06Q 20/10 705/40 |
| 2003/0195842 A1 | 10/2003 | Reece |
| 2003/0196084 A1 | 10/2003 | Okereke et al. |
| 2003/0199267 A1 | 10/2003 | Iwasa et al. |
| 2003/0204526 A1 | 10/2003 | Salehi-Had |
| 2003/0204721 A1* | 10/2003 | Barrus ................. H04L 63/0428 713/153 |
| 2003/0213840 A1 | 11/2003 | Livingston et al. |
| 2003/0223394 A1 | 12/2003 | Parantainen et al. |
| 2003/0225703 A1 | 12/2003 | Angel |
| 2003/0226031 A1 | 12/2003 | Proudler et al. |
| 2003/0233458 A1 | 12/2003 | Kwon et al. |
| 2004/0002347 A1 | 1/2004 | Hoctor et al. |
| 2004/0015403 A1 | 1/2004 | Moskowitz et al. |
| 2004/0021552 A1 | 2/2004 | Koo |
| 2004/0022384 A1 | 2/2004 | Flores et al. |
| 2004/0029620 A1 | 2/2004 | Karaoguz |
| 2004/0029635 A1 | 2/2004 | Giobbi |
| 2004/0030764 A1 | 2/2004 | Birk et al. |
| 2004/0030894 A1 | 2/2004 | Labrou et al. |
| 2004/0035644 A1 | 2/2004 | Ford et al. |
| 2004/0039909 A1 | 2/2004 | Cheng |
| 2004/0044627 A1 | 3/2004 | Russell et al. |
| 2004/0048570 A1 | 3/2004 | Oba et al. |
| 2004/0048609 A1 | 3/2004 | Kosaka |
| 2004/0059682 A1 | 3/2004 | Hasumi et al. |
| 2004/0059912 A1 | 3/2004 | Zizzi |
| 2004/0064728 A1 | 4/2004 | Scheurich |
| 2004/0068656 A1 | 4/2004 | Lu |
| 2004/0073792 A1* | 4/2004 | Noble .................... G06F 21/35 713/168 |
| 2004/0081127 A1 | 4/2004 | Gardner et al. |
| 2004/0082385 A1 | 4/2004 | Silva et al. |
| 2004/0088558 A1* | 5/2004 | Candelore .......... H04N 21/4623 713/193 |
| 2004/0090345 A1 | 5/2004 | Hitt |
| 2004/0098597 A1 | 5/2004 | Giobbi |
| 2004/0103064 A1 | 5/2004 | Howard et al. |
| 2004/0107169 A1 | 6/2004 | Lowe |
| 2004/0114563 A1 | 6/2004 | Shvodian |
| 2004/0117644 A1 | 6/2004 | Colvin |
| 2004/0123106 A1 | 6/2004 | D'Angelo et al. |
| 2004/0123127 A1 | 6/2004 | Teicher et al. |
| 2004/0127277 A1 | 7/2004 | Walker et al. |
| 2004/0128162 A1 | 7/2004 | Schlotterbeck et al. |
| 2004/0128389 A1 | 7/2004 | Kopchik |
| 2004/0128500 A1 | 7/2004 | Cihula et al. |
| 2004/0128508 A1 | 7/2004 | Wheeler et al. |
| 2004/0128519 A1 | 7/2004 | Klinger et al. |
| 2004/0129787 A1 | 7/2004 | Saito et al. |
| 2004/0132432 A1 | 7/2004 | Moores et al. |
| 2004/0137912 A1 | 7/2004 | Lin |
| 2004/0153649 A1 | 8/2004 | Rhoads et al. |
| 2004/0158746 A1 | 8/2004 | Hu et al. |
| 2004/0166875 A1 | 8/2004 | Jenkins et al. |
| 2004/0167465 A1 | 8/2004 | Mihai et al. |
| 2004/0181695 A1 | 9/2004 | Walker |
| 2004/0193925 A1 | 9/2004 | Safriel |
| 2004/0194133 A1 | 9/2004 | Ikeda et al. |
| 2004/0201755 A1 | 10/2004 | Norskog |
| 2004/0203566 A1 | 10/2004 | Leung |
| 2004/0203885 A1 | 10/2004 | Quaid |
| 2004/0203923 A1 | 10/2004 | Mullen |
| 2004/0208139 A1 | 10/2004 | Iwamura |
| 2004/0209690 A1 | 10/2004 | Bruzzese et al. |
| 2004/0209692 A1 | 10/2004 | Schober et al. |
| 2004/0214582 A1 | 10/2004 | Lan et al. |
| 2004/0215615 A1 | 10/2004 | Larsson et al. |
| 2004/0217859 A1 | 11/2004 | Pucci et al. |
| 2004/0218581 A1 | 11/2004 | Cattaneo |
| 2004/0222877 A1 | 11/2004 | Teramura et al. |
| 2004/0230488 A1 | 11/2004 | Beenau et al. |
| 2004/0230809 A1 | 11/2004 | Lowensohn et al. |
| 2004/0234117 A1 | 11/2004 | Tibor |
| 2004/0243519 A1 | 12/2004 | Perttila et al. |
| 2004/0246103 A1 | 12/2004 | Zukowski |
| 2004/0246950 A1 | 12/2004 | Parker et al. |
| 2004/0250074 A1 | 12/2004 | Kilian-Kehr |
| 2004/0252012 A1 | 12/2004 | Beenau et al. |
| 2004/0252659 A1 | 12/2004 | Yun et al. |
| 2004/0253996 A1 | 12/2004 | Chen et al. |
| 2004/0254837 A1 | 12/2004 | Roshkoff |
| 2004/0255139 A1 | 12/2004 | Giobbi |
| 2004/0255145 A1 | 12/2004 | Chow |
| 2005/0001028 A1 | 1/2005 | Zuili |
| 2005/0001720 A1 | 1/2005 | Mason et al. |
| 2005/0002028 A1 | 1/2005 | Kasapi et al. |
| 2005/0005136 A1 | 1/2005 | Chen et al. |
| 2005/0006452 A1 | 1/2005 | Aupperle et al. |
| 2005/0009517 A1 | 1/2005 | Maes |
| 2005/0020322 A1 | 1/2005 | Ruuska et al. |
| 2005/0021369 A1 | 1/2005 | Cohen et al. |
| 2005/0021561 A1 | 1/2005 | Noonan |
| 2005/0025093 A1 | 2/2005 | Yun et al. |
| 2005/0028168 A1 | 2/2005 | Marcjan |
| 2005/0035897 A1 | 2/2005 | Perl et al. |
| 2005/0039027 A1 | 2/2005 | Shapiro |
| 2005/0040961 A1 | 2/2005 | Tuttle |
| 2005/0040968 A1 | 2/2005 | Damarla et al. |
| 2005/0044372 A1 | 2/2005 | Aull et al. |
| 2005/0044387 A1 | 2/2005 | Ozolins |
| 2005/0047386 A1 | 3/2005 | Yi |
| 2005/0049013 A1 | 3/2005 | Chang et al. |
| 2005/0050208 A1 | 3/2005 | Chatani |
| 2005/0050324 A1 | 3/2005 | Corbett et al. |
| 2005/0054431 A1 | 3/2005 | Walker et al. |
| 2005/0055242 A1 | 3/2005 | Bello et al. |
| 2005/0055244 A1 | 3/2005 | Mullan et al. |
| 2005/0058292 A1 | 3/2005 | Diorio et al. |
| 2005/0074126 A1 | 4/2005 | Stanko |
| 2005/0076242 A1 | 4/2005 | Breuer |
| 2005/0081040 A1 | 4/2005 | Johnson et al. |
| 2005/0084137 A1 | 4/2005 | Kim et al. |
| 2005/0086115 A1 | 4/2005 | Pearson |
| 2005/0086501 A1* | 4/2005 | Woo ...................... G06F 21/10 713/189 |
| 2005/0086515 A1 | 4/2005 | Paris |
| 2005/0089000 A1 | 4/2005 | Bae et al. |
| 2005/0090200 A1 | 4/2005 | Karaoguz et al. |
| 2005/0091338 A1 | 4/2005 | De La Huerga |
| 2005/0091553 A1 | 4/2005 | Chien et al. |
| 2005/0094657 A1 | 5/2005 | Sung et al. |
| 2005/0096053 A1 | 5/2005 | Liu et al. |
| 2005/0097037 A1 | 5/2005 | Tibor |
| 2005/0105600 A1 | 5/2005 | Culum et al. |
| 2005/0105734 A1 | 5/2005 | Buer et al. |
| 2005/0108164 A1 | 5/2005 | Salafia et al. |
| 2005/0109836 A1 | 5/2005 | Ben-Aissa |
| 2005/0109841 A1 | 5/2005 | Ryan et al. |
| 2005/0113070 A1 | 5/2005 | Okabe |
| 2005/0114149 A1 | 5/2005 | Rodriguez et al. |
| 2005/0114150 A1 | 5/2005 | Franklin |
| 2005/0116020 A1 | 6/2005 | Smolucha et al. |
| 2005/0117530 A1 | 6/2005 | Abraham et al. |
| 2005/0119979 A1 | 6/2005 | Murashita et al. |
| 2005/0124294 A1 | 6/2005 | Wentink |
| 2005/0125258 A1 | 6/2005 | Yellin et al. |

(56) References Cited

U.S. PATENT DOCUMENTS

| | | |
|---|---|---|
| 2005/0136947 A1 | 6/2005 | Llombart-Juan et al. |
| 2005/0137827 A1 | 6/2005 | Takamiya |
| 2005/0137977 A1 | 6/2005 | Wankmueller |
| 2005/0138390 A1 | 6/2005 | Adams et al. |
| 2005/0138576 A1 | 6/2005 | Baumert et al. |
| 2005/0139656 A1 | 6/2005 | Arnouse |
| 2005/0141451 A1 | 6/2005 | Yoon et al. |
| 2005/0152394 A1 | 7/2005 | Cho |
| 2005/0154897 A1 | 7/2005 | Holloway et al. |
| 2005/0161503 A1 | 7/2005 | Remery et al. |
| 2005/0165684 A1 | 7/2005 | Jensen et al. |
| 2005/0166063 A1 | 7/2005 | Huang |
| 2005/0167482 A1 | 8/2005 | Ramachandran et al. |
| 2005/0169292 A1 | 8/2005 | Young |
| 2005/0177716 A1 | 8/2005 | Ginter et al. |
| 2005/0180385 A1 | 8/2005 | Jeong et al. |
| 2005/0182661 A1 | 8/2005 | Allard et al. |
| 2005/0182975 A1 | 8/2005 | Guo et al. |
| 2005/0187792 A1 | 8/2005 | Harper |
| 2005/0192748 A1 | 9/2005 | Andric et al. |
| 2005/0195975 A1 | 9/2005 | Kawakita |
| 2005/0198208 A1* | 9/2005 | Nystrom ............. H04W 12/068 709/219 |
| 2005/0200453 A1 | 9/2005 | Turner et al. |
| 2005/0201389 A1 | 9/2005 | Shimanuki et al. |
| 2005/0203682 A1 | 9/2005 | Omino et al. |
| 2005/0203844 A1 | 9/2005 | Ferguson et al. |
| 2005/0210270 A1 | 9/2005 | Rohatgi et al. |
| 2005/0212657 A1 | 9/2005 | Simon |
| 2005/0215233 A1 | 9/2005 | Perera et al. |
| 2005/0216313 A1 | 9/2005 | Claud et al. |
| 2005/0216639 A1 | 9/2005 | Sparer et al. |
| 2005/0218215 A1 | 10/2005 | Lauden |
| 2005/0220046 A1 | 10/2005 | Falck et al. |
| 2005/0221869 A1 | 10/2005 | Liu et al. |
| 2005/0224573 A1 | 10/2005 | Yoshizane et al. |
| 2005/0229007 A1 | 10/2005 | Bolle et al. |
| 2005/0229240 A1 | 10/2005 | Nanba |
| 2005/0231328 A1 | 10/2005 | Castle et al. |
| 2005/0235364 A1 | 10/2005 | Wilson |
| 2005/0242921 A1 | 11/2005 | Zimmerman et al. |
| 2005/0243787 A1 | 11/2005 | Hong et al. |
| 2005/0249385 A1 | 11/2005 | Kondo et al. |
| 2005/0251688 A1 | 11/2005 | Nanavati et al. |
| 2005/0253683 A1 | 11/2005 | Lowe |
| 2005/0256878 A1 | 11/2005 | Brown et al. |
| 2005/0257102 A1 | 11/2005 | Moyer et al. |
| 2005/0264416 A1 | 12/2005 | Maurer |
| 2005/0268111 A1 | 12/2005 | Markham |
| 2005/0269401 A1 | 12/2005 | Spitzer et al. |
| 2005/0272403 A1 | 12/2005 | Ryu et al. |
| 2005/0277385 A1 | 12/2005 | Daum |
| 2005/0281215 A1 | 12/2005 | Budampati et al. |
| 2005/0281320 A1 | 12/2005 | Neugebauer |
| 2005/0282558 A1 | 12/2005 | Choi et al. |
| 2005/0284932 A1 | 12/2005 | Sukeda et al. |
| 2005/0287985 A1 | 12/2005 | Balfanz et al. |
| 2005/0288015 A1 | 12/2005 | Azizi et al. |
| 2005/0288069 A1 | 12/2005 | Arunan et al. |
| 2005/0289473 A1 | 12/2005 | Gustafson et al. |
| 2006/0001525 A1 | 1/2006 | Nitzan et al. |
| 2006/0009216 A1 | 1/2006 | Welnick et al. |
| 2006/0014430 A1 | 1/2006 | Liang et al. |
| 2006/0022042 A1 | 2/2006 | Smets et al. |
| 2006/0022046 A1 | 2/2006 | Iwamura |
| 2006/0022800 A1 | 2/2006 | Krishna et al. |
| 2006/0025180 A1 | 2/2006 | Rajkotia et al. |
| 2006/0026673 A1 | 2/2006 | Tsuchida |
| 2006/0030279 A1 | 2/2006 | Leabman |
| 2006/0030353 A1 | 2/2006 | Jun |
| 2006/0034250 A1 | 2/2006 | Kim et al. |
| 2006/0041746 A1 | 2/2006 | Kirkup et al. |
| 2006/0046664 A1 | 3/2006 | Paradiso et al. |
| 2006/0058102 A1 | 3/2006 | Nguyen et al. |
| 2006/0063575 A1 | 3/2006 | Gatto et al. |
| 2006/0064605 A1 | 3/2006 | Giobbi |
| 2006/0066441 A1 | 3/2006 | Knadle et al. |
| 2006/0069814 A1 | 3/2006 | Abraham et al. |
| 2006/0072586 A1 | 4/2006 | Callaway et al. |
| 2006/0074713 A1 | 4/2006 | Conry et al. |
| 2006/0076401 A1 | 4/2006 | Frerking |
| 2006/0078176 A1 | 4/2006 | Abiko et al. |
| 2006/0087407 A1 | 4/2006 | Stewart et al. |
| 2006/0089138 A1 | 4/2006 | Smith et al. |
| 2006/0095792 A1 | 5/2006 | Hurtado et al. |
| 2006/0097882 A1 | 5/2006 | Brinkerhoff et al. |
| 2006/0097949 A1 | 5/2006 | Luebke et al. |
| 2006/0110012 A1 | 5/2006 | Ritter |
| 2006/0111955 A1 | 5/2006 | Winter et al. |
| 2006/0113381 A1 | 6/2006 | Hochstein et al. |
| 2006/0116935 A1 | 6/2006 | Evans |
| 2006/0117013 A1 | 6/2006 | Wada |
| 2006/0120287 A1 | 6/2006 | Foti et al. |
| 2006/0129838 A1 | 6/2006 | Chen et al. |
| 2006/0136728 A1 | 6/2006 | Gentry et al. |
| 2006/0136742 A1 | 6/2006 | Giobbi |
| 2006/0143441 A1 | 6/2006 | Giobbi |
| 2006/0144943 A1 | 7/2006 | Kim |
| 2006/0156027 A1 | 7/2006 | Blake |
| 2006/0158308 A1 | 7/2006 | McMullen et al. |
| 2006/0163349 A1 | 7/2006 | Neugebauer |
| 2006/0163350 A1 | 7/2006 | Melton et al. |
| 2006/0165060 A1 | 7/2006 | Dua |
| 2006/0169771 A1 | 8/2006 | Brookner |
| 2006/0170530 A1 | 8/2006 | Nwosu et al. |
| 2006/0170565 A1 | 8/2006 | Husak et al. |
| 2006/0172700 A1 | 8/2006 | Wu |
| 2006/0173846 A1 | 8/2006 | Omae et al. |
| 2006/0173991 A1 | 8/2006 | Piikivi |
| 2006/0183426 A1 | 8/2006 | Graves et al. |
| 2006/0183462 A1 | 8/2006 | Kolehmainen |
| 2006/0184531 A1 | 8/2006 | Russlies |
| 2006/0184795 A1 | 8/2006 | Doradla et al. |
| 2006/0185005 A1 | 8/2006 | Graves et al. |
| 2006/0187029 A1 | 8/2006 | Thomas |
| 2006/0190348 A1 | 8/2006 | Ofer et al. |
| 2006/0190413 A1 | 8/2006 | Harper |
| 2006/0194598 A1 | 8/2006 | Kim et al. |
| 2006/0195576 A1 | 8/2006 | Rinne et al. |
| 2006/0198337 A1 | 9/2006 | Hoang et al. |
| 2006/0200467 A1 | 9/2006 | Ohmori et al. |
| 2006/0205408 A1 | 9/2006 | Nakagawa et al. |
| 2006/0208066 A1 | 9/2006 | Finn et al. |
| 2006/0208853 A1 | 9/2006 | Kung et al. |
| 2006/0222042 A1 | 10/2006 | Teramura et al. |
| 2006/0226950 A1 | 10/2006 | Kanou et al. |
| 2006/0229909 A1 | 10/2006 | Kaila et al. |
| 2006/0236373 A1 | 10/2006 | Graves et al. |
| 2006/0237528 A1 | 10/2006 | Bishop et al. |
| 2006/0238305 A1 | 10/2006 | Loving et al. |
| 2006/0268891 A1 | 11/2006 | Heidari-Bateni et al. |
| 2006/0273176 A1 | 12/2006 | Audebert et al. |
| 2006/0274711 A1 | 12/2006 | Nelson et al. |
| 2006/0279412 A1 | 12/2006 | Holland et al. |
| 2006/0286969 A1 | 12/2006 | Talmor et al. |
| 2006/0288095 A1 | 12/2006 | Torok et al. |
| 2006/0288233 A1 | 12/2006 | Kozlay |
| 2006/0290473 A1 | 12/2006 | Mahasenan et al. |
| 2006/0290580 A1 | 12/2006 | Noro et al. |
| 2006/0292986 A1 | 12/2006 | Bitran et al. |
| 2006/0293925 A1 | 12/2006 | Flom |
| 2006/0294388 A1 | 12/2006 | Abraham et al. |
| 2007/0003111 A1 | 1/2007 | Awatsu et al. |
| 2007/0005403 A1 | 1/2007 | Kennedy et al. |
| 2007/0007331 A1 | 1/2007 | Jasper et al. |
| 2007/0008070 A1 | 1/2007 | Friedrich |
| 2007/0008916 A1 | 1/2007 | Haugli et al. |
| 2007/0011724 A1 | 1/2007 | Gonzalez et al. |
| 2007/0016800 A1 | 1/2007 | Spottswood et al. |
| 2007/0019845 A1 | 1/2007 | Kato |
| 2007/0029381 A1 | 2/2007 | Braiman |
| 2007/0032225 A1 | 2/2007 | Konicek et al. |
| 2007/0032288 A1 | 2/2007 | Nelson et al. |
| 2007/0033072 A1 | 2/2007 | Bildirici |

(56) References Cited

U.S. PATENT DOCUMENTS

| | | |
|---|---|---|
| 2007/0033150 A1 | 2/2007 | Nwosu |
| 2007/0036396 A1 | 2/2007 | Sugita et al. |
| 2007/0038751 A1 | 2/2007 | Jorgensen |
| 2007/0043594 A1 | 2/2007 | Lavergne |
| 2007/0050259 A1 | 3/2007 | Wesley |
| 2007/0050398 A1 | 3/2007 | Mochizuki |
| 2007/0050845 A1 | 3/2007 | Das et al. |
| 2007/0051794 A1 | 3/2007 | Glanz et al. |
| 2007/0051798 A1 | 3/2007 | Kawai et al. |
| 2007/0055630 A1 | 3/2007 | Gauthier et al. |
| 2007/0060095 A1 | 3/2007 | Subrahmanya et al. |
| 2007/0060319 A1 | 3/2007 | Block et al. |
| 2007/0064742 A1 | 3/2007 | Shvodian |
| 2007/0069852 A1 | 3/2007 | Mo et al. |
| 2007/0070040 A1 | 3/2007 | Chen et al. |
| 2007/0072636 A1 | 3/2007 | Worfolk et al. |
| 2007/0073553 A1 | 3/2007 | Flinn et al. |
| 2007/0084523 A1 | 4/2007 | McLean et al. |
| 2007/0084913 A1 | 4/2007 | Weston |
| 2007/0087682 A1 | 4/2007 | Dacosta |
| 2007/0087834 A1 | 4/2007 | Moser et al. |
| 2007/0094088 A1 | 4/2007 | Mastie et al. |
| 2007/0100507 A1 | 5/2007 | Simon |
| 2007/0100939 A1 | 5/2007 | Bagley et al. |
| 2007/0109117 A1 | 5/2007 | Heitzmann et al. |
| 2007/0112676 A1 | 5/2007 | Kontio et al. |
| 2007/0118891 A1 | 5/2007 | Buer |
| 2007/0119923 A1 | 5/2007 | Garrison et al. |
| 2007/0120643 A1 | 5/2007 | Lee |
| 2007/0120651 A1 | 5/2007 | Kobayashi et al. |
| 2007/0130025 A1 | 6/2007 | Nakajima |
| 2007/0132586 A1 | 6/2007 | Plocher et al. |
| 2007/0133478 A1 | 6/2007 | Armbruster et al. |
| 2007/0136407 A1 | 6/2007 | Rudelic |
| 2007/0142032 A1 | 6/2007 | Balsillie |
| 2007/0143626 A1 | 6/2007 | Okuda |
| 2007/0147332 A1 | 6/2007 | Lappetelainen et al. |
| 2007/0152826 A1 | 7/2007 | August et al. |
| 2007/0156850 A1 | 7/2007 | Corrion |
| 2007/0157249 A1 | 7/2007 | Cordray et al. |
| 2007/0158411 A1 | 7/2007 | Krieg, Jr. |
| 2007/0159301 A1 | 7/2007 | Hirt et al. |
| 2007/0159994 A1 | 7/2007 | Brown et al. |
| 2007/0164847 A1 | 7/2007 | Crawford et al. |
| 2007/0169121 A1 | 7/2007 | Hunt et al. |
| 2007/0174809 A1 | 7/2007 | Brown et al. |
| 2007/0174868 A1 | 7/2007 | Hitaka |
| 2007/0176756 A1 | 8/2007 | Friedrich |
| 2007/0176778 A1 | 8/2007 | Ando et al. |
| 2007/0180047 A1 | 8/2007 | Dong et al. |
| 2007/0187266 A1 | 8/2007 | Porter et al. |
| 2007/0192601 A1 | 8/2007 | Spain et al. |
| 2007/0194882 A1 | 8/2007 | Yokota et al. |
| 2007/0197261 A1 | 8/2007 | Humbel |
| 2007/0198436 A1 | 8/2007 | Weiss |
| 2007/0204078 A1 | 8/2007 | Boccon-Gibod et al. |
| 2007/0205860 A1 | 9/2007 | Jones et al. |
| 2007/0205861 A1 | 9/2007 | Nair et al. |
| 2007/0207750 A1 | 9/2007 | Brown et al. |
| 2007/0213048 A1 | 9/2007 | Trauberg |
| 2007/0214492 A1 | 9/2007 | Gopi et al. |
| 2007/0218921 A1 | 9/2007 | Lee et al. |
| 2007/0219926 A1 | 9/2007 | Korn |
| 2007/0220272 A1 | 9/2007 | Campisi et al. |
| 2007/0229268 A1 | 10/2007 | Swan et al. |
| 2007/0245157 A1 | 10/2007 | Giobbi et al. |
| 2007/0245158 A1 | 10/2007 | Giobbi et al. |
| 2007/0247366 A1 | 10/2007 | Smith et al. |
| 2007/0258626 A1 | 11/2007 | Reiner |
| 2007/0260883 A1 | 11/2007 | Giobbi et al. |
| 2007/0260888 A1 | 11/2007 | Giobbi et al. |
| 2007/0262134 A1 | 11/2007 | Humphrey et al. |
| 2007/0266257 A1 | 11/2007 | Camaisa et al. |
| 2007/0268862 A1 | 11/2007 | Singh et al. |
| 2007/0271194 A1 | 11/2007 | Walker et al. |
| 2007/0271433 A1 | 11/2007 | Takemura |
| 2007/0277044 A1 | 11/2007 | Graf et al. |
| 2007/0280509 A1 | 12/2007 | Owen et al. |
| 2007/0285212 A1 | 12/2007 | Rotzoll |
| 2007/0285238 A1 | 12/2007 | Batra |
| 2007/0288263 A1 | 12/2007 | Rodgers |
| 2007/0288752 A1 | 12/2007 | Chan |
| 2007/0293155 A1 | 12/2007 | Liao et al. |
| 2007/0294755 A1 | 12/2007 | Dadhia et al. |
| 2007/0296544 A1 | 12/2007 | Beenau et al. |
| 2008/0001783 A1 | 1/2008 | Cargonja et al. |
| 2008/0005432 A1 | 1/2008 | Kagawa |
| 2008/0008359 A1 | 1/2008 | Beenau et al. |
| 2008/0011842 A1 | 1/2008 | Curry et al. |
| 2008/0012685 A1 | 1/2008 | Friedrich et al. |
| 2008/0012767 A1 | 1/2008 | Caliri et al. |
| 2008/0016004 A1 | 1/2008 | Kurasaki et al. |
| 2008/0019578 A1 | 1/2008 | Saito et al. |
| 2008/0028227 A1 | 1/2008 | Sakurai |
| 2008/0028453 A1 | 1/2008 | Nguyen et al. |
| 2008/0040609 A1 | 2/2008 | Giobbi |
| 2008/0046366 A1 | 2/2008 | Bemmel et al. |
| 2008/0046715 A1 | 2/2008 | Balazs et al. |
| 2008/0049700 A1 | 2/2008 | Shah et al. |
| 2008/0061941 A1 | 3/2008 | Fischer et al. |
| 2008/0071577 A1 | 3/2008 | Highley |
| 2008/0072063 A1 | 3/2008 | Takahashi et al. |
| 2008/0088475 A1 | 4/2008 | Martin |
| 2008/0090548 A1 | 4/2008 | Ramalingam |
| 2008/0095359 A1 | 4/2008 | Schreyer et al. |
| 2008/0107089 A1 | 5/2008 | Larsson et al. |
| 2008/0109895 A1 | 5/2008 | Janevski |
| 2008/0111752 A1 | 5/2008 | Lindackers et al. |
| 2008/0127176 A1 | 5/2008 | Lee et al. |
| 2008/0129450 A1 | 6/2008 | Riegebauer |
| 2008/0129463 A1 | 6/2008 | Tuttle |
| 2008/0142588 A1 | 6/2008 | Blum |
| 2008/0148351 A1 | 6/2008 | Bhatia et al. |
| 2008/0149705 A1 | 6/2008 | Giobbi et al. |
| 2008/0150678 A1 | 6/2008 | Giobbi et al. |
| 2008/0156866 A1 | 7/2008 | McNeal |
| 2008/0164997 A1 | 7/2008 | Aritsuka et al. |
| 2008/0169909 A1 | 7/2008 | Park et al. |
| 2008/0180213 A1 | 7/2008 | Flax |
| 2008/0186166 A1 | 8/2008 | Zhou et al. |
| 2008/0188308 A1 | 8/2008 | Shepherd et al. |
| 2008/0195863 A1 | 8/2008 | Kennedy |
| 2008/0201768 A1 | 8/2008 | Koo et al. |
| 2008/0203107 A1 | 8/2008 | Conley et al. |
| 2008/0208016 A1 | 8/2008 | Hughes et al. |
| 2008/0209571 A1 | 8/2008 | Bhaskar et al. |
| 2008/0218416 A1 | 9/2008 | Handy et al. |
| 2008/0222701 A1 | 9/2008 | Saaranen et al. |
| 2008/0223918 A1 | 9/2008 | Williams et al. |
| 2008/0228524 A1 | 9/2008 | Brown |
| 2008/0235144 A1 | 9/2008 | Phillips |
| 2008/0238625 A1 | 10/2008 | Rofougaran et al. |
| 2008/0246613 A1 | 10/2008 | Linstrom et al. |
| 2008/0250388 A1 | 10/2008 | Meyer et al. |
| 2008/0251579 A1 | 10/2008 | Larsen |
| 2008/0278325 A1 | 11/2008 | Zimman et al. |
| 2008/0278327 A1 | 11/2008 | Nierenberg et al. |
| 2008/0289030 A1 | 11/2008 | Poplett |
| 2008/0289032 A1 | 11/2008 | Aoki et al. |
| 2008/0303637 A1 | 12/2008 | Gelbman et al. |
| 2008/0313728 A1 | 12/2008 | Pandrangi et al. |
| 2008/0314971 A1 | 12/2008 | Faith et al. |
| 2008/0316045 A1 | 12/2008 | Sriharto et al. |
| 2009/0002134 A1 | 1/2009 | McAllister |
| 2009/0013191 A1 | 1/2009 | Popowski |
| 2009/0016573 A1 | 1/2009 | McAfee et al. |
| 2009/0024584 A1 | 1/2009 | Dharap et al. |
| 2009/0033464 A1 | 2/2009 | Friedrich |
| 2009/0033485 A1 | 2/2009 | Naeve et al. |
| 2009/0036164 A1 | 2/2009 | Rowley |
| 2009/0040041 A1 | 2/2009 | Janetis et al. |
| 2009/0041309 A1 | 2/2009 | Kim et al. |
| 2009/0045916 A1 | 2/2009 | Nitzan et al. |
| 2009/0052389 A1 | 2/2009 | Qin et al. |

(56) References Cited

U.S. PATENT DOCUMENTS

| | | | |
|---|---|---|---|
| 2009/0070146 A1 | 3/2009 | Haider et al. | |
| 2009/0076849 A1 | 3/2009 | Diller | |
| 2009/0081996 A1 | 3/2009 | Duggal et al. | |
| 2009/0085724 A1* | 4/2009 | Naressi | G06F 21/10 340/10.6 |
| 2009/0094681 A1 | 4/2009 | Sadler et al. | |
| 2009/0096580 A1 | 4/2009 | Paananen | |
| 2009/0121890 A1 | 5/2009 | Brown et al. | |
| 2009/0125401 A1 | 5/2009 | Beenau et al. | |
| 2009/0140045 A1 | 6/2009 | Evans | |
| 2009/0157512 A1 | 6/2009 | King | |
| 2009/0165123 A1 | 6/2009 | Giobbi | |
| 2009/0176566 A1 | 7/2009 | Kelly | |
| 2009/0177495 A1 | 7/2009 | Abousy et al. | |
| 2009/0195461 A1 | 8/2009 | Hirt | |
| 2009/0199206 A1 | 8/2009 | Finkenzeller et al. | |
| 2009/0206992 A1 | 8/2009 | Giobbi et al. | |
| 2009/0232362 A1 | 9/2009 | Otsubo et al. | |
| 2009/0237245 A1 | 9/2009 | Brinton et al. | |
| 2009/0237253 A1 | 9/2009 | Neuwirth | |
| 2009/0239667 A1 | 9/2009 | Rowe et al. | |
| 2009/0253516 A1 | 10/2009 | Hartmann et al. | |
| 2009/0254448 A1 | 10/2009 | Giobbi | |
| 2009/0254971 A1 | 10/2009 | Herz et al. | |
| 2009/0264712 A1 | 10/2009 | Baldus et al. | |
| 2009/0310514 A1 | 12/2009 | Jeon et al. | |
| 2009/0313689 A1 | 12/2009 | Nystroem et al. | |
| 2009/0319788 A1 | 12/2009 | Zick et al. | |
| 2009/0320118 A1 | 12/2009 | Mueller et al. | |
| 2009/0322510 A1 | 12/2009 | Berger et al. | |
| 2009/0322566 A1 | 12/2009 | Shirakawa | |
| 2009/0328182 A1 | 12/2009 | Malakapalli et al. | |
| 2010/0005526 A1 | 1/2010 | Tsuji et al. | |
| 2010/0007498 A1 | 1/2010 | Jackson | |
| 2010/0022308 A1 | 1/2010 | Hartmann et al. | |
| 2010/0023074 A1 | 1/2010 | Powers et al. | |
| 2010/0037255 A1 | 2/2010 | Sheehan et al. | |
| 2010/0062743 A1 | 3/2010 | Jonsson | |
| 2010/0077214 A1 | 3/2010 | Jogand-Coulomb et al. | |
| 2010/0091987 A1 | 4/2010 | Takahashi et al. | |
| 2010/0117794 A1 | 5/2010 | Adams et al. | |
| 2010/0134257 A1 | 6/2010 | Puleston et al. | |
| 2010/0169442 A1 | 7/2010 | Liu et al. | |
| 2010/0169964 A1 | 7/2010 | Liu et al. | |
| 2010/0172567 A1 | 7/2010 | Prokoski | |
| 2010/0174911 A1 | 7/2010 | Isshiki | |
| 2010/0188226 A1 | 7/2010 | Seder et al. | |
| 2010/0214100 A1 | 8/2010 | Page | |
| 2010/0277283 A1 | 11/2010 | Burkart et al. | |
| 2010/0277286 A1 | 11/2010 | Burkart et al. | |
| 2010/0291896 A1 | 11/2010 | Corda | |
| 2010/0305843 A1 | 12/2010 | Yan et al. | |
| 2010/0328033 A1 | 12/2010 | Kamei | |
| 2011/0072034 A1 | 3/2011 | Sly et al. | |
| 2011/0072132 A1 | 3/2011 | Shafer et al. | |
| 2011/0082735 A1 | 4/2011 | Kannan et al. | |
| 2011/0085287 A1 | 4/2011 | Ebrom et al. | |
| 2011/0091136 A1 | 4/2011 | Danch et al. | |
| 2011/0116358 A9 | 5/2011 | Li et al. | |
| 2011/0126188 A1 | 5/2011 | Bernstein et al. | |
| 2011/0221568 A1 | 9/2011 | Giobbi | |
| 2011/0227740 A1 | 9/2011 | Wohltjen | |
| 2011/0238517 A1 | 9/2011 | Ramalingam et al. | |
| 2011/0246790 A1 | 10/2011 | Koh et al. | |
| 2011/0266348 A1 | 11/2011 | Denniston, Jr. | |
| 2011/0307599 A1 | 12/2011 | Saretto et al. | |
| 2012/0028609 A1 | 2/2012 | Hruska | |
| 2012/0030006 A1 | 2/2012 | Yoder et al. | |
| 2012/0069776 A1 | 3/2012 | Caldwell et al. | |
| 2012/0086571 A1 | 4/2012 | Scalisi et al. | |
| 2012/0182123 A1 | 7/2012 | Butler et al. | |
| 2012/0212322 A1 | 8/2012 | Idsoee | |
| 2012/0226451 A1 | 9/2012 | Bacot et al. | |
| 2012/0226565 A1 | 9/2012 | Drozd | |
| 2012/0226907 A1 | 9/2012 | Hohberger et al. | |
| 2012/0238287 A1 | 9/2012 | Scherzer | |
| 2012/0278188 A1 | 11/2012 | Attar et al. | |
| 2012/0300753 A1 | 11/2012 | Brown et al. | |
| 2012/0310720 A1 | 12/2012 | Balsan et al. | |
| 2013/0019295 A1 | 1/2013 | Park et al. | |
| 2013/0019323 A1 | 1/2013 | Arvidsson et al. | |
| 2013/0044111 A1 | 2/2013 | Vangilder et al. | |
| 2013/0111543 A1 | 5/2013 | Brown et al. | |
| 2013/0135082 A1 | 5/2013 | Xian et al. | |
| 2013/0179201 A1 | 7/2013 | Fuerstenberg et al. | |
| 2013/0219186 A1 | 8/2013 | Giobbi et al. | |
| 2013/0276140 A1 | 10/2013 | Coffing et al. | |
| 2013/0277425 A1 | 10/2013 | Sharma et al. | |
| 2013/0297514 A1 | 11/2013 | Giobbi | |
| 2013/0312082 A1 | 11/2013 | Izu et al. | |
| 2013/0315210 A1 | 11/2013 | Brown et al. | |
| 2013/0331063 A1 | 12/2013 | Cormier et al. | |
| 2014/0074696 A1 | 3/2014 | Glaser | |
| 2014/0147018 A1 | 5/2014 | Argue et al. | |
| 2014/0256511 A1 | 9/2014 | Smith | |
| 2014/0266604 A1 | 9/2014 | Masood et al. | |
| 2014/0266713 A1 | 9/2014 | Sehgal et al. | |
| 2014/0337920 A1 | 11/2014 | Giobbi | |
| 2015/0026480 A1 | 1/2015 | Giobbi et al. | |
| 2015/0039451 A1 | 2/2015 | Bonfiglio | |
| 2015/0138330 A1 | 5/2015 | Krishnamoorthi | |
| 2015/0294293 A1 | 10/2015 | Signarsson | |
| 2015/0310385 A1 | 10/2015 | King et al. | |
| 2015/0310440 A1 | 10/2015 | Hynes et al. | |
| 2016/0005020 A1 | 1/2016 | Fernando et al. | |
| 2016/0093081 A1 | 3/2016 | Kim et al. | |
| 2016/0133123 A1 | 5/2016 | Giobbi et al. | |
| 2016/0171200 A1 | 6/2016 | Giobbi | |
| 2016/0203349 A1 | 7/2016 | Giobbi | |
| 2016/0205682 A1 | 7/2016 | Brown et al. | |
| 2016/0210614 A1 | 7/2016 | Hall | |
| 2016/0300236 A1 | 10/2016 | Wiley et al. | |
| 2016/0306956 A1 | 10/2016 | Giobbi | |
| 2017/0041315 A1 | 2/2017 | Giobbi | |
| 2017/0085564 A1 | 3/2017 | Giobbi et al. | |
| 2017/0091548 A1 | 3/2017 | Agrawal et al. | |
| 2017/0270738 A1 | 9/2017 | Giobbi | |
| 2017/0309165 A1 | 10/2017 | Brown et al. | |
| 2017/0353500 A1 | 12/2017 | Jacobsen et al. | |
| 2018/0019998 A1 | 1/2018 | Giobbi | |
| 2018/0129799 A1 | 5/2018 | Giobbi | |
| 2018/0322718 A1 | 11/2018 | Qian et al. | |
| 2018/0357475 A1 | 12/2018 | Honda et al. | |
| 2019/0065721 A1 | 2/2019 | Giobbi | |
| 2019/0172281 A1 | 6/2019 | Einberg et al. | |
| 2019/0260724 A1 | 8/2019 | Hefetz et al. | |
| 2019/0289562 A1 | 9/2019 | Brown | |
| 2020/0351873 A1 | 11/2020 | Brown et al. | |
| 2021/0219869 A1 | 7/2021 | Ryu et al. | |
| 2021/0241592 A1 | 8/2021 | Allen et al. | |
| 2022/0210643 A1 | 6/2022 | Hynds et al. | |

FOREIGN PATENT DOCUMENTS

| | | | |
|---|---|---|---|
| JP | 10-049604 A | 2/1998 | |
| WO | 99/56429 A1 | 11/1999 | |
| WO | 00/62505 A1 | 10/2000 | |
| WO | 01/22724 A1 | 3/2001 | |
| WO | 01/35334 A1 | 5/2001 | |
| WO | WO-0148714 A1 * | 7/2001 | G06Q 20/04 |
| WO | 01/75876 A1 | 10/2001 | |
| WO | 01/77790 A1 | 10/2001 | |
| WO | 2004/010774 A1 | 2/2004 | |
| WO | 2004/038563 A2 | 5/2004 | |
| WO | 2005/031663 A2 | 4/2005 | |
| WO | 2005/050450 A1 | 6/2005 | |
| WO | 2005/086802 A2 | 9/2005 | |
| WO | 2007/087558 A2 | 8/2007 | |

OTHER PUBLICATIONS

Y. Labrou, J. Agre, L. Ji, J. Molina and W. -I. Chen, "Wireless wallet," The First Annual International Conference on Mobile and

(56) References Cited

OTHER PUBLICATIONS

Ubiquitous Systems: Networking and Services, 2004. MOBIQUITOUS 2004., Boston, MA, USA, 2004, pp. 32-41, doi: 10.1109/MOBIQ.2004.1331708. (Year: 2004).*
Anonymous, "BluePayz : A Seamless Payment Method Using Bluetooth-Enabled Mobile Phones," IP.com Publication Date 2003—Jun. 20, 2003, https://priorart.ip.com/IPCOM/000015495 (Year: 2003).*
Feng Bao, et al., "Design of portable mobile devices based e-payment system and e-ticketing system with digital signature," 2001 International Conferences on Info-Tech and Info-Net. Proceedings (Cat. No. 01EX479), Beijing, China, 2001, pp. 7-12 vol. 6, doi: 10.1109/ICII.2001.982996. (Year: 2001).*
Petition for Inter Partes Review of U.S. Pat. No. 10,698,989, Aug. 26, 2021, 3356 pgs.
Petition for Inter Partes Review of U.S. Pat. No. 8,352,730, Aug. 26, 2021, 2450 pgs.
Petition for Inter Partes Review of U.S. Pat. No. 9,298,905, Aug. 26, 2021, 1941 pgs.
Adams, "Designing with 802.15.4 and Zigbee," presented at Industrial Wireless Applications Summit, San Diego, California, Mar. 9, 2004, 22 pgs.
Adams, "Meet the ZigBee Standard," Sensors Online, Jun. 2003, 7 pgs., archived at https://web.archive.org/web/20031008191032/http://sensorsmag.com/articles/0603/14/pf_main.shtml.
Adams, "Zigbee vital in industrial applications," EE Times, Jul. 29, 2003, 3 pgs., archived at https://web.archive.org/web/20031013062940/http://www.eetimes.com/story/OEG20030727S0002.
Anonymous, "Applying Biometrics to Door Access," Security Magazine, Sep. 26, 2002, retrieved from http://www.securitymagazine.com/CDA/Articles/Technologies/3ae610eaa34d8010VgnVCM100000f932a8cO on Jan. 7, 2007, 5 pgs.
Anonymous, "Firecrest Shows How Truly Commercially-Minded Companies Will Exploit the Internet," Computergram International, Jan. 18, 1996, 2 pgs.
Anonymous, "IEEE 802.15.4-2006—Wikipedia, the free encyclopedia," Wikipedia, last modified Mar. 21, 2009, retrieved from http://en.wikipedia.org/wiki/IEEE_802.15.4-2006 on Apr. 30, 2009, 5 pgs.
Antonoff, "Visiting Video Valley," Sound & Vision, Nov. 2001, pp. 116, 118-119.
Apple et al., "Smart Card Setup Guide," 2006, downloaded from http://manuals.info.apple.com/en_US/Smart_Card_Setup_Guide.pdf on or before May 3, 2012, 16 pgs.
Balanis, "Antenna Theory: A Review," Jan. 1992, Proceedings of the IEEE, vol. 80, No. 1, p. 13.
Beaufour, "Personal Servers as Digital Keys," Proceedings of the Second IEEE Annual Conference on Pervasive Computing and Communications (PERCOM'04), Mar. 14-17, 2004, pp. 319-328.
Biopay, LLC, "Frequently Asked Questions (FAQs) About BioPay," retrieved from http://www.biopay.com/faqs-lowes.asp on Jan. 7, 2007, 5 pgs.
Blip Systems, "Mar. 8, 2004—Bluetooth at the office?" at least as early as Oct. 11, 2004, archived at https://web.archive.org/web/20041011094320/http:/www.blipsystems.com/Default.asp?ID=16&M=News&PID=25&NewsID=9.
Blip Systems, "BlipManager," at least as early as May 17, 2004, 1 pg., archived at https://web.archive.org/web/20040517050728/http://www.blipsystems.com/Default.asp?ID=11.
Blip Systems, "BlipMobility," at least as early as Apr. 7, 2004, archived at https://web.archive.org/web/20040407212934/http:/www.blipsystems.com/Default.asp?ID=118.
Blip Systems, "BlipNet API," at least as early as May 18, 2004, 1 pg., archived at https://web.archive.org/web/20040518060132/http://www.blipsystems.com/Default.asp?ID=92.
Blip Systems, "BlipNet Explore a wireless world . . . of great opportunities," brochure available Sep. 2002, 6 pgs., availabe online at https://web.archive.org/web/20031012184406/http:/www.blipsystems.com/products_blipnet.shtml.
Blip Systems, "BlipNet Technical Overview," Mar. 2003, 30 pgs., archived at https://web.archive.org/web/20031012184406/http:/www.blipsystems.com/products_blipnet.shtml.
Blip Systems, "BlipNode," at least as early as May 16, 2004, 1 pg., archived at https://web.archive.org/web/20040516001554/http:/www.blipsystems.com/Default.asp?ID=10.
Blip Systems, "BlipServer," at least as early as May 17, 2004, 1 pg., archived at https://web.archive.org/web/20040517044955/http:/www.blipsystems.com/Default.asp?ID=9.
Blip Systems, "Bluetooth Networks: Products: Bluetooth infracture," product description, at least as early as Oct. 2003, archived at https://web.archive.org/web/20031012184406/http:/www.blipsystems.com/products_blipnet.shtml.
Blip Systems, "Product Information—BlipNet—Presentation of BlipNet 1.0—A Bluetooth Access System," Aug. 2002, 2 pgs., archived at https://web.archive.org/web/20031012184406/http:/www.blipsystems.com/products_blipnet.shtml.
Blueproximity, "BlueProximity—Leave it—it's locked, come back, it's back too . . . " Aug. 26, 2007, retrieved from http://blueproximity.sourceforge.net/viahttp://www.archive.org/ on or before Oct. 11, 2011, 1 pg.
Bluetooth SIG, Inc. "Specification of the Bluetooth System," Version 1.2, Nov. 5, 2003, 82 pgs., archived at https://web.archive.org/web/20031119092849/http:/www.bluetooth.com/dev/spec.v12.asp.
Bluetooth SIG, Inc., "Bluetooth," www.bluetooth.com, Jun. 1, 2000, 8 pgs.
Bluetooth SIG, Inc., "Say Hello to Bluetooth," retrieved from www.bluetooth.com, at least as early as Jan. 14, 2005, 4 pgs.
Blum, "Digital Rights Management May Solve the Napster 'Problem,'" Technology Investor, Oct. 2000, pp. 24-27.
Bohrsatom et al., "Automatically unlock PC when entering proximity," Dec. 7, 2005, retrieved from http://salling.com/forums/viewtopic.php?t=3190 on or before Oct. 11, 2011, 3 pgs.
Brown, "Techniques for Privacy and Authentication in Personal Communication Systems," Personal Communications, IEEE, Aug. 1995, vol. 2, No. 4, pp. 6-10.
Callaway, "Wireless Sensor Networks: Architectures and Protocols," book description, Motorola Labs, Auerbach Publications, Aug. 26, 2003, 3 pgs., archived at https://web.archive.org/web/20031023101953/http:/www.crcpress.com/shopping_cart/products/product_detail.asp?sku=AU1823.
Callaway, Wireless Sensor Networks: Architectures and Protocols, Jan. 1, 2004, Auerbach Publications, 366 pgs.
Chen et al., "On Enhancing Biometric Authentication with Data Protection," KES2000, Fourth International Conference on Knowledge-Based Intelligent Engineering Systems and Allied Technologies, Proceedings (Cat. No. OOTH8516), vol. 1, Aug. 1, 2000, pp. 249-252.
Chi et al., "Industrial Wireless Sensor Networking: A Market Dynamics Study," ON World, Jun. 28, 2004, 5 pgs., archived at https://web.archive.org/web/20040710182216/http:/onworld.com:80/html/industrialwirelesssensor.htm.
Cisco Systems, Inc., "Antenna Patterns and Their Meaning," 1992-2007, p. 10.
Costa, "Imation USB 2.0 Micro Hard Drive," Nov. 22, 2005, retrieved from http://www.pcmag.com/article2/0,2817,1892209,00.asp on or before Oct. 11, 2011, 2 pgs.
Dagan, "Power over Ethernet (PoE) Midspan—The Smart Path to Providign Power for IP Telephony," Product Manager, Systems, Aug. 2005, Power Dsine Inc., 28 pgs.
Dai et al., "Toward Blockchain-Based Accounting and Assurance," Journal of Information Systems, vol. 31, No. 3, Fall 2017, pp. 5-21.
Debow, "Credit/Debit Debuts in Midwest Smart Card Test," Computers in Banking, vol. 6, No. 11, Nov. 1989, pp. 10-13.
Dennis, "Digital Passports Need Not Infringe Civil Liberties," Newsbytes, NA, Dec. 2, 1999, 2 pgs.
Derfler, "How Networks Work," Bestseller Edition, 1996, Ziff-Davis Press, Emeryville, CA, all pages.
Disclosed Anonymously (Method and Apparatus for Mobile Identity Authentication)., An IP.com Prior Art Database Technical IP.com No. IPCOM000194545D., IP.com Electronic Publication Date: Mar. 29, 2010 (Year: 2010).

(56) References Cited

OTHER PUBLICATIONS

Duflot et al., "A Formal Analysis of Bluetooth Device Discovery," presented at the 1st International Symposium on Leveraging Applications of Formal Methods (ISOLA'04), Oct. 30-Nov. 2, 2004, Paphos, Cyprus, and published in the International Journal on Software Tools for Technology Transfer 8, pp. 621-632, 16 pgs., https://doi.org/10.1007/s10009-006-0014-x.
Dvorak, IEEE 802.15.4 and Zigbee Overview, Sep. 27, 2005, Motorola, 26 pgs.
Eshed, "Bluetooth Wireless Technology Application for the Retail Market," published at www.tadlys.com on May 2001, 8 pgs.
Farouk et al., "Authentication Mechanisms in Grid Computing Environment: Comparative Study," IEEE, Oct. 2012, p. 1-6.
Fasca, "S3, Via Formalize Agreement," Electronic News, The Circuit, 45(45, Nov. 8, 1999), p. 20.
Freescale Semicondutor, Inc., "Freescale Events," see ZigBee Open House Event, Aug. 18, 2004, 6 pgs., archived at https://web.archive.org/web/20040909082726/https://www.freescale.com/webapp/sps/site/overview.jsp?nodeId=02XPgQ7JgbBqJQ#zigbee_openhouse_04.
Freescale Semiconductor, Inc., "Overview," ZigBee General Information, at least as early as Aug. 17, 2004, 1 pg., archived at https://web.archive.org/web/20040817210006/http:/www.freescale.com/webapp/sps/site/overview.jsp?nodeId=02XPgQhHPRjdyB37087725.
Freescale Semiconductor, Inc., "ZigBeeTM," Freescale Semiconductor Wireless Standards, at least as early as Aug. 18, 2004, 2 pgs., archived at https://web.archive.org/web/20040818075046/http:/www.freescale.com/webapp/sps/site/overview.jsp?nodeId=02XPgQhHPRjdyB.
Freescale Semiconductor, Inc., "ZigBeeTM," Freescale Semiconductor Wireless Standards, at least as early as Jun. 11, 2004, 2 pgs., archived at https://web.archive.org/web/20040611051834/http:/e-www.motorola.com/webapp/sps/site/overview.jsp?nodeId=02XPgQhHPRjdyB.
Freescale Semiconductor, Inc., "Freescale's ZigBeeTM-ready Platform Wins Sensors Magazine Best of Sensors Expo Award," Freescale Semiconductor Wireless, at least as early as Aug. 17, 2004, 1 pg., archived at https://web.archive.org/web/20040817203409mp_/http:/www.freescale.com/webapp/sps/site/overview.jsp?nodeId=02XPgQ6988.
David et al., Security Issues for Contactless Smart Cards, Sep. 1, 1997, conference paper, available online at https://link.springer.com/chapter/10.1007/BFb0054029, 6 pgs.
Kuhn et al., Introduction to Public Key Technology and the Federal PKI Infrastructure, Feb. 26, 2001, National Institute of Standards and Technology, 54 pgs.
Petition for Inter Partes Review of U.S. Pat. No. 9,049,188, Aug. 26, 2021, 800 pgs.
Petition for Inter Partes Review of U.S. Pat. No. 9,235,700, Aug. 26, 2021, 466 pgs.
Request for Ex Parte Reexamination of U.S. Pat. No. 10,698,989, Jun. 8, 2022, 1505 pgs.
Request for Ex Parte Reexamination of U.S. Pat. No. 8,352,730, Jun. 8, 2022, 1401 pgs.
Request for Ex Parte Reexamination of U.S. Pat. No. 9,298,905, Jun. 8, 2022, 1123 pgs.
Smart Card Alliance, Contactless Payment and the Retail Point of Sale: Applications, Technologies and Transaction Models, Mar. 1, 2003, a Smart Card Alliance Report, 50 pgs.
Smart Card Alliance, Smart Card Alliance—The Alliance, Jan. 22, 2001, http://www.smartcardalliance.org, 1 pg.
Freescale Semiconductor, Inc., "ZigBee Alliance Successfully Concludes First Multi-node Network Test," press release, Jul. 6, 2004, 2 pgs., archived at https://web.archive.org/web/20040717113733/http:/www.zigbee.org/documents/First-Multi-Node_Testing_FINAL_000.pdf.
Freescale Semiconductor, Inc., "ZigBeeTM Technology from Freescale," Freescale Semiconductor, Inc. white paper, 2004, 4 pgs., archived at https://web.archive.org/web/20050513024652/http:/www.freescale.com/files/wireless_comm/doc/brochure/BRZIGBEETECH.pdf.
Freescale Semiconductor, Inc., "ZRP-1 : ZigBee-ready Platform," at least as early as Oct. 19, 2005, 6 pgs., archived at https://web.archive.org/web/20051019122919/http://www.freescale.com/webapp/sps/site/prod_summary.jsp?code=ZRP-1&nodeId=02XPgQhCQ6m6cy7103.
Freescale Semiconductor, Inc., M68HC08 microcontroller ordering web page, at least as early as Aug. 17, 2004, 5 pgs., archived at https://web.archive.org/web/20040817014804/http:/www.freescale.com/webapp/sps/site/taxonomy.jsp?nodeId=01624684498634.
Giobbi, Specification of U.S. Appl. No. 60/824,758, filed Sep. 6, 2006, all pages.
Govindan et al. "Real Time Security Management Using RFID, Biometric and Smart Messages." 2009 3rd International Conference on Anti-Counterfeiting, Security, and Identification in Communication, Aug. 20, 2009, pp. 282-285.
Gralla, "How the Internet works," Millennium Edition, 1999, Que Corporation, Indianapolis, IN, all pages.
Hendron, "File Security, Keychains, Encryption, and More with Mac OS X (10.3+)" Apr. 4, 2005, downloaded from http://www.johnhendron.net/documents/OSX_Security.pdf on or before May 3, 2012, 30 pgs.
Hester et al., "neuRFon(TM) Netform: A Self-Organizing Wireless Sensor Network", Oct. 14, 2002, Proceedings of the Eleventh International Conference on Computer Communications and Networks, pp. 364-369.
Honkanen et al., "Low End Extension for Bluetooth", Sep. 19, 2004, Proceedings of the 2004 IEEE Radio and Wireless Conference, Atlanta, GA, pp. 199-202.
IBM Corporation, "Tadlys' Bluetooth Wireless Local Network for Corporate," Wireless e-business, at least as early as May 6, 2004, 2 pgs., archived at https://web.archive.org/web/20040621130525/http://www.tadlys.com/media/downloads/Corporate%20PVDEE01005-3.pdf.
IBM Corporation, "Tadlys' Bluetooth Wireless Local Network for Hotspots," Wireless e-business, at least as early as May 6, 2004, 2 pgs., archived at https://web.archive.org/web/20040508123915/http://www.tadlys.com/media/downloads/Hotspots%20PVDEE01006-3.pdf.
IEEE Computer Society, "IEEE Std 802.15.4 (Trade Mark)—Part 15.4: Wireless Medium Access Control (MAC) and Physical Layer (PHY) Specifications for Low-Rate Wireless Personal Area Networks (LR-WPANs)," The Institute of electrical and Electronics Engineers, Inc., New York, NY, Oct. 1, 2003, 679 pgs.
IEEE, "IEEE 802.15 WPANTM Task Group 4 (TG4)" exemplary web page, Aug. 24, 2004, 2 pgs., archived at https://web.archive.org/web/20040824085452/http:/www.ieee802.org/15/pub/TG4.html.
International Search Report and Written Opinion for International Application No. PCT/US04/38124, dated Apr. 7, 2005, 10 pgs.
International Search Report and Written Opinion for International Application No. PCT/US05/00349, dated Mar. 19, 2008, 10 pgs.
International Search Report and Written Opinion for International Application No. PCT/US05/07535, dated Dec. 6, 2005, 6 pgs.
International Search Report and Written Opinion for International Application No. PCT/US05/43447, dated Feb. 22, 2007, 7 pgs.
International Search Report and Written Opinion for International Application No. PCT/US05/46843, dated Mar. 1, 2007, 10 pgs.
International Search Report and Written Opinion for International Application No. PCT/US07/11102, dated Oct. 3, 2008, 11 pgs.
International Search Report and Written Opinion for International Application No. PCT/US07/11103, dated Apr. 23, 2008, 9 pgs.
International Search Report and Written Opinion for International Application No. PCT/US07/11104, dated Jun. 26, 2008, 9 pgs.
International Search Report and Written Opinion for International Application No. PCT/US07/11105, dated Oct. 20, 2008, 10 pgs.
International Search Report and Written Opinion for International Application No. PCT/US08/83060, dated Dec. 29, 2008, 9 pgs.
International Search Report and Written Opinion for International Application No. PCT/US08/87835, dated Feb. 11, 2009, 8 pgs.
International Search Report and Written Opinion for International Application No. PCT/US09/34095, dated Mar. 25, 2009, 11 pgs.

(56) References Cited

OTHER PUBLICATIONS

International Search Report and Written Opinion for International Application No. PCT/US2009/039943, dated Jun. 1, 2009, 9 pgs.
International Search Report and Written Opinion for International Application No. PCT/US2014/037609, dated Dec. 9, 2014, 13 pgs.
International Search Report for International Application No. PCT/US2001/049916, dated Apr. 25, 2002, 1 pg.
Jeyaprakash et al., "Secured Smart Card Using Palm Vein Biometric On-Card-Process," 2008 International Conference on Convergence and Hybrid Information Technology, 2008, pp. 548-551.
Jonker et al., "Digital rights management in consumer electronics products," IEEE Signal Processing Magazine, vol. 21, No. 2, pp. 82-91, Mar. 2004, doi: 10.1109/MSP.2004.1276116.
Katz et al., "Smart Cards and Biometrics in Privacy-Sensitive Secure Personal Identification System," May 2002, Smart Card Alliance, p. 1-29.
Kontzer, "Thomson Bets on Smart Cards for Video Encryption," www.informationweek.com, Jun. 7, 2001, 1 pg.
Korzeniowski, "First Intelligent, Wireless Consumer Devices About to Hit Market," TechNewsWorld, Jul. 28, 2004, 3 pgs., archived at https://web.archive.org/web/20040821061130/http:/www.technewsworld.com/story/35376.html%20com/.
Lake, "Downloading for Dollars: Who said buying music off the Net would be easy?" Sound & Vision, Nov. 2000, pp. 137-138.
Lee et al., "Effects of dielectric superstrates on a two-layer electromagnetically coupled patch antenna," Digest on Antennas and Propagation Society International Symposium, 1989, pp. 620-623 vol. 2, doi: 10.1109/APS.1989.134763.
Lewis, "Sony and Visa in On-Line Entertainment Venture," New York Times, vol. 145, Thurs. Ed., Nov. 16, 1995, 1 pg.
Liu et al., "A Practical Guide to Biometric Security Technology," IT Pro, vol. 3, No. 1, Jan./Feb. 2001, pp. 27-32.
Machine translation of JPH10049604, 27 pages.
Malan, "Here come Wireless Sensors," Machine Design, Jun. 10, 2004, 3 pgs., archived at https://web.archive.org/web/20040610131354/http:/www.machinedesign.com/ASP/viewSelectedArticle.asp?strArticleId=56796&strSite=MDSite&Screen=CURRENTISSUE.
Mciver et al., "Identification and Verification Working Together," Bioscrypt, White Paper: Identification and Verification Working Together, Aug. 27, 2004, retrieved from www.ibia.org/membersadmin/whitepapers/pdf/15/Identification%20and%20Verification%20Working%20Together.pdf on Jan. 7, 2007, 5 pgs.
Micronas, "Micronas and Thomson Multimedia Showcase a New Copy Protection System that Will Drive the Future of Digital Television," www.micronas.com: Jan. 8, 2002, 3 pgs.
MIT Computer Science and Artificial Intelligence Laboratory, "Cricket v2 User Manual," Cricket Project, MIT Computer Science and Artificial Intelligence Lab, Cambridge, MA, Jan. 2005, 57 pgs., available online at https://web.archive.org/web/20041206144922/http:/cricket.csail.mit.edu/v2man.html.
MIT Computer Science and Artificial Intelligence Laboratory, "The Cricket Indoor Location System," at least as early as Nov. 19, 2004, 6 pgs., archived at https://web.archive.org/web/20041119183049/http://cricket.csail.mit.edu/.
Motorola, Inc., "Motorola First to Demonstrate ZigBee 2.4 GHz Wireless Networking Technology," press release, Mar. 27, 2003, 2 pgs., archived at https://web.archive.org/web/20050205053308/http:/www.motorola.com/mediacenter/news/detail/0,1958,2743_2228_23,00.html.
Muller, "Desktop Encyclopedia of the Internet," 1999, Artech House Inc., Norwood, MA, all pages.
National Criminal Justice Reference Service, "Antenna Types," Dec. 11, 2006, online at http://ncjrs.gov/pdffiles1/nij/185030b.pdf, retrieved from http://web.archive.erg/web/*/http://www.ncjrs.gov/pdffiles1/nij/185030b.pdf on Jan. 12, 2011, 1 pg.
Nel et al., "Generation of Keys for use with the Digital Signature Standard (DSS)," Communications and Signal Processing, Proceedings of the 1993 IEEE South African Symposium, Aug. 6, 1993, pp. 6-11.

Nerd Vitiles, "magicJack: Could It Be the Asterisk Killer?" Aug. 1, 2007, retrieved from http://nerdvittles.com/index.php?p=187 on or before Oct. 11, 2011, 2 pgs.
Nilsson et al., "Match-on-Card for Java Cards," Precise Biometrics, white paper, Apr. 2004, retrieved from www.ibia.org/membersadmin/whitepapers/pdf/17/Precise%20Match-on-Card%20for%20Java%20Cards.pdf on Jan. 7, 2007, 5 pgs.
Noore, "Highly Robust Biometric Smart Card Design." IEEE Transactions on Consumer Electronics, vol. 46, No. 4, Nov. 2000, pp. 1059-1063.
Nordin, "Match-on-Card Technology," Precise Biometrics, white paper, Apr. 2004, retrieved from www.ibia.org/membersadmin/whitepapers/pdf/17/Precise%20Match-on-Card%20technology.pdf on Jan. 7, 2007, 7 pgs.
Paget, "The Security Behind Secure Extranets," Enterprise Systems Journal, vol. 14, No. 12, Dec. 1999, 4 pgs.
Pash, "Automate proximity and location-based computer actions," Jun. 5, 2007, retrieved from http://lifehacker.com/265822/automate-proximity-and-location+based-computer-actionson or before Oct. 11, 2011, 3 pgs.
Pope et al., "Oasis Digital Signature Services: Digital Signing without the Headaches," IEEE Internet Computing, vol. 10, Sep./Oct. 2006, pp. 81-84.
Priyantha, "The Cricket Indoor Location System," Ph.D. thesis submitted to Department of Electrical Engineering and Computer Science, Massachusetts Institute of Technology, Jun. 2005, 199 pgs.
Rodriguez et al., "In-building location using Bluetooth," Proceedings of the International Workshop on Wireless Ad-Hoc Networks (IWWAN 2005), May 23-26, 2005, London, England, 7 pgs.
Saflink Corporation, "SAFModule (Trademark): A Look Into Strong Authentication," white paper, retrieved from www.ibia.org/membersadmin/whilepapers/pdf/6/SAFmod_WP.pdf on Jan. 7, 2007, 8 pgs.
Sapsford, "E-Business: Sound Waves Could Help Ease Web-Fraud Woes," Wall Street Journal, Aug. 14, 2000, p. B1.
Schneier, Applied Cryptography, Second Edition: Protocols, Algorithms, and Source Doe in C, Jan. 1, 1996, John Wiley & Sons, Inc., 1027 pgs.
Singh et al. "A Constraint-Based Biometric Scheme on ATM and Swiping Machine." 2016 International Conference on Computational Techniques in Information and Communication Technologies (ICCTICT), Mar. 11, 2016, pp. 74-79.
Smart Card Alliance, "Alliance Activities: Publications: Identity: Identity Management Systems, Smart Cards and Privacy," 1997-2007, retrieved from www.smartcardalliance.org/pages/publications-identity on Jan. 7, 2007, 3 pgs.
Smart Card Alliance, "Contactless Technology for Secure Physical Access: Technology and Standards Choices," Smart Card Alliance, Oct. 2002, pp. 1-48.
Smart Card Alliance, "Smart Cards and Biometrics White Paper: Smart Card Alliance," May 2002, retrieved from http://www.securitymanagement.com/library/smartcard faqtech0802.pdf on Jan. 7, 2007, 7 pgs.
SplashID, "SplashID—Secure Password Manager for PDA's and Smartphones," Mar. 8, 2007, retrieved from http://www.splashdata/com/splashid/ via http://www.archive.org/ on or before Oct. 11, 2011, 2 pgs.
Srivastava, "Is internet security a major issue with respect to the slow acceptance rate of digital signatures," Jan. 2, 2005, Computer Law & Security Report, pp. 392-404.
Tadlys Ltd., "'Hotspot' Gaming Arcade," at least as early as Dec. 9, 2004, 2 pgs., archived at https://web.archive.org/web/20041209234518/http://www.tadlys.com/media/downloads/Tadlys_gaming_arcade.pdf.
Tadlys Ltd., "About Tadlys," at least as early as Apr. 5, 2001, 1 pg., archived at https://web.archive.org/web/20010405044249/http:/www.tadlys.com/about.html.
Tadlys Ltd., "An Advertisers' Dream—From direct marketing to sales," Nov. 2004, 2 pgs., archived at https://web.archive.org/web/20041101092944/http://www.tadlys.com/media/downloads/m-commerce_app.pdf.

(56) References Cited

OTHER PUBLICATIONS

Tadlys Ltd., "Bluetooth Glossary," at least as early as Jun. 2004, 12 pgs., archived at https://web.archive.org/web/20040531082349/http://www.tadlys.com/pages/Downloads_content.asp?intGlobalId=1.
Tadlys Ltd., "First Demo of Distribution and Redemption of e-Coupons over Bluetooth," Tadlys Company News and Events, Jun. 5, 2001, 1 pg., archived at https://web.archive.org/web/20040601051516/http://tadlys.com/Pages/news_content.asp?iGlobalID=17.
Tadlys Ltd., "Indoor Location Networks," at least as early as Apr. 3, 2004, 1 pg., archived at https://web.archive.org/web/20040403200221/http:/www.tadlys.com/Pages/Product_content.asp?iGlobalId=2.
Tadlys Ltd., "Operator Systems," at least as early as Nov. 1, 2004, 2 pgs., archived at https://web.archive.org/web/20041101101402/http://www.tadlys.com/media/downloads/operator_network.pdf.
Tadlys Ltd., "Tadlys Announces Range of Bluetooth Access Network Solutions," Tadlys Company News and Events, Jan. 22, 2001, 1 pg., archived at https://web.archive.org/web/20040624122319/http://www.tadlys.com/Pages/news_content.asp?iGlobalID=16.
Tadlys Ltd., "Tadlys' Wire free networking solutions," Feb. 2001, 2 pgs., archived at https://web.archive.org/web/20010204012700/http:/www.tadlys.com/solutions.html.
Tadlys Ltd., "Wireless hospital network," at least as early as Jul. 1, 2004, 2 pgs., archived at https://web.archive.org/web/20040701105046/http:/www.tadlys.com/media/downloads/tadlys_hospital_wireless_network.pdf.
Tadlys Ltd., "Wireless Museum Information," at least as early as Dec. 12, 2005, 2 pgs., archived at https://web.archive.org/web/20051212162456/http://www.tadlys.com/media/downloads/Tadlys_wireless_museum_network.pdf.
Tadlys Ltd., "Corporate Systems," at least as early as Nov. 1, 2004, 2 pgs., archived at https://web.archive.org/web/20041101095441/http://www.tadlys.com/media/downloads/Corporate_network.pdf.
Thomson Multimedia, "Thomson multimedia unveils copy protection proposal designed to provide additional layer of digital content security," retrieved from www.thompson-multimedia.com/gb/06/c01/010530.htm on Mar. 4, 2002, May 30, 2001, 2 pgs.
Thongthammachart et al., "Bluetooth Enables In-door Mobile Location Services," Proceedings of the 57th IEEE Semiannual Vehicular Technology Conference, Apr. 22-25, 2003, 5 pgs.
University of Birmingham, "PRISM: Probabilistic Symbolic Model Checker," at least as early as Aug. 3, 2004, 3 pgs., archived at https://web.archive.org/web/20040803193058/http://www.cs.bham.ac.uk/~dxp/prism/casestudies/index.html.
Unixhelp, "What is a file?" Apr. 30, 1998, retrieved from unixhelp.ed.ac.uk/editors/whatisafile.html accessed Mar. 11, 2010 via http://waybackmachine.org/19980615000000*/http://unixhelp.ed.ac.uk/editors/whatisafile.html on Mar. 11, 2011, 1 pg.
Vainio, "Bluetooth Security," Helsinki University of Technology, May 25, 2000, 17 pgs.
Van Winkle, "Bluetooth: The King of Connectivity," Laptop Buyer's Guide and Handbook, Jan. 2000, pp. 148-153.
Wade, "Using Fingerprints to Make Payments at POS Slowly Gaining Popularity," Credit Union Journal, International Biometric Group, Apr. 21, 2003, retrieved from http://www.biometricgroup.com/in_the_news/04.21.03.html on Jan. 7, 2007, 3 pgs.
Wallace, "The Internet Unplugged," InformationWeek, vol. 765, No. 22, Dec. 13, 1999, pp. 22-24.
Weber, "In the Age of Napster, Protecting Copyright is a Digital Arms Race," Wall Street Journal, Eastern ed., Jul. 24, 2000, p. B1.
Weissman, "Indoor Location," Tadlys Ltd. white paper, at least as early as Oct. 31, 2004, 15 pgs., archived at https://web.archive.org/web/20041031125859/http:/www.tadlys.com/media/downloads/Indoors_Location_Systems.pdf.
White, "How computers Work," Millennium Edition, 1999, Que Corporation, Indianapolis, IN, all pages.
Yoshida, "Content Protection Plan Targets Wireless Home Networks," EE Times, Jan. 11, 2002, retrieved from www.eetimes.com/story/OEG20020111S0060 on Mar. 4, 2002, 2 pgs.
Zhang et al., "A User-Centric M-Payment Solution," The ISG-Smart Card Centre and the Information Security Group, Royal Holloway, University of London, Egham, Surrey, TW20 0EX, UK, 2005, 8 pgs.
ZigBee Alliance, "Welcome to the ZigBeeTM Alliance," exemplary web page, at least as early as Sep. 24, 2004, 2 pgs., archived at https://web.archive.org/web/20040924045517/http://zigbee.org/.
ZigBee Alliance, "ZigBee Specification," ZigBee Document 053474r06, Version 1.0, Dec. 14, 2004, 378 pgs.
ZigBee Alliance, "The ZigBeeTM Buzz Is Growing: New Low-Power Wireless Standard Opens Powerful Possibilities," Electronic Design, Jan. 12, 2004, 12 pgs., archived at https://web.archive.org/web/20040411172015/http:/www.elecdesign.com/Files/29/7186/7186_01.pdf.
ZigBee Alliance, "ZigBeeTM Positioned to Drive Wireless Networking in Building Automation, Industrial and Residential Control and Sensors Markets in 2004," press release, Feb. 17, 2004, 3 pgs., archived at https://web.archive.org/web/20040423220244/http:/www.zigbee.org/documents/04036r5ZB_MWG-Momentum-Release_FINAL.pdf.
Agourare et al., "Authentication and location control via RFID analysis, " 2009 IEEE Conference on Emerging Technologies & Factory Automation, Sep. 1, 2009, 8 pgs.
Labrou et al., "Wireless Wallet," Proceedings of the First Annual International Conference on Mobile and Ubiquitous Systems: Networking and Services (MobiQuitos '04), IEEE, Aug. 22-26, 2004, 10 pgs.
NPL Search Terms (Year: 2023).

\* cited by examiner

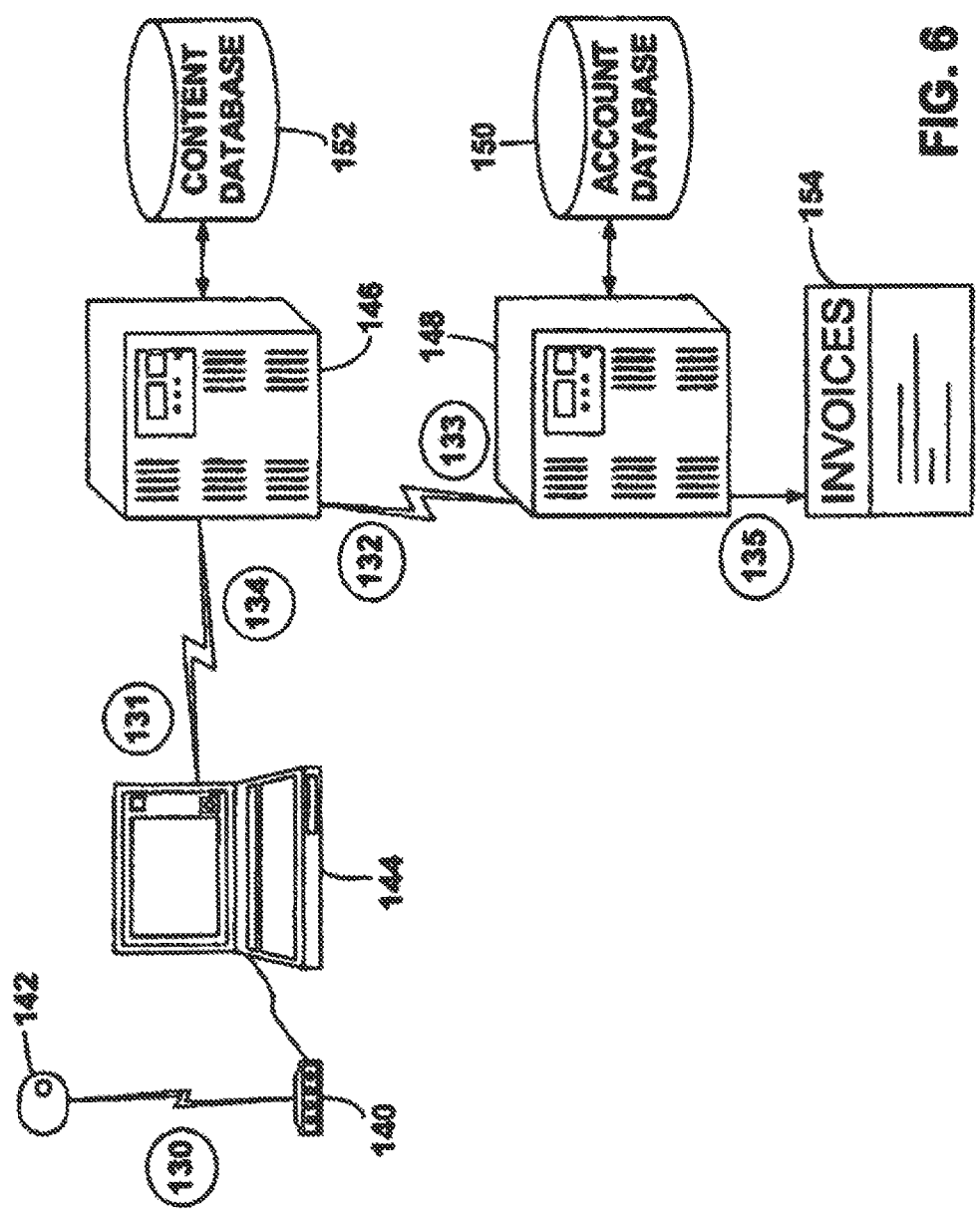

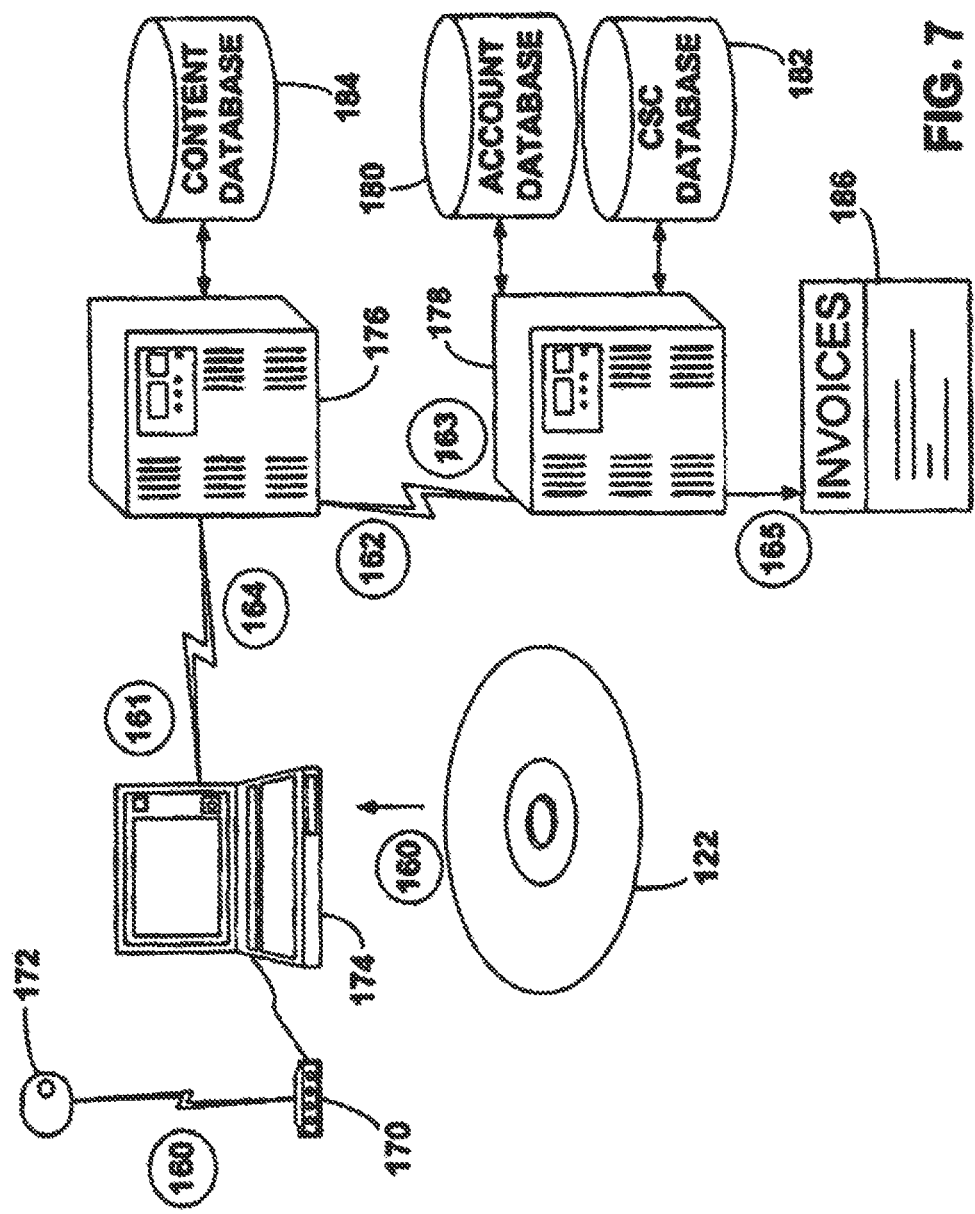

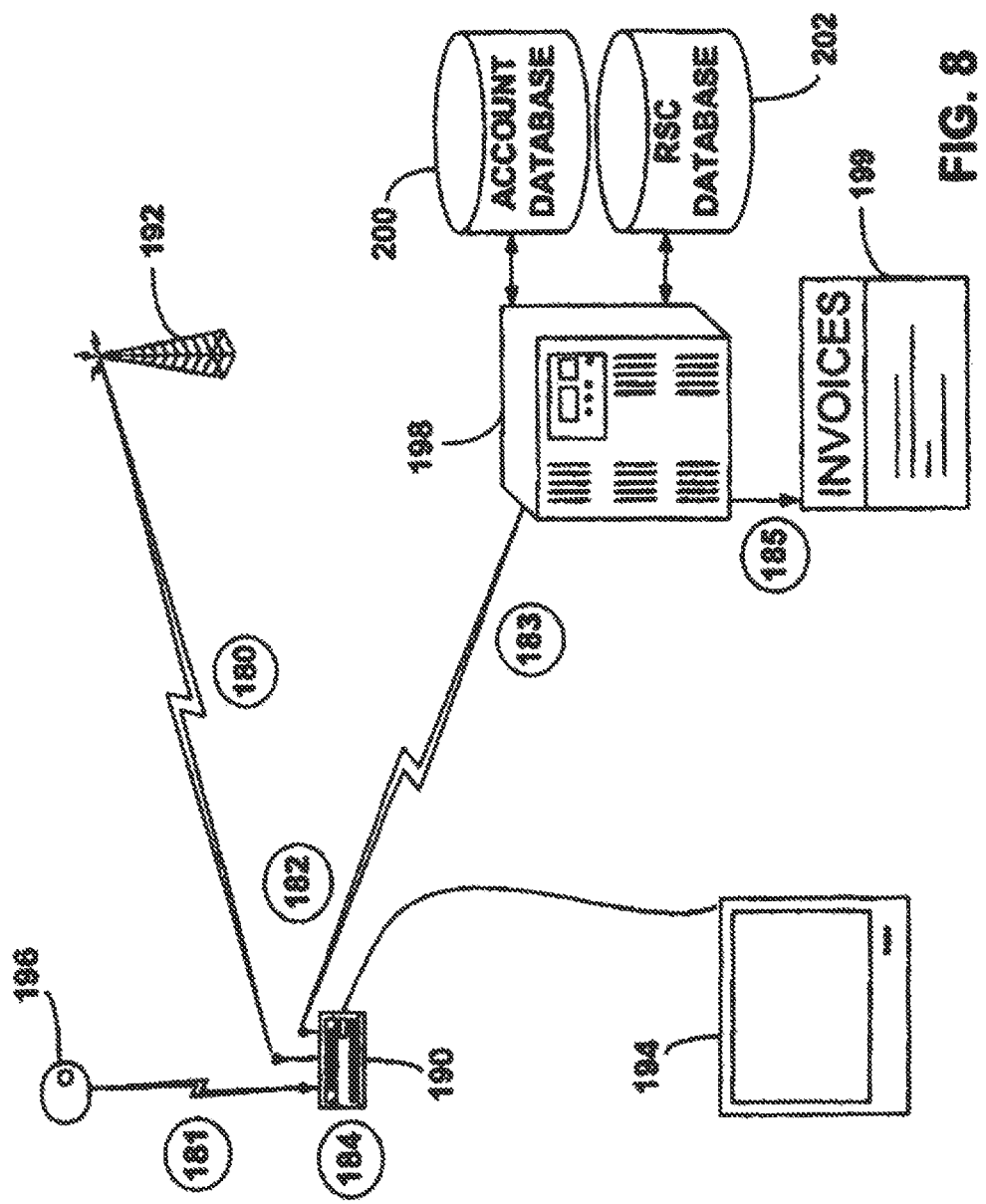

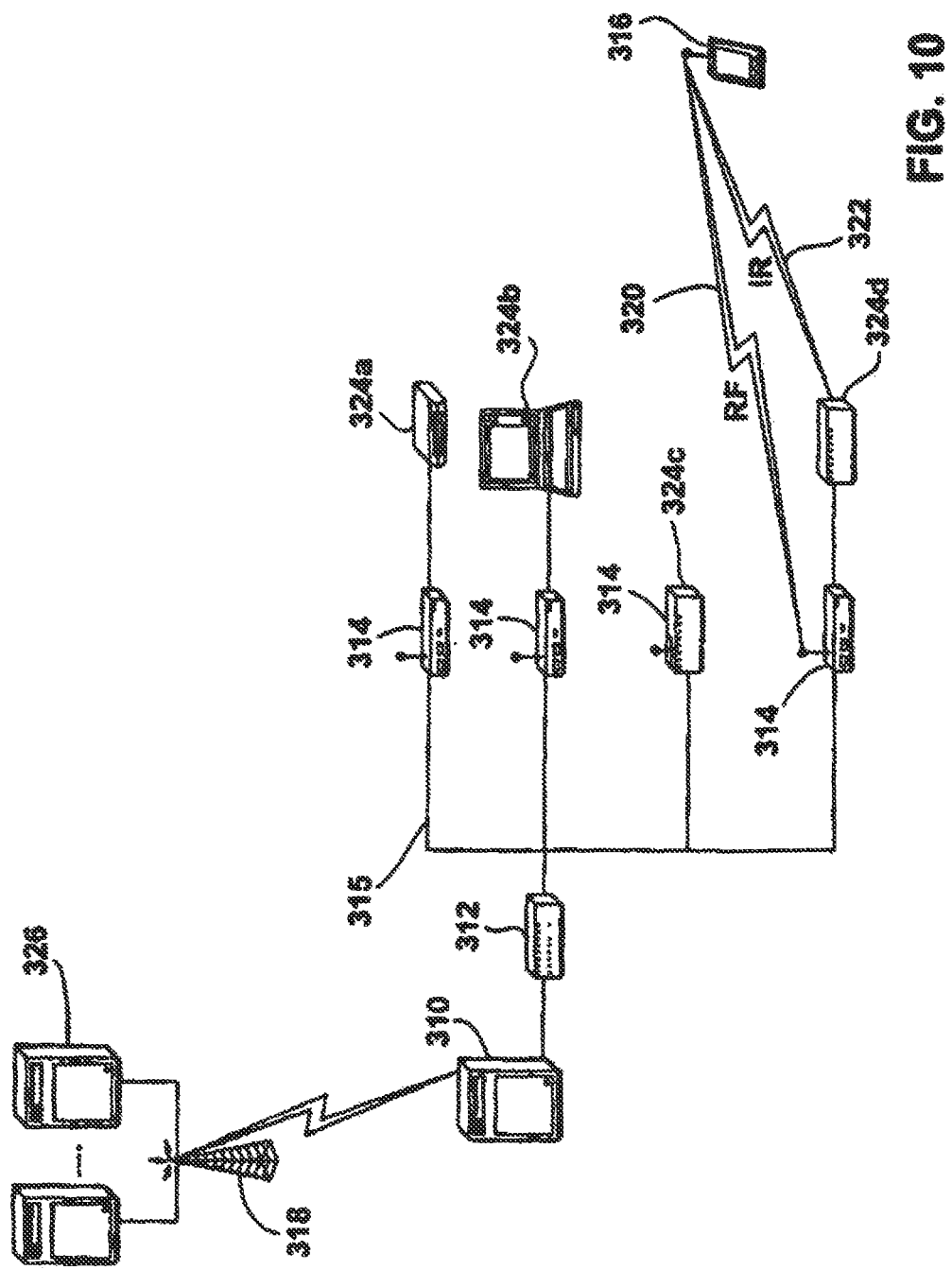

LINKED ACCOUNT SYSTEM USING PERSONAL DIGITAL KEY (PDK-LAS)

CROSS REFERENCE TO RELATED APPLICATIONS

This application is a continuation of U.S. patent application Ser. No. 14/666,268, titled "Linked Account System Using Personal Digital Key (PDK-LAS)," filed Mar. 23, 2015, which is a continuation of U.S. patent application Ser. No. 10/598,735, titled "Linked Account System Using Personal Digital Key (PDK-LAS)," filed Jul. 31, 2007, which is a U.S. National Stage Application of International Application No. PCT/US2005/007535, titled "Linked Account System Using Personal Digital Key (PDK-LAS)," filed Mar. 8, 2005, published in English under PCT Article 21(2), which claims priority under 35 U.S.C. § 119(e) to U.S. Provisional Patent Application No. 60/551,320, titled "Linked Account System Using Personal Digital Key (PDK-LAS)," filed Mar. 8, 2004, the entireties of all of which are hereby incorporated herein.

FIELD OF THE INVENTION

Background

The present invention relates generally to embodiments of a linked account system using personal digital key (PDK-LAS).

Background of the Invention

The market for downloading digital content online is rapidly climbing because distribution of such content is inexpensive, fast, and easy and the quality of the content itself is acceptable. The market, however, remains disorganized due to competing standards, competing companies, discontented artists and producers, and outright theft of digital content.

Digital rights management (DRM) companies seek to solve the foregoing problems by delivering the digital content from the real producers to the right customers and ensuring that everyone who should be paid in fact is paid. DRM seeks to get everyone paid by managing the multiple steps for distributing digital content (music, video, software) online: watermarking, encryption, transaction management, and rights management. Some DRM companies perform all these steps, while other DRM companies specialize in one or two steps of the process.

First, watermarking stamps each piece of digital content with a digital mark so it can be tracked wherever it goes. Digital watermarks are just like paper watermarks, except they cannot be seen or heard. Special software is required to read a digital watermark.

Second, encryption scrambles watermarked digital content and stores it inside a digital safe for shipment around the Internet. The safe protects the content during shipping by allowing only those with the right software key to the safe to decrypt and use the content. Third, transaction management handles actual payments for the digital content using credit card techniques found elsewhere in e-commerce. An order is placed, a credit card number is taken, account status is checked, and the exchange is authorized.

Finally, rights management manages the information about the digital content itself: what it is, who gets it, how it is delivered, how many times it may be used, how long the rights last, who gets paid, how much they get paid, and how. This information travels with the digital content in something called a digital permit. The permits rests on top of the digital content as it travels the Internet and allows legal users to enjoy the digital content for as long as the rights last.

The primary objective of DRM companies is to deploy technologies that protect digital content as it is distributed online. Some of these proposed technologies and DRM in general are discussed in the article "Digital Rights Management May Solve the Napster 'Problem'," *Technology Investor*, October 2000, pp. 24-27. Although such technologies should reduce the amount of digital theft, they generally favor the content provider at the expense of the consumer or favor the consumer at the expense of the content provider. That is, the rights of either the content provider or the consumer are compromised. For example, some technologies severely limit the consumer's ability to make extra copies of digital content even when the digital content is solely for personal use. Other technologies facilitate the making of copies of digital content which can be used by different consumers without the content provider being compensated by each consumer. The present inventor has discovered an improved DRM system and method that effectively balances and protects the rights of both the consumer and the content provider. In addition, the present inventor has discovered an associated digital content security system for protecting computers and other storage devices from unauthorized use and protecting the digital content stored on computers and other storage devices from being wrongfully accessed, copied, and/or distributed.

With the advent of the Internet, and online shopping, banking and so forth, the Internet has enabled the incidence of credit card, bank account information, and similar data being stolen has risen dramatically. The cost to providers of transactions performed with these stolen items is enormous and results in higher transaction fees and product pricing to consumers, as it is the providers who are typically responsible for charges applied to stolen account information.

Additionally, the inconvenience and tangential problems that victims, consumers, suffer as a result of such crimes are often traumatic, but are minimally troublesome. The insufficient technologies and procedures currently utilized to secure account-based transaction processing do little to prevent these crimes. The problem is most notable in the case of the largest growing segment for such transactions, the on-line environment.

SUMMARY OF THE INVENTION

One embodiment of the invention includes a system comprising: a personal digital key and a computer readable medium that is accessible when authenticated by the personal digital key.

BRIEF DESCRIPTION OF THE DRAWINGS

The foregoing and other advantages of the invention will become apparent upon reading the following detailed description and upon reference to the drawings in which:

FIG. 6 is a block diagram for implementing a core acquisition option of downloaded content;

FIG. 7 is a block diagram for implementing a core acquisition option of store-bought content;

FIG. 8 is a block diagram for implementing a core acquisition option of broadcast content;

FIG. 10 is a block diagram for implementing a core playback option of networked devices;

Figure 1:
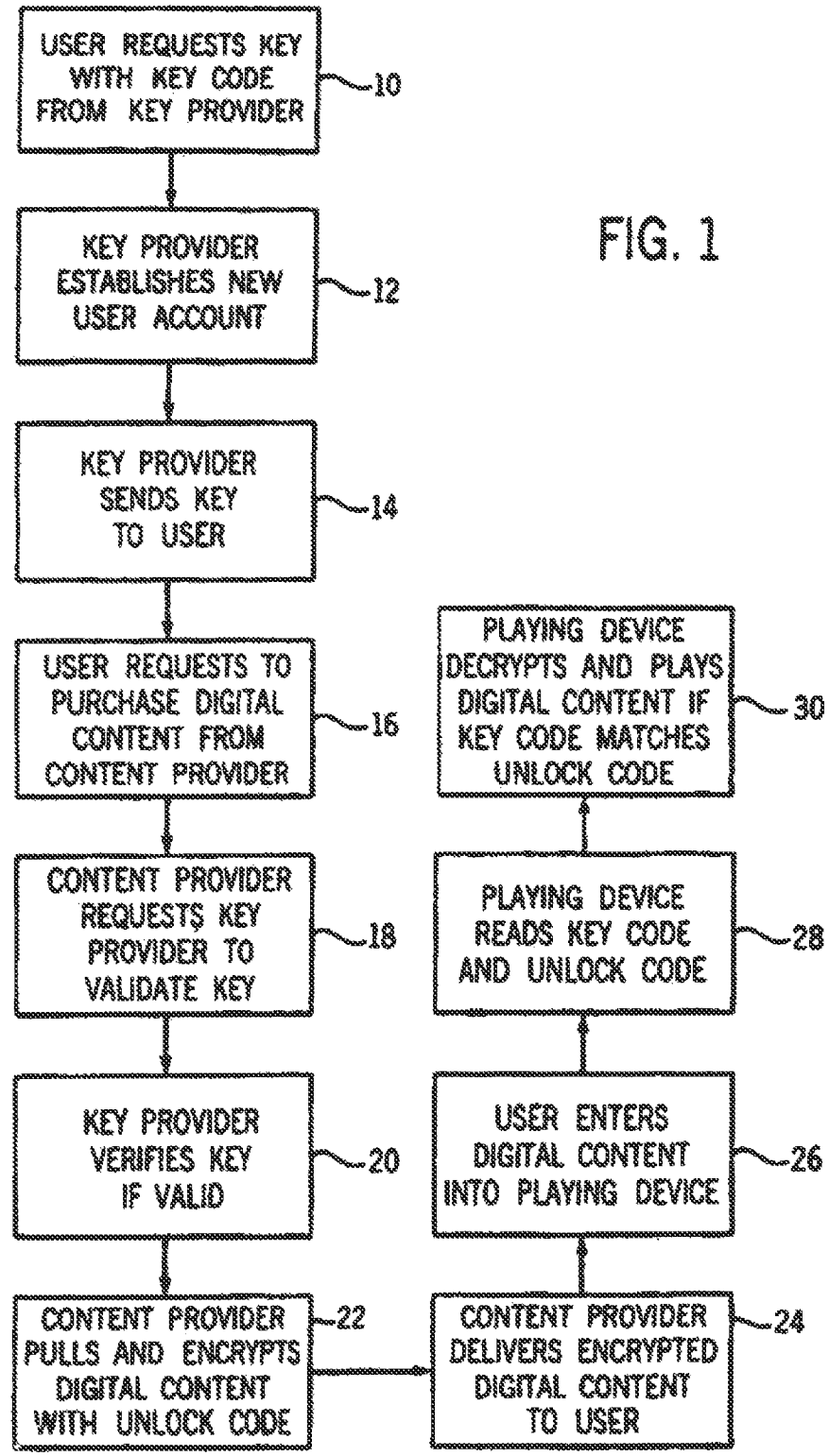
FIG. 1 is a flow chart of a method of managing digital rights in accordance with the present invention.

While the invention is susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents, and alternatives falling within the spirit and scope of the invention as defined by the appended claims.

DESCRIPTION OF SPECIFIC EMBODIMENTS

Definitions

As used herein, "PDK Key or Key" refers to a PDK-compliant wireless key providing access to PDK-protected objects. The acronym "PDK" refers to "personal digital key."

A "PDK-hard drive" refers to a physical or "electronic" hard drive containing an integrated RDC.

A "PDK-protected product/object" refers to a hard drive or accounts or content protected via PDK technology.

An "assigned key" is a PDK key assigned to one or more protected objects.

An "RDC" refers to a Reader/Decoder circuit installed in a user's computer, or built into computer hard drive, or point-of-sale (POS) credit card swipe unit which communicates with PDK keys and decodes PDK data.

A "POS RCD" refers to a reader/decoder circuit integrated in a standard point-of-sale (POS) credit-card swipe unit.

A "manufacturer" as used herein refers to a manufacturer of PDK-keys.

A "provider" as used herein refers to an entity issuing a PDK-linked account, PDK hard drives and so forth.

A "customer" or "user" refers to an individual possessing or utilizing a PDK-key.

A "master" or "master key" refers to a PDK key initially assigned to a PDK protected object, and which is required to be present for configuration transactions.

DESCRIPTION

Figure 16:
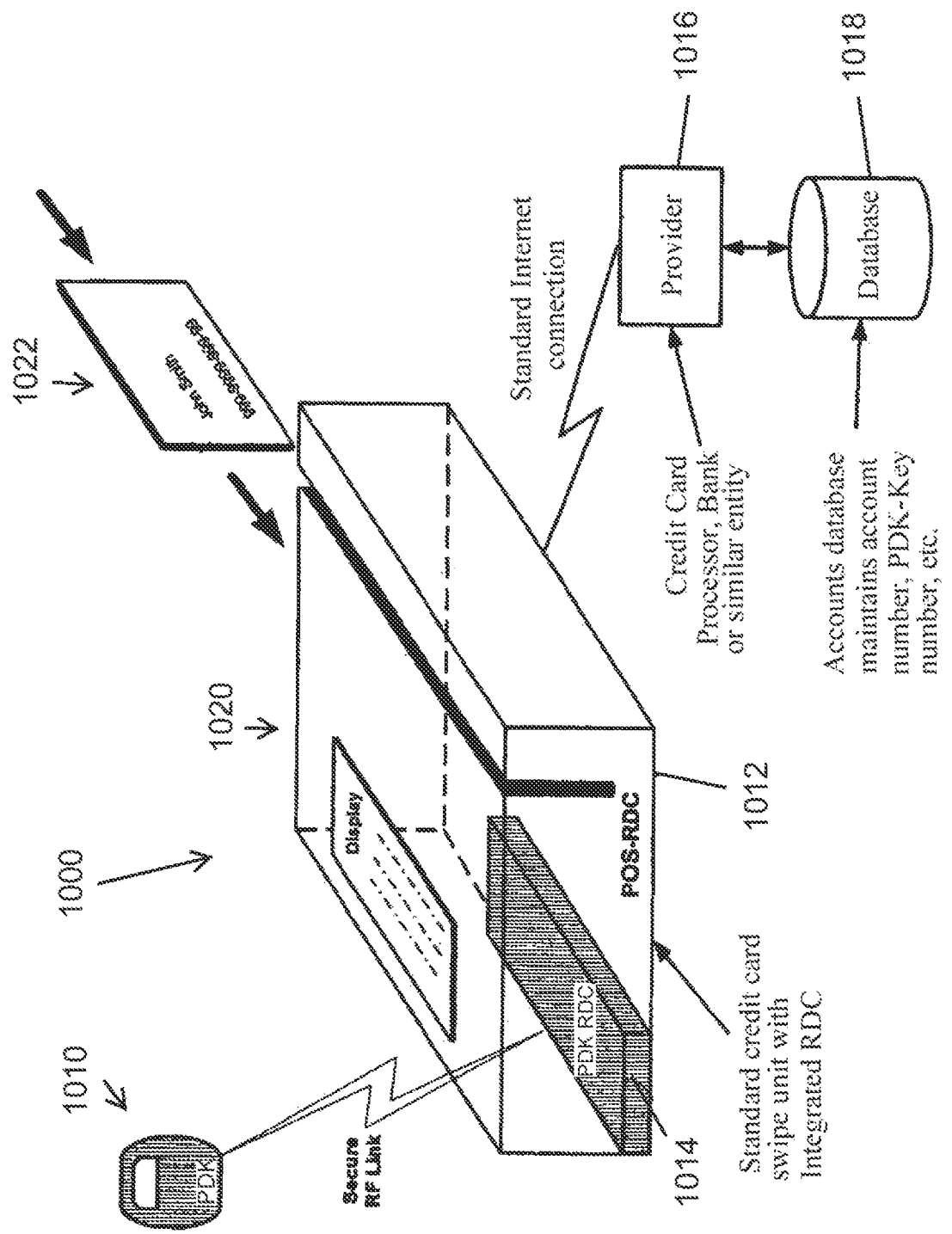
FIG. 16 is a schematic view of a PDK key system embodiment of the invention.

One system embodiment of the invention, illustrated at 1000 in FIG. 16 includes a personal digital key, PDK, 1010, a point-of-sale reader decoder circuit, POS RDC, 1012, a PDK reader decoder circuit, 1014 that is connected to a provider 1016 having a database 1018. For some embodiments, the PDK reader decoder circuit and POS RDC 1014 are in a single unit 1020, which for some embodiments, is a standard credit card swipe unit integrated with RDC. For some embodiments, a standard credit card 1022 is readable in the reader 1020. The provider 1016 may be a credit card processor, bank or other similar entity. The account database 1018 maintains the account number, PDK key number and other identifiers of the user.

Figure 17:
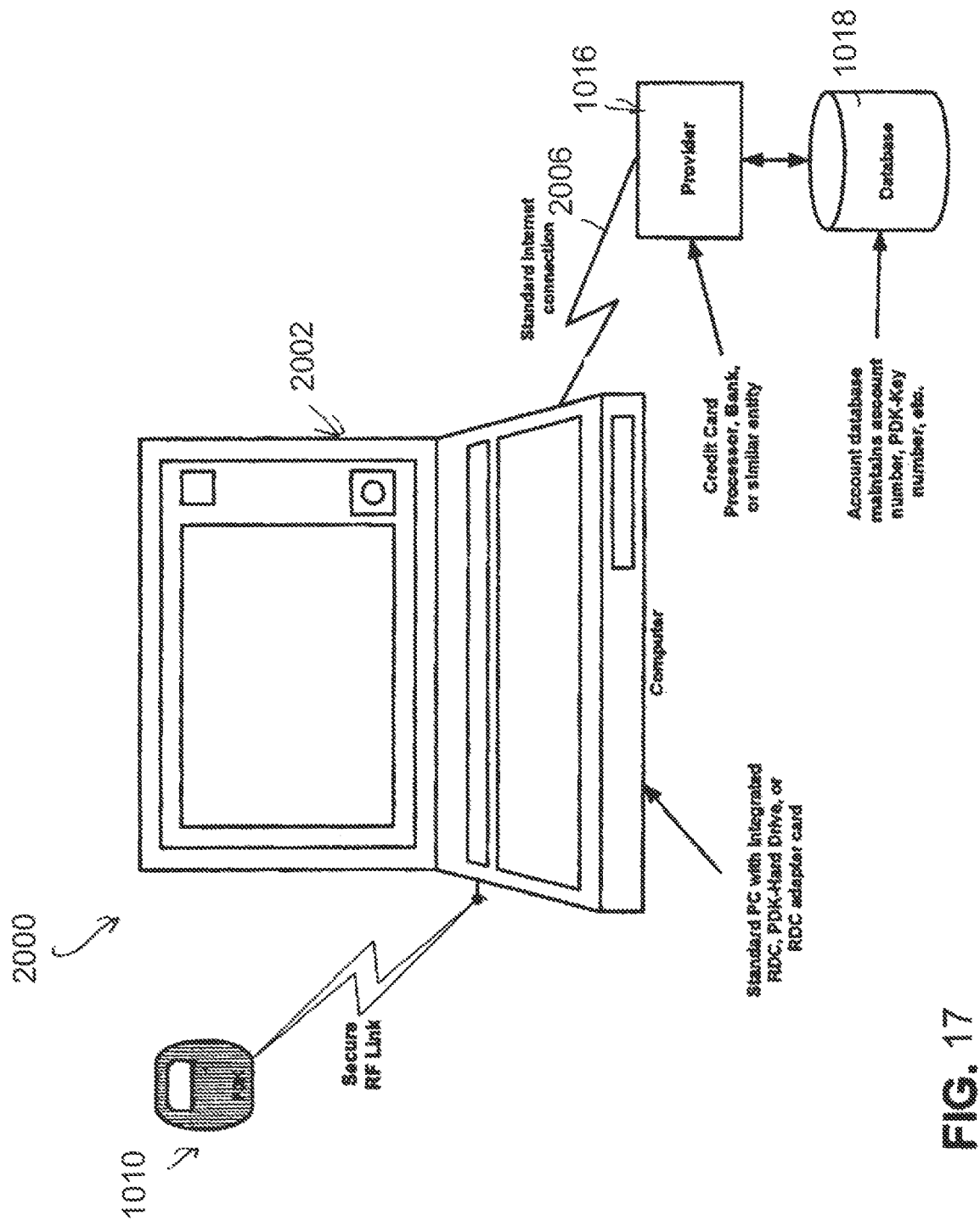
FIG. 17 is a schematic view of a PDK key system embodiment of the invention.

In another embodiment, illustrated at 2000 in FIG. 17, the PDK 1010 interfaces with a computer 2002 through a secure RF link 2004. The computer 2002 is a standard personal computer, with integrated RDC, PDK hard drive or RDC adaptor card. The computer 2002 communicates with the provider 1016 through a standard Internet connection 2006. The provider 1016 communicates with the database 1018 in a manner as described in the embodiment described above.

Once in possession of a PDK key, a user optionally registers the key with the key manufacturer or a central key database. No usage data, credit or bank account numbers, hard drive IDs, etc. is maintained in the manufacturer's database, only user verification information. This information includes a customer account number, indicating for some embodiments, a customer's record within the manufacturer's database, customer name, address and phone, key number, and status of key, in-use, stolen, lost and so forth. This information is used primarily for verification purposes during lost key replacement procedures.

The data fields stored in PDK keys include a user label which includes user text label in an unprotected field. The data fields also include an account number, which is a user's manufacturer account number, which is in a protected field. The data fields also include a key number which is a unique key identification and is a protected field.

The PDK key communicates with one of three basic implementations of a PDK-RDC which include POS RDC, a standard credit card swipe type device with an integrated RDC. A second implementation is an RDC adaptor, which is an add-on PC board RDC, interfacing via USB, firewall, PC card, expansion slot and so forth. A third implementation is a PDK hard drive which is a standard hard drive with an integrated RDC.

POS RDC devices are used in stores at checkout lanes, purchase counters, hand-held swipes, and so forth. RDC adaptors or PDK hard drives are intended for PC based use.

Physical cards such as credit/debit card accounts, bank accounts, membership accounts, or similar types of accounts, intended for use with the PDK LAS technology are conventional cards. No changes are required to such cards in order to ready them for use with the PDK LAS technology. From a consumer standpoint, this feature, along with an ability for a PDK-key to be purchased and assigned to an object at any point, enables easy acceptance of the technology.

Additionally, the PDK-LAS technology offers great flexibility in how PDK-keys are distributed, assigned, and used. For example, providers may optionally allow dynamic key assignment, assigning keys at a later date, assigning multiple keys to the same account and so forth, and users may elect to use one PDK key for all their PDK based security needs, i.e. one PDK key can be assigned to multiple accounts, PDK hard drives, and other PDK based products.

Specific examples illustrating uses of the PDK linked account embodiments are described as follows. These examples are presented to show particular applications of the PDK linked accounts and are not intended to limit embodiments of the invention.

In a first example, a user wishes to assign a key to a new PDK linked account. The user logs onto a provider's site over the Internet via the user's personal computer, in one embodiment. The user inputs whatever validation the provider typically requires. Sufficient data is requested by the provider during this transaction to authenticate the user. An RDC reads the user's PDK key data and transmits the data to the provider. The provider confirms the user's request to linle the PDK key to the account. Once confirmed, the PDK key data is permanently stored in the provider's database as a master PDK key and can only be changed by directly contacting the provider.

In one other embodiment, users phone providers directly and verbally relay all required information, including master PDK key data, printed on a card included with the PDK key at purchase. For users with Internet access but no RDC, this information is hand entered on the provider's website.

In a second example, a user wishes to assign additional keys to a PDK linked account. The user logs onto a provider site and inputs whatever validation the provider typically requires. The user ensures that the assigned master PDK key is within the vicinity of RDC. The RDC reads the master and additional PDK key data and transmits the data to the provider. The provider confirms a user's request to link additional PDK keys to the account number, or change PDK keys or remove PDK keys. Once confirmed, the updated PDK key data is stored in the provider's database along with master PDK key data.

In an alternate embodiment, to facilitate users without an RCD equipped personal computer and Internet access, users may phone providers directly and verbally relay all required information, including both master and additional PDK key data, printed on cards (or similar) included with PDK keys at purchase. For users with Internet access but no RDC, this information may be hand entered on the provider's website.

In a third example, the user wishes to utilize a PDK linked account to purchase a product at a store. The user ensures that an assigned PDK key is within the vicinity of POS RDC at a checkout counter. The RDC reads the user's PDK key and transmits data, along with the user's account number, acquired using currently accepted procedures, to the provider for verification. If more than one PDK key is read at the counter, either data from all of the PDK keys may be transmitted to the provider or User Labels may be displayed on POS RDC to enable the user or clerk to select the appropriate PDK key. The provider looks up the account record in its database using the transmitted account number and compares the transmitted PDK key data to information stored in the record. if a match is confirmed, the sales transaction is completed normally. If not confirmed, the transaction cannot be completed.

A fourth example is one where a user desires to utilize a PDK linked account to purchase a product on-line or the user wishes to access account information on line. The user must ensure that an assigned PDK key is within the vicinity of RDC. The RDC reads the user's PDK key and transmits data, along with the user's account number, acquired using conventional techniques, to the provider for verification. If more than one PDK key is read at RDC, either data from all PDK keys is transmitted to the provider or User Labels are displayed on a computer screen to enable the user to select the appropriate PDK key. The provider looks up the account record in its database using the transmitted account number and compares the transmitted PDK key data to information stored in the record. If a match is confirmed, the transaction/session is completed normally. If not confirmed, the transaction/session cannot be completed.

A fifth example is one where the user loses a PDK key. After an initial master PDK key setup, users are encouraged to immediately assign an additional PDK key, which serves as a day-to-day key, and store the master PDK key in a safe location. If the day-to-day key is lost, the master is usable to assign the new day-to-day key. As a last resort, for users losing all PDK keys, the key manufacturer may be contacted and, after authentication is performed, instructed to ship a replacement PDK key.

Turning now to the drawings and referring initially to FIG. 1, there is depicted a method of managing digital rights in accordance with the present invention. First, a new user requests a physical electronic key or data unit from a key provider (step 10). The key provider may offer a web site on the Internet, a toll free telephone number, and/or retail outlet where the key may be acquired. In addition, the key provider may allow a key to be requested in writing, preferably using a form designed by the key provider. In one model the user may acquire as many keys as desired, while in another model each user is only entitled to a single key.

Second, in response to the user's request for a physical key, the key provider establishes a new secure account for that new user in a secure user account database (step 12). The new account may include the following data fields: account number, password, software encryption key, user label, number of users (linked to account), address, telephone number, e-mail address, and custom fields. The custom fields may, for example, include demographic information such as the user's age, gender, marital status, income level, interests, hobbies, etc. The physical key may include the following data fields: user label, account number, software decryption key, and a custom storage area. The user label and the account number serve as a first activation code (or key code) for the acquired physical key. All data fields on the physical key, except for the user label, are preferably encrypted. To allow the user to view his or her account in the future, the user is preferably assigned a login name and the above-noted password.

Third, the key provider ships the physical electronic key to the new user via a package courier such as the U.S. Postal Service, United Parcel Service, or Federal Express (step 14). In one pricing model the physical key is sent to the user at no charge, while in another pricing model the physical key must be purchased by the user. If the physical key must be purchased by the user, either the user must provide credit/debit card information to the key provider in step 10 to pay with a credit/debit card, or the key provider includes an invoice with the shipped key in step 14.

Figure 2:
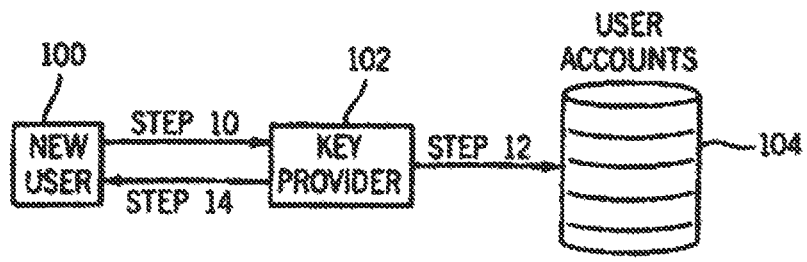
FIGS. 2, 3, and 4 are block diagrams of portions of a DRM system for implementing the method in FIG. 1.

FIG. 2 is a block diagram of a system for implementing steps 10, 12, and 14 of the method of managing digital rights. The system includes the new user 100, the key provider's web site 102, and the user account database 104.

Referring back to FIG. 1, fourth, the user transmits his or her activation code in the physical key to a digital content provider, who may have a cooperative relationship with the key provider, and requests to purchase digital content (music, video, or software) from that content provider (step 16).

The content provider may offer a web site on the Internet containing a listing of digital content available for purchase. To transmit the activation code to the content provider via the web site, the user may manually enter the activation code onto a secure page of the web site. Alternatively, the transmission of the activation code may be automatically implemented with wireless technology. Specifically, the user's computer may be outfitted with a detector that detects the activation code in the user's physical key and then relays the activation code to the content provider via the web site. The content provider may be affiliated with the key provider or may be separate from the key provider but have an arrangement therewith.

Fifth, the content provider requests the key provider to verify the activation code transmitted by the user (step 18). The content provider may send this request to the key provider's web site.

Sixth, the key provider in turn accesses the user's account in the user account database and determines whether the activation code is in fact valid (step 20). The key provider may also determine whether the activation code is associated with the user that transmitted the activation code to the content provider. If the activation code is rejected as being invalid, the content provider is so informed and the content provider in turn will not honor any request by the user to purchase digital content. If, however, the activation code is accepted as being valid, the content provider is so informed and the purchase transaction proceeds. As used herein, the term "key provider" generically refers to the entity or entities that manufacture, distribute, and validate the physical keys. These functions may actually be performed by multiple entities at different locations or by a single entity at a single location.

Seventh, after securing validation of the first activation code in the physical key, the content provider pulls the requested digital content from a digital content database/library, marks the digital content with a second activation code (or unlock code) associated with the first activation code in the physical key, and encrypts the marked digital content (step 22). The second activation code in the digital content may simply be the same as the first activation code in the physical key, but at least partially encrypted for security. In one embodiment, the "key-secured" content file includes the following data fields: user label, account number, and digital content. The user label and the account number serve as the second activation code for the digital content. If the content is merely for sampling (described in connection with FIG. 6), the file may include such additional data fields as a receiver/decoder circuit identification number, hour stamp, and life hours. All data fields on the content file, except for the user label, are preferably encrypted.

Eighth, the content provider delivers the encrypted digital content to the user (step 24). The encrypted digital content may be delivered by downloading the encrypted digital content to the user's computer while the user is online at the content provider's web site, by attaching the digital content to an e-mail addressed to the user, or by shipping a disk containing the encrypted digital content to the user via a package courier. The user may pay for the digital content either by providing credit/debit card information to the content provider in step 16 or by paying off of an invoice included with delivered digital content. If the digital content is delivered online, the user is preferably required to provide the credit/debit card information and have such information approved as a prerequisite to delivery of the digital content. If the user possesses more than one physical electronic key and would like the acquired digital content to function with each of the user's keys, all of the activation codes are applied to the digital content. The content provider charges the user based on the number of keys with which the user would like the digital content to function. For example, the user may be charged the same amount for each activation code, or may be charged a larger amount for one activation code and lesser amounts (e.g., surcharges) for additional activation codes.

Figure 3:
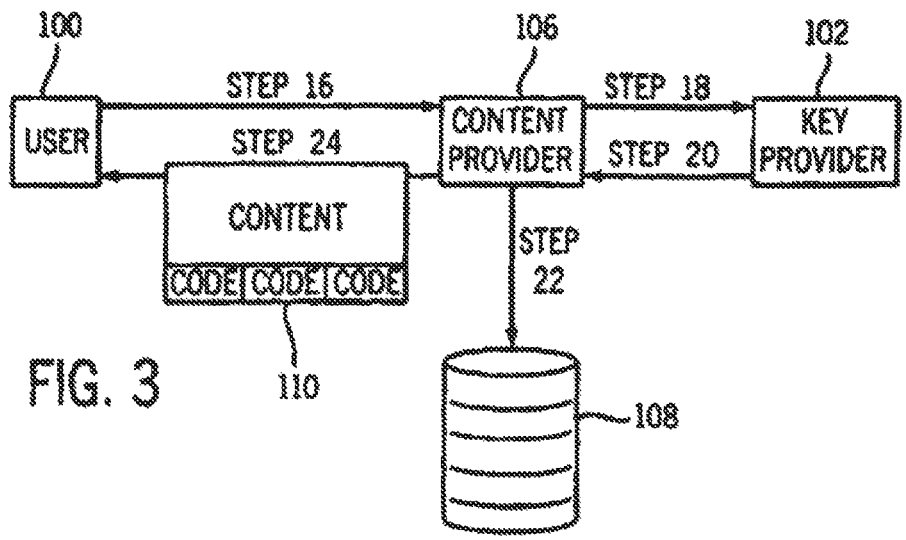

FIG. 3 is a block diagram of a system for implementing steps 16, 18, 20, 22, and 24 of the method of managing digital rights. The system includes the new user 100, the content provider 106, the key provider's web site 102, the digital content database 108, and the acquired digital content 110.

Returning to FIG. 1, ninth, the user enters the encrypted digital content into a playing device of a type suitable for playing the digital content (step 26). The device may, for example, be an MP3 player, a personal computer, a DVD player, a CD player, a cellular phone, or other portable device. In one embodiment, the device contains a wireless transceiver adapted to receive a radio frequency signal transmitted by a corresponding wireless transceiver in the user's physical electronic key. The wireless transceiver in the device is optionally tracked and "secured" for audit purposes by permanently including a unique identifier assigned by the device manufacturer in the transceiver.

Tenth, with the user's physical electronic key within a short range (e.g., few meters) of the playing device, the playing device reads (1) the first activation code carried in a secure radio frequency signal transmitted by the transceiver in the physical key to the transceiver in the device and (2) the second activation code marked on the encrypted digital content (step 28). The device contains decryption software or hardware for decrypting the encrypted digital content to the extent necessary to read any encrypted portion of the second activation code.

Eleventh, the playing device compares the first activation code and the second activation code and determines whether the first activation code is associated with the second activation code (step 30). Steps 29 and 30 may be performed, for example, when the user presses a "play" button on the playing device or when the user first enters the encrypted digital content into the playing device. If the first activation code is associated with the second activation code, the device decrypts and plays the digital content. If the first activation code is not associated with the second activation code, the device does not play the digital content. If the second activation code is simply the same as the first activation code, then the foregoing comparison determines whether there is a match between the first activation code and the second activation code. In a preferred embodiment, the device continues to play the digital content only while the physical key is sufficiently close to the device to communicate the first activation code to the device and allow the device to compare the first activation code to the second activation code at least partially encrypted with the digital content even while the digital content is being played. If the physical key is moved out of range, the device is no longer enabled to decrypt and play the digital content. In an alternative embodiment, once the device is initially enabled to decrypt and play the digital content, the device remains enabled until either the "play" function is stopped, a play track/song ends, or the digital content is removed from the device, even if the physical key is moved out of range such that the key can no longer communicate the first activation code to the device.

Figure 4:
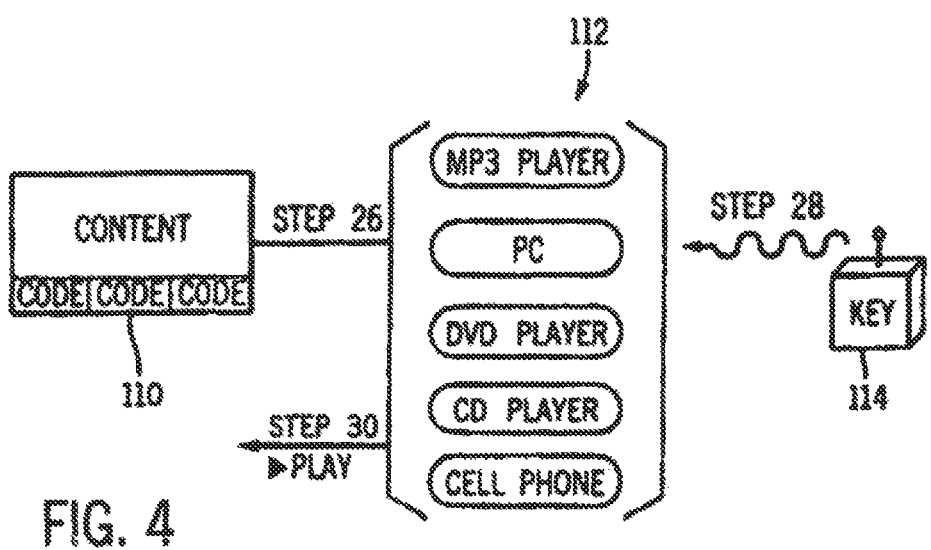

FIG. 4 is a block diagram of a system for implementing steps 26, 28, and 30 of the method of managing digital rights. The system includes the encrypted digital content 110, the key-enabled playing devices 112, and the user's physical electronic key 114.

As stated above, the user's physical electronic key and the key-enabled playing device contain respective wireless transceivers to communicate the activation code in the key to the device. In a preferred embodiment, the transceivers are small, inexpensive Bluetooth radio chips that operate in the unlicensed ISM band at 2.4 GHz and avoid interference from other signals by hopping to a new frequency after transmitting or receiving a packet. The radio chips are plugged into electronic devices, which can then communicate over short distances and through obstacles by means of radio waves. Bluetooth is a term used to describe the protocol of a short range (e.g., about 10 meters) frequency-hopping radio link between devices containing the radio chips. These devices are then termed "Bluetooth-enabled." The secure radio link replaces a cable that would otherwise be used to connect the devices. Further details concerning Bluetooth wireless technology may be obtained from www.bluetooth.com.

Wireless technologies other than Bluetooth may be used to communicate the activation code from the user's physical electronic key to the playing device. One example of an alternative wireless technology is known by a trade term "Wi-Fi," which is short for wireless fidelity and is another name for IEEE 802.11 b. Products certified as Wi-Fi by the Wireless Ethernet Compatibility Alliance (WECA) are interoperable with each other even if they are from different manufacturers. A user with a Wi-Fi product can use any brand of access point with any other brand of client hardware that is built to the Wi-Fi standard.

In other alternative embodiments, the communication between the user's physical electronic key and the playing device is not wireless. Rather, in one alternative embodiment, the user's physical electronic key communicates the activation code to the playing device via a transmission line such as a serial cable that plugs into the key at one end and the playing device at the other end. In another alternative embodiment, the key is a smart card or magnetic card into which the activation code is encoded, and the key is configured to physically fit into a card reader slot on the playing device.

The above-described DRM method and system for implementing the method are advantageous in that they afford the key holder with tremendous versatility in copying and using encrypted digital content for personal use. At the same time, the rights of the content provider are protected because only the key holder with a key-enabled device can use the encrypted digital content. The key holder can copy the encrypted digital content as many times as desired, but can only play the encrypted digital content on a key-enabled device that is enabled with the physical electronic key coded to decrypt the encrypted digital content. Thus, the digital content, even when copied, remains personal to the key holder. Individuals other than the key holder cannot use the encrypted digital content, even if they copy it, because both the original and copies of the encrypted digital content are still encrypted and the individuals do not hold the physical electronic key coded to decrypt the digital content.

A core element of the present invention is the concept of a portable, physical electronic key that is personal to a particular user. The physical key represents a DRM solution that fully addresses the needs of both consumers and publishers of digital content. The physical key is permanently associated with a user's digital content library. At the time of content acquisition, the physical key becomes permanently associated with the newly acquired content. The user is now "linked" to that acquired content. A user (e.g., individual or family) may own as many physical keys as desired, but every piece of encrypted digital content purchased is tied to one specific key. The user may duplicate or transfer the acquired content to any media or device for playback as many times as desired, as long as the associated physical key is present. Thus, the present invention guarantees that the acquired content is played only by the user who has legitimately paid for it. The present invention gives consumers unprecedented freedoms and conveniences to use legitimately purchased content while still fully protecting content providers' rights.

Figure 5:
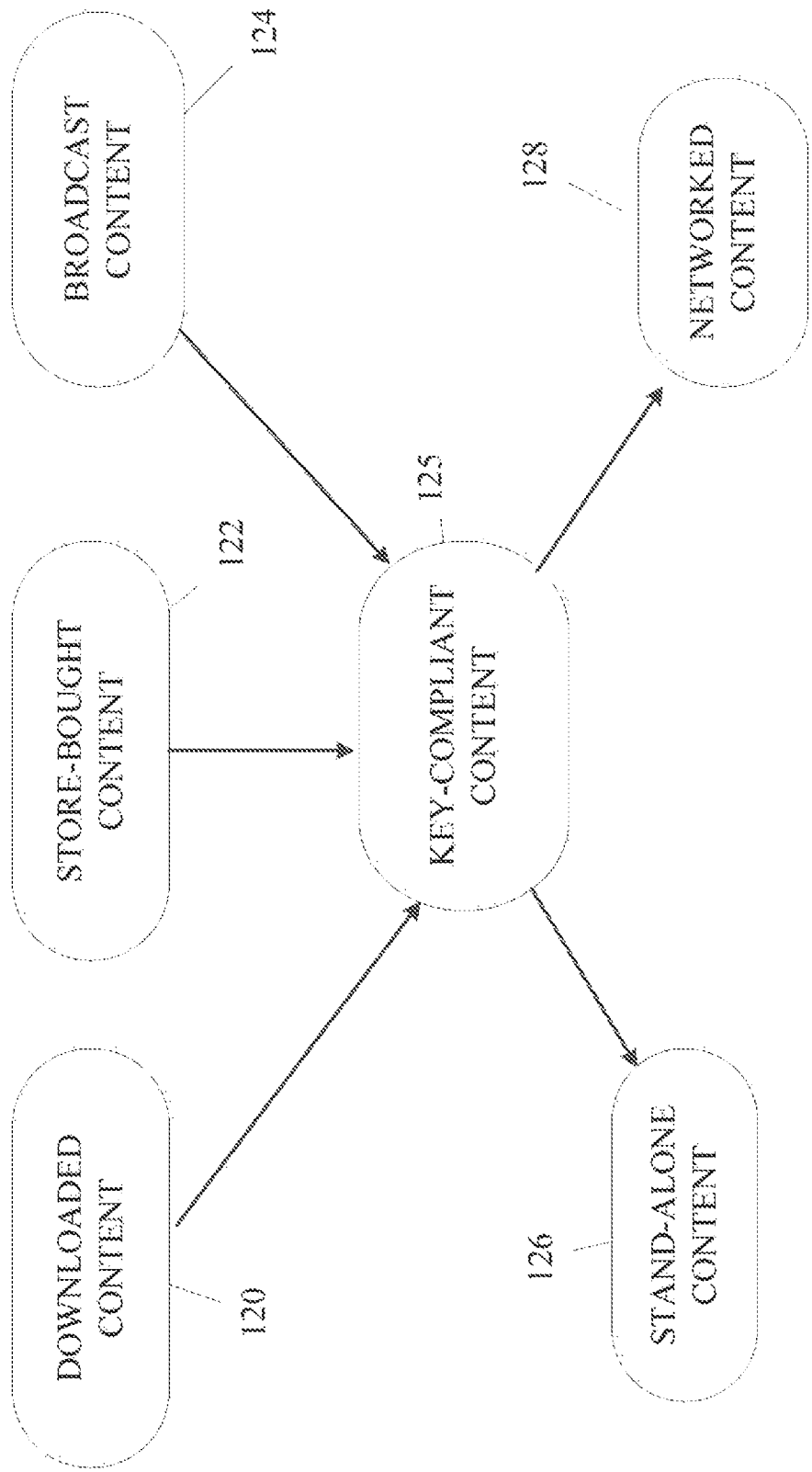
FIG. 5 is a conceptual model of core options for acquiring digital content that can be encoded to produce key-secured content and core options for playing back the key-secured content.

Referring to FIG. 5, the present invention fully supports the use of "keysecured" digital content 125 with all core content acquisition options and all core playback options. The key-secured digital content 125 is encoded with a second activation code associated with a first activation code stored on the user's physical electronic key. The core acquisition options include downloaded content 120, store-bought content 122, and broadcast content 124. The core playback options include stand-alone devices 126 and networked devices 128. Each of these options are described in further detail below.

Referring to FIG. 6 generally, as already noted in FIGS. 1 through 4, a primary application of the present invention is its use in the downloading of digital content from the Internet. A consumer shops a content distributor's website and selects a piece of content they wish to purchase (music, movies, software, E-books, etc.). The consumer then provides the web site with standard on-line purchase information including the selection's title and method of payment, as well as their physical electronic key information. Transparent to the consumer, the distributor's web site links to the key provider's web site and transmits the physical key information for validation. The key provider's web site then provides the distributor's web site with the information required to prepare the acquired content for secure shipment to the consumer (or notification that the physical key was invalid). The key provider's web site records the transaction for later billing. Finally, the distributor's web site retrieves a copy of the digital content from its library, permanently links it to the consumer's physical key (by using the key's information to encrypt it), and transmits the secured content to the consumer. The consumer is now free to duplicate the content as often as desired, and to play the content on any key-enabled playback device.

Referring to the specifics of FIG. 6, the process of implementing the core acquisition option of downloaded digital content 120 (see FIG. 5) proceeds as follows. At step 130, a receiver/decoder circuit 140 retrieves an account number from a consumer's physical key (transponder) 142 over a secure RF line. At step 131, the consumer enters such data as a password, purchase selection, and method of payment via the consumer's personal computer 144. The data is transmitted to a content distributor's web site 146 from the consumer's personal computer 144. At step 132, the content distributor's web site 146 transmits the account number and password to a key provider's web site 148. At step 133, the key provider's web site 148 authenticates all data against its database 150 and, if authentic, returns such information as the account number, user label, number of users, and software encryption key to the distributor's web site 146. If the data is not valid, the key provider's web site 148 sends a message to the distributor's web site 146 indicating the same. A counter, used for the key provider's billing purposes, is incremented. At step 134, the distributor's web site 146 pulls the purchased content file from its database 152, encrypts it with the software encryption key it received in step 133, and builds a final key-secured content file that is then transmitted to the consumer's personal computer 144. Charges are assessed based on the number of users, etc. and billed to the consumer according to the method of payment. At step 135, invoices 154 are generated and sent to content distributors by the key provider's web site 148 on a regular cycle.

Optionally, to enable content providers to offer sample content (e.g., limiting playback to the device on which the content was originally downloaded, for a specified period of time) a special "enhanced" version of a receiver/decoder circuit 140 can be produced. These enhanced receiver/decoder circuits (primarily for PC's) would each include a unique identification number and additional functionality enabling them to "talk" to a key provider's web site 148 to acquire secured timing information. Sample content files may include the following information (in their encrypted header section):

identification number of enhanced receiver/decoder circuit used for downloading and transmitted by the receiver/decoder circuit to the key provider's web site at the time of content purchase;

hour stamp (i.e., the hour in which the content was downloaded; and life hours (i.e., number of hours content remains valid, such as perpetual, one hour, 24 hours, 48 hours, etc.).

The above information is used by an "enhanced" receiver/decoder circuit during playback to determine whether a content file has "expired" or is attempting to play on an unauthorized device (i.e., any device except the device on which the content was originally downloaded). This capability allows content distributor web sites to distribute limited-use samples with associated tiered-pricing models.

Referring to FIG. 7 generally, the present invention can be extended to store-bought content. To fully integrate store-bought content into the present invention, traditional store-bought content is modified in two ways. First, the content is distributed in a copy protected format (e.g., using any valid copy protection technology). Second, the content contains a unique content serial code. The content serial code may be contained either directly in the digital content or as a physical label. Each content serial code is designated by a content distributor during manufacturing and stored in the key provider's database. This database is later used to validate that each content serial code is unique and used only a prescribed number of times. To a consumer, a content serial code on their newly purchased store-bought content represents a download of a key-secured version of that content for free or a prescribed price. This key-secured copy provides the consumer with exactly the same advantages and freedoms as any other key-secured content. From the consumer's standpoint, the download process occurs exactly as any other standard key-secured content download with the exception of how the payment is handled. The "payment" is the content serial code. By providing all of the advantages of the present invention to consumers of legacy-capable store-bought content (by way of "content serial code downloads"), the scheme provides the industry with the first complete DRM solution.

Referring to the specifics of FIG. 7, the process of implementing the core acquisition option of store-bought digital content 122 (see FIG. 5) proceeds as follows. At step 160, a receiver/decoder circuit 170 retrieves an account number from a consumer's physical key (transponder) 172 over a secure RF link, and the consumer's personal computer 174 reads a content serial code from the store bought content 122. The store-bought content 122 contains the content serial code that uniquely identifies the content. The format of the content serial code may, for example, be PPPP.FFF.0123456789 where PPPP is a provider identification, FFF is a facility identification, and the numbers represent a sequence number. The store-bought content 122 incorporates a copy protection scheme such as Macrovision™, Key2audio™, or SafeAudio™. Disc "copy flags" (specified in SDMI standards) may also be set to further inhibit duplication efforts.

At step 161, the consumer enters such data as a password and purchase selection via the consumer's personal computer 174. The previously-read content serial code specifies that the method of payment is to a "content serial code-credit" (i.e., there is typically no charge for this download because the content serial code confirms that the download in process is of content that the consumer has already legitimately purchased). The data is transmitted to a content distributor's web site 176 from the consumer's personal computer 174. At step 162, the distributor's web site 176 transmits the content serial code, account number, and password to a key provider's web site 178. At step 163, the key provider's web site 178 authenticates all data against its databases 180 and 182 and, if authentic, returns such information as the account number, user label, number of users, software encryption key, and paid-flag (indicating the content serial code has been validated) to the distributor's web site 176. The key provider's web site 178 now sets the paid-flag to disable any further downloads and records the account number field in the content serial code database 182 for auditing purposes. If the data is not valid, the key provider's web site 178 sends a message to the distributor's web site 176 indicating the same. A counter, used for the key provider's billing purposes, is incremented. Each entry in the content serial code database 182 may include the following data fields: CDC #, paid-flag, and account number. At step 164, the distributor's web site 176 pulls the content file from its database 184, encrypts it with the software encryption key it received in step 163, and builds a final key-secured file that is then transmitted to the consumer's personal computer 174. No charge is typically assessed because a valid content serial code serves as "payment" for the download. At step 165, invoices 186 are generated and sent to content distributors by the key provider's web site 178 on a regular cycle.

Referring to FIG. 8 generally, the present invention can be extended to broadcast content. To fully integrate broadcast content into the present invention, traditional broadcast content is only minimally modified. The modification is that the broadcast content is transmitted in a copy protected format (such as the DVD standard known as Content Scramble System (CSS)). The remainder of the process is described below. A key-enabled recording device, incorporating a unique identifier, receives copy-protected broadcast content. If only playback of the broadcast content is desired, basic decoding (e.g., CSS) is performed and the broadcast content is sent on for playback. If the consumer wishes to record the broadcast content, however, the recording device performs additional steps prior to sending the broadcast content on for playback. The recording device connects to the key provider's web site to validate the recording device's internal identifier and the consumer's physical key. If both are valid, the recording device translates the broadcast content into a key-secured format by encoding it with the consumer's activation code, and then stores the key-secured content file, with its identifier permanently embedded within, for later use. The end result is key-secured broadcast content that provides the owner of the associated physical key all the freedoms and advantages of the present invention. Although the content was originally broadcast, it cannot be illegally copied or distributed. The present invention can be applied to pay per view offerings, as well as standard broadcast material.

Referring to the specifics of FIG. 8, the process of implementing the core acquisition option of broadcast digital content 124 (see FIG. 5) proceeds as follows. At step 180, a receiver/translator/recording device 190 receives digitally broadcast content in copy-protected format from a source 192 such as satellite, cable, Internet, or over-air. The broadcast content may be copy protected using a copy-protection technology such as an enhanced CSS scheme. If a consumer wishes to only play (not record) the broadcast content, basic decoding (e.g., CSS decoding) is performed and the broadcast content is passed through to presentation device 194 for playback. The remaining steps below may be skipped.

If, however, the consumer wishes to record the broadcast content, the following additional steps are performed prior to sending the broadcast content on for playback. At step 181, the receiver/translator/recording device 190 retrieves an account number from the consumer's physical key (transponder) 196 over a secure RF link. At step 182, the receiver/translator/recording device 190 transmits the account number and its recorder serial code to a key provider's web site 198. Each device 190 contains a recorder serial code that uniquely identifies the device. The format of the recorder serial code may, for example, be MMMM.FFF.0123456789 where MMMM is a manufacturer identification, FFF is a facility identification, and the numbers represent a sequence number. At step 183, the key provider's web site 198 authenticates the data against its databases 200 and 202 and returns an "approved" or "rejected" response. A counter, used for the key provider's billing purposes, is incremented. At step 184, if a "rejected" response is received, the broadcast content cannot be recorded. If an "approved" response is received, the receiver/translator/recording device 190 translates the decoded content into a key-secured format by encoding it with the consumer's activation code, and records the key-secured content, with the recorder serial code permanently embedded within, to a storage device (that can optionally be an external device). The broadcast content can now be copied to and played back on any key-enabled playback device. At step 185, invoices 199 are generated and sent to content distributors by the key provider's web site 198 on a regular cycle. While providing excellent additional security and protections, steps 182 and 183 are not mandatory for the present invention to function with broadcast content. It may be desirable, for cost purposes, to produce receiver/translator/recording devices 190 not capable of communicating with the key provider's web site 198.

Figure 9A:
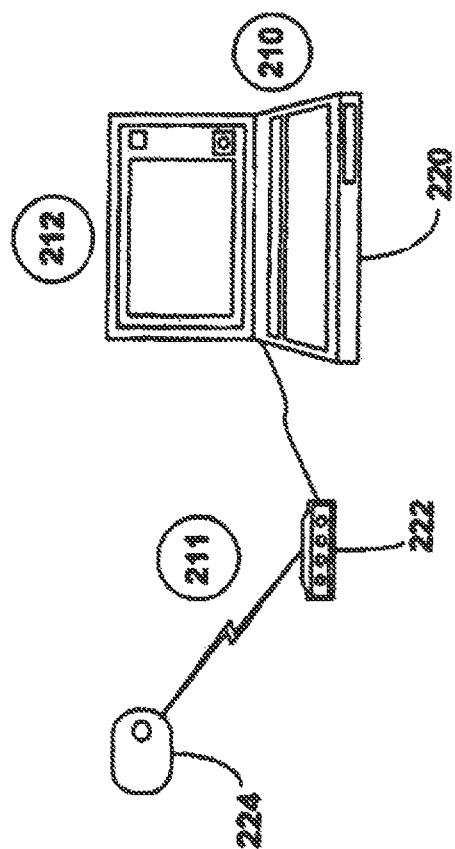
FIGS. 9a and 9b are block diagrams for implementing a core playback option of stand-alone devices.
Figure 9B:
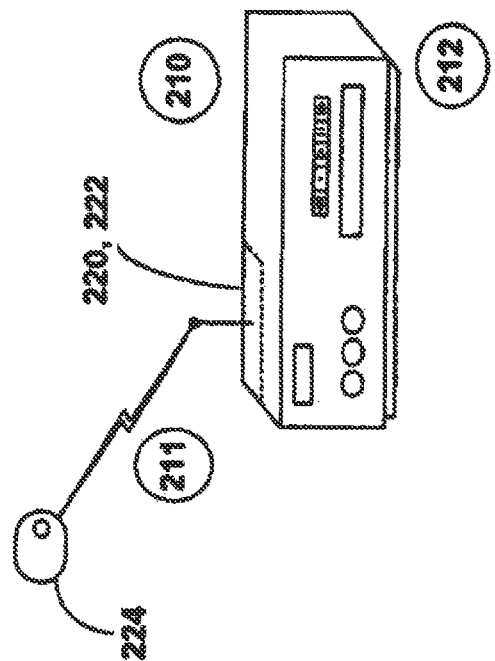

Referring to FIGS. 9a and 9b generally, having acquired key-secured digital content and produced copies for playback on various devices such as a portable CD player, personal computer, home theater, etc., a consumer is now ready to use the digital content. Playback of key-secured content occurs as follows. A key-enabled playback device transparently reads information from a consumer's physical key and from the content file the consumer has requested to play. The pieces of information are then compared to validate that the physical key "matches" the content to be played. If the elements match, the device begins playback of the content. If the elements do not match, the device will not play the content and, depending upon the device's capabilities, may display an "invalid content" message. From a consumer's point of view, when used with legitimately-acquired content, the process is entirely transparent, effortless, and non-intrusive. The consumer is free to use their content on any key-enabled playback device, with the only restriction being that the content can be played only when the associated physical key is present. As noted above, the present invention gives consumers unprecedented freedoms and conveniences to use legitimately purchased content while still fully protecting content providers' rights.

Referring to the specifics of FIGS. 9a and 9b, the process of implementing the core playback option of stand-alone devices 126 (see FIG. 5) proceeds as follows. At step 210, a consumer requests playback of a key-secured content file via a playback device 220. The playback device 220 may, for example, be the consumer's personal computer (FIG. 9a) or a stereo amplifier (FIG. 9b) with integrated compact disc reader/player. At step 211, a receiver/decoder circuit 222 searches for a physical key (transponder) 224. The circuit 222 may be a separate component from the playback device 220 as in FIG. 9a or integrated into the playback device 220 as in FIG. 9b. If the physical key is not found, the playback device 220 displays an "invalid content" message. If the physical key is found, the receiver/decoder circuit 222 retrieves all available information from the physical key 224 over a secure RF link. At step 212, the user labels in the physical key 224 and the key-secured content file are compared. If the user labels do not match, the playback device 220 displays an "invalid" message. If the user labels do match, the receiver/decoder circuit 222 retrieves the software decryption key from the physical key 224 over the secure RF link between the physical key 224 and the playback device 220 and begins decryption of the encrypted portion of key-secured file. When the account number is decrypted, it is matched against the account number retrieved from the physical key 224. If the account numbers do not match, the playback device 220 displays an "invalid content" message. If the account numbers do match, the software decryption key is used by the playback device 220 to decrypt remaining data in the key-secured file for playback. The user label and the account number in the physical key serve as a first activation code, and the user label and the account number in the content file serve as a second activation code. These activation codes must match (or have some other predetermined association) in order for playback to proceed.

Referring to FIG. 10 generally, while stand-alone playback devices (e.g., CD players, pcs, DVD players, etc.) are currently the norm, the convergence of these devices and the Internet will lead to an environment where centralized digital distribution systems proliferate. Security of content in these environments is critical yet challenging to accomplish without imposing great restrictions. The present invention can provide security to a centralized digital distribution system and, in addition, offers many important enhancements that greatly increase the convenience and usability of such a system. These enhancements include integration of the physical key into a portable handheld computer which then doubles as the system remote. In addition to controlling all networked components, the remote is used for tasks such as purchasing content from the Internet, and tracking the movement of a user throughout a facility to provide automatic "content following" (i.e., where content playback follows the user from room to room). The centralized nature of the digital content distribution system means that only one storage device is required to maintain a consumer's entire digital content library (e.g., music, movies, software, E-books, etc.) and to feed that content to any networked playback device.

Referring to the specifics of FIG. 10, there is shown a centralized digital content distribution system for implementing the core playback option of networked devices 128 (see FIG. 5). The system is used in an establishment such as a residence or entertainment facility. The system includes a digital content server 310, a distribution hub 312, a plurality of remote clients 314, and a portable remote control 316. The digital content server 310 stores digital content acquired from a source 318 such as satellite, cable, Internet, or over-air. In addition, the digital content server 310 may store digital content uploaded from a standard component 324. The plurality of remote clients 314 are located in different rooms of the establishment and linked to the digital content server 310 via the distribution hub 312 or switch. The remote clients 314 are linked to the distribution hub 312 by a backbone transmission network 315. The backbone transmission network 315 may be wireless or wired with fiber optic cables, coaxial cables, or twisted pair cables, may employ a networking protocol such as Ethernet, Wi-Fi, Arcnet, or ATM (Asynchronous Transfer Mode), and may employ a communications protocol such as TCP/IP. Each remote client 314 includes a network interface card (NIC) for interfacing with the backbone transmission network 315.

The remote control 316 is adapted to communicate with each of the remote clients 314 and select the digital content stored in the digital content server 310. The remote control 316 is essentially a personal digital assistant (i.e., hand-held computer) including a display and added remote control circuitry. The display may, for example, be a liquid crystal display (LCD). The added remote control circuitry includes "system remote" circuitry and "universal remote" circuitry.

The "system remote" circuitry in the remote control 316 is for establishing a first wireless transmission link 320 with each of the remote clients 314. The first wireless transmission link 320 may be a secure radio link (RF) as shown or an infrared link (IR). Upon establishing the first wireless transmission link 320 with one of the remote clients 314, the remote control 316 serves as a system remote capable of (1) displaying, scanning, and selecting the digital content available on the digital content server 310 and downloading the selected digital content from the digital content server 310 to the linked remote client 314 and (2) controlling the digital content server 310 to acquire or download digital content from a source 318 such as satellite, cable, Internet, or over-air. As used herein, the term "download" and similar variations thereof (e.g., downloaded, downloading, etc.) is intended to cover the transfer of content from one device to a receiving device whether the content is stored on the receiving device or merely "streamed" to the receiving device for immediate playback. The remote control 316 preferably includes a display for displaying the digital content. The display may, for example, be a liquid crystal display (LCD). As a user holding the remote control 316 moves from room to room of the establishment, the remote control 316 successively establishes wireless transmission links 320 with the remote clients 314 in the respective rooms. In this way, the digital content available on the digital content server 310 follows the user's movement from room to room.

In a preferred embodiment, the first wireless transmission link 320 is a secure radio link established by matching transceivers in the remote control 316 and each remote client 314. The matching transceivers are preferably small, inexpensive Bluetooth™ radio chips that operate in the unlicensed ISM band at 2.4 GHz and avoid interference from other signals by hopping to a new frequency after transmitting or receiving a packet. The radio chips are integrated into the respective remote control 316 and each remote client 314, which can then communicate over short distances and through obstacles by means of radio waves. Wireless technologies other than Bluetooth, such as Wi-Fi, may be used to communicate remote control signals between the remote control 316 and each remote client 314.

The "universal remote" circuitry in the remote control 316 is for establishing a second wireless transmission link 322 with standard components 324 connected to the remote clients 314. The second wireless transmission link 322 is preferably an infrared link (IR) as shown. Upon establishing the second wireless transmission link 322 with one of the standard components 324, the remote control 316 series as a universal remote capable of operating the standard component 324. The standard component 324 may, for example, be an audio receiver (stereo amplifier), an audiovisual receiver, a video monitor (television), etc. The standard components 324 may be physically separate from, but linked to, the respective remote clients 314 or may be physically integrated into the respective remote clients 314 like integrated device 324c.

The digital content stored on the digital content server 310 may be formatted as a compact disc (CD), digital video disc (DVD), MP3, electronic book, software, etc. When the remote control 316 is linked to one of the remote clients 314, a user may scan and select digital content to be downloaded from the digital content server 310 to the remote client 314 and converted by the remote client 314 to a standard playable format (e.g., analog format) that can be played on the associated standard component 324. The selected digital content is downloaded from the digital content server 310 to the remote client 314 as raw digital data packets. The remote client 314, in turn, converts the downloaded digital content to a standard component output(s) compatible with a standard component 324 connected to the remote client 314, and the standard component 324 plays the digital content. Ports may, for example, include S-Video, RCA jacks, serial ports, Universal Serial Bus, Ethernet, Wi-Fi, Firewire™, Bluetooth, RF, or other similar outputs. The standard component 324 incorporates, or is linked to, audio speakers for broadcasting any audio signals received from the remote client 314 and a video monitor for displaying any video signals received from the remote client 314.

All content is stored on the digital content server 310 digitally, and is key-secured if obtained via the download or broadcast acquisition options of FIGS. 6 and 8. If the digital content is key-secured, the plurality of remote clients 314 include decryption circuitry (i.e., receiver/decoder circuit) for unlocking the digital content. The digital content selected for download from the digital content server 310 to a remote client 314 preferably remains encrypted until converted to a standard component output(s) in the remote client 314. The remote client 3 14 acts as a converter between key-secured digital content from the digital content server 310 and the standard component output(s). To decrypt the selected digital content, the remote control 316 contains a physical key initially acquired from a key provider in accordance with the present invention. The digital content is initially acquired from a content provider 326 that marks the digital content with an activation code associated with the physical key. The decryption circuitry in the remote client 314 receives an activation code from the IS remote control 316 via the wireless transmission link 320 and is enabled to unlock and convert the digital content to a playable format if the activation code in the remote control 316 is associated with the activation code in the digital content. If the activation code in the remote control 316 is not associated with the activation code in the digital content, the remote client 314 will not unlock and convert the digital content.

In an alternative embodiment, the remote clients 314 are eliminated and the standard components 324 are linked directly to standard component outputs of the distribution hub 312 by the backbone transmission network 315. In this case, the distribution hub 312 serves as a switch, and the digital content server 310 contains the decryption circuitry for unlocking the digital content. As the digital content is decrypted, it is converted to a playable format and fed to the distribution switch 312 for delivery to the appropriate standard component 324. The decryption circuitry in the digital content server 310 receives the activation code from the remote control 316 and is only enabled to unlock and convert the digital content to a playable format if the activation code in the remote control 316 is associated with the activation code in the digital content.

Instead of decrypting the digital content so that it can be played, the digital content may be downloaded (or "passed through") in its encrypted format to a storage device such as a media burner 324a or computer hard disk 324b for storage thereon. When a user ultimately desires to play the stored digital content on a media player, the media player must contain the decryption circuitry for unlocking the digital content. After unlocking the digital content, the media player converts the unlocked digital content to a playable format and plays the digital content. The decryption circuitry in the media player receives the activation code from the remote control 316 or physical key with the same activation code. The media player is only enabled to unlock and convert the digital content to a playable format if the activation code in the remote control 316 or physical key is associated with the activation code in the digital content.

In addition to downloading selected digital content from the digital content server 310 to the remote clients 314, data (e.g., MP3, CD, DVD, software, etc.) from the standard components 324 can be uploaded to the digital content server 310 and stored digitally thereon. This allows for storage of legacy content on the digital content server 310.

Figure 11:
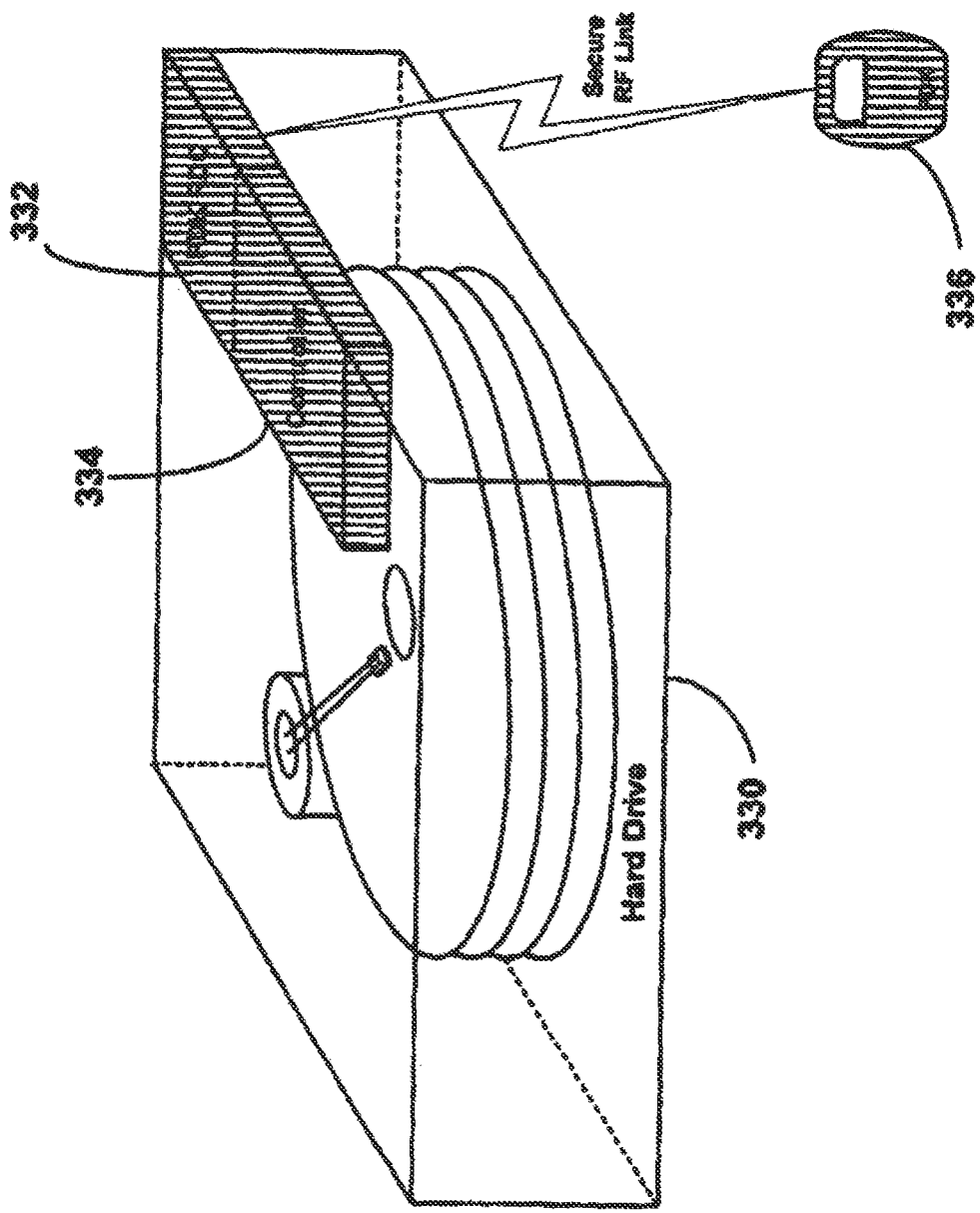
FIG. 11 is a block diagram of a standard computer hard drive incorporating an integrated PDK-RDC (receiver/decoder circuit) for the purpose of enabling multiple methods of securing digital content.

Referring to FIG. 11 generally, a digital content security system and method protects computers from unauthorized use and protects the digital content stored on computers from being wrongfully accessed, copying, and/or distributed. The basic components of the Personal Digital Key Digital Content Security System (PDK-DOSS) are (1) a standard hard drive device 330, with the addition of a PDK Receiver/Decoder Circuit (PDK-RDC) 332 integrated into the controller 334, and (2) a PDK-Key 336 associated with the PDK-RDC as described above. The standard computer hard drive 330 incorporates the integrated PDK-RDC 332 for the purpose of enabling multiple methods of securing digital content. Hard drives 330 incorporating a PDK-RDC 332 are referred to herein as PDK hard drives. While the PDK-DOSS diagrams show the PDK-RDC 332 as being integrated with the hard drive's controller 334, all OS-level protections described below can be implemented using externally-based PDK-RDCs.

A PDK hard drive 330 is similar to any standard, currently available hard drive with the exception of the PDK-RDC 332 (which is integrated into the drive's controller circuit 334). A PDK-RDC 332 is an integrated circuit able to process PDK-Key information, as well as encrypt/decrypt PDK-compliant digital content. Additionally, this circuit 332 is able to secure the hard drive 330 itself. This is implemented by the circuit 332 enabling or disabling the hard drive's controller 334 depending on whether an associated PDK-Key 336 (one which is uniquely and permanently associated with the PDK hard drive 330) is present. Each POK hard drive 330 would typically be delivered with its own POK-Key 336.

Secure RF communications between a PDK-Key 336 and its associated hard drive 330 occurs in the same manner as described above. It should be noted that software drivers can optionally be designed to allow for dynamic key assignment (assigning of keys after purchase to enable key swapping, or assigning of individual keys to multiple devices).

The PDK-Key and RDC technology is utilized to provide two categories of protection:

1) Hard drive access control—where an entire drive 330 is either completely accessible (unlocked) or inaccessible (locked), and/or individual data sectors or clusters of data sectors are optionally encrypted/decrypted, depending on whether the specific PDK-Key 336 associated (and shipped) with the drive 330 is within range. This category of protection can be accomplished transparently to the operating system (OS) responsible for managing the drive.

2) OS-level independent file protection—where the drive's RDC 332 functions independently of the drive 330 to protect individual files (typically copyrighted material) from wrongful copying. In this role, the RDC 332 works with any PDK-Key 336 (not just the one delivered with the drive 330) and any PDK-compliant file (they do not have to be stored on or associated with the hard drive 330). This category of protection requires an OS-level software driver be run under the OS responsible for managing the drive.

By utilizing these two categories of protection in various ways, four unique levels of content protection are enabled. Two of the levels (Drive-Level and Sector-Level) do not require external software support, while the remaining two (File-Level and Network-Level) require software drivers, as well as a stand-S alone application for Network-Level implementations. Each of the four levels is defined below.

Figure 12:
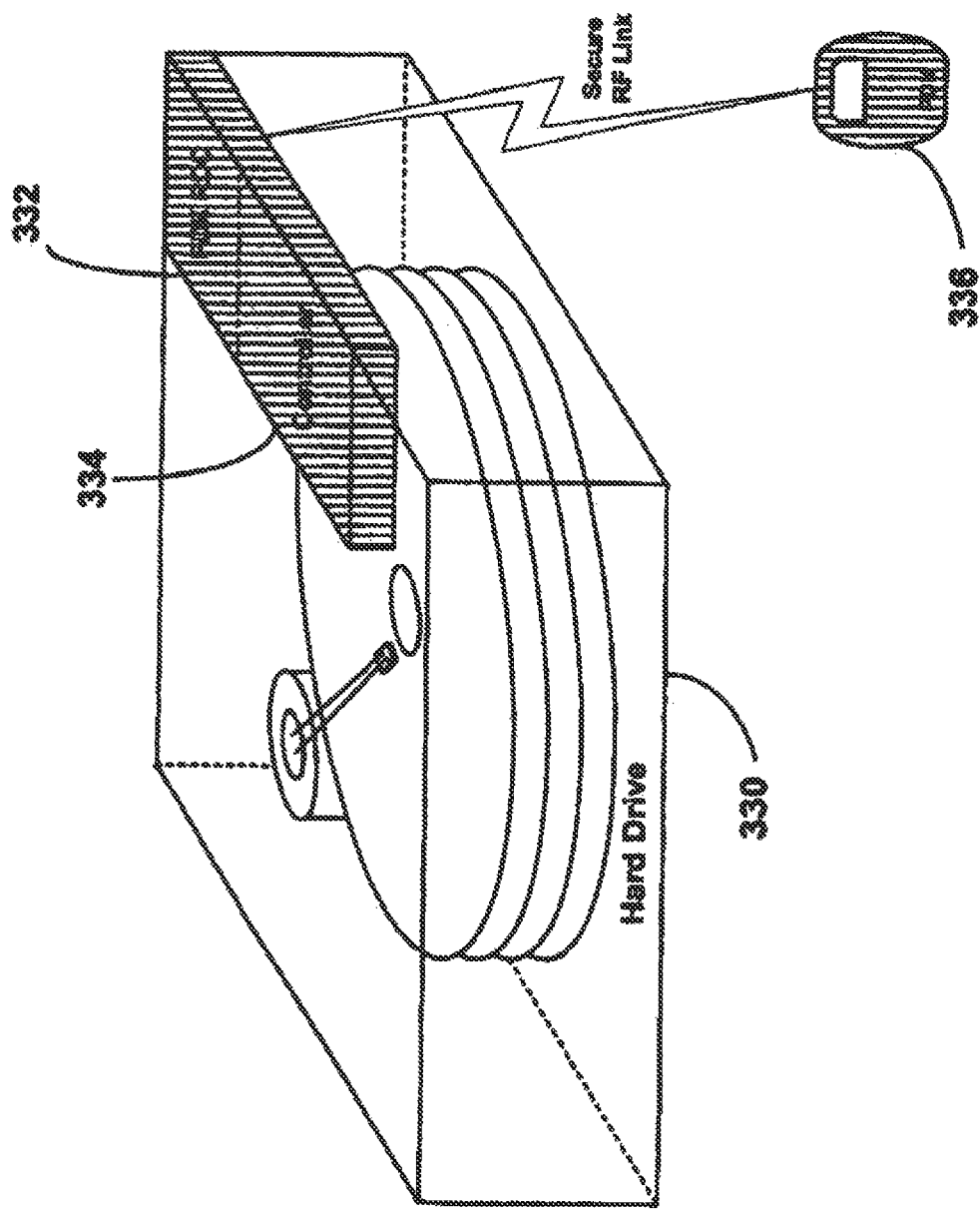
FIG. 12 is a block diagram for implementing Drive-Level protection and Sector-Level protection in connection with the computer hard drive.
Figure 13:
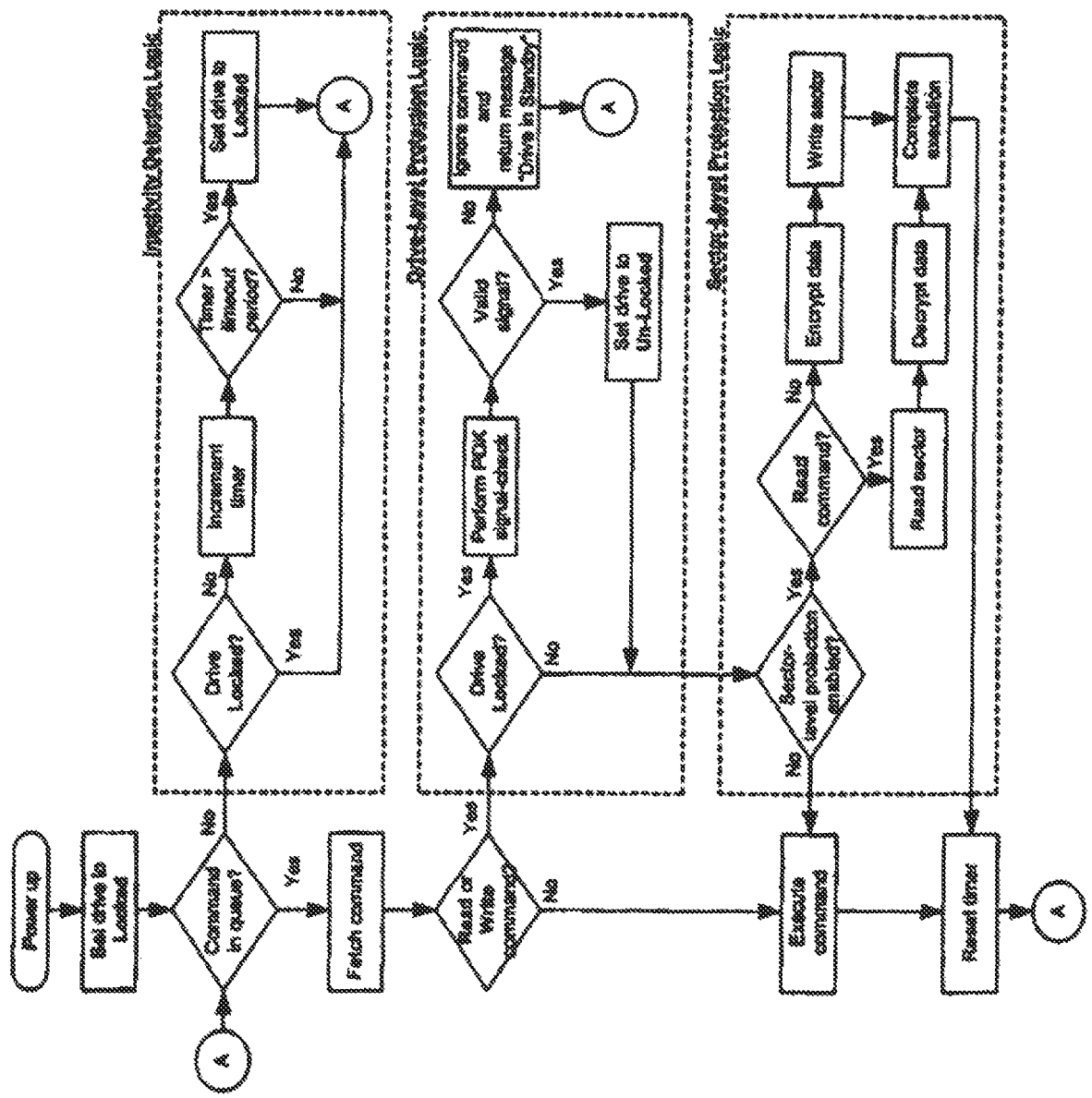
FIG. 13 is a flow chart of the logic executed by the PDK-RDC for implementing Drive-Level protection and Sector-Level protection.

Referring to FIGS. 12 and 13 for Drive-Level protection, when implemented, a PDK hard drive 330 will only function when the associated PDK-Key 336 is within range. The drive's controller 334 is disabled whenever the PDK-Key 336 is not present. The contents of files stored on the drive 330 are not encrypted. The Drive-Level protection feature is designed to protect the hard drive's owner by locking access to the PDK hard drive 330 whenever the associated PDK-Key 336 is not present (i.e. when the owner momentarily steps away from the computer, if the computer is stolen, etc.).

Referring to FIGS. 12 and 13 for Sector-Level protection, when enabled, every sector (or cluster of sectors) read or written is encrypted/decrypted by the RDC 332 using the drive's associated PDK-Key 336. Because the encryption is performed at Sector-Level as opposed to File-Level, the encoding can be accomplished without requiring any changes, involvement, or acknowledgement of the OS responsible for managing the drive. The Sector-Level protection feature is designed to further protect the hard drive's owner (beyond Drive-Level protection) by encrypting the contents of the files stored on the drive, without requiring any software modifications (OS, application, etc.). The security advantage is that if the drive access is in some way defeated, the contents of files on the drive are still protected. It should be noted that if users retrieve files from drive and purposely transfer them anywhere else (via email, memory sticks, etc.), the data will no longer be protected. Drive-Level protection and Sector-Level protection may be used individually or in combination. Also, as noted above, it should be understood that Sector-Level protection may be applied to individual data sectors or clusters of data sectors.

FIG. 13 illustrates the logic executed by the RDC 332 for implementing Drive-Level protection and Sector-Level protection. The logic ensures OS-level commands (save entire file, read entire file, etc.) are given adequate time to complete. This enables implementation of logic without requiring OS changes, involvement, or acknowledgement.

Figure 14:
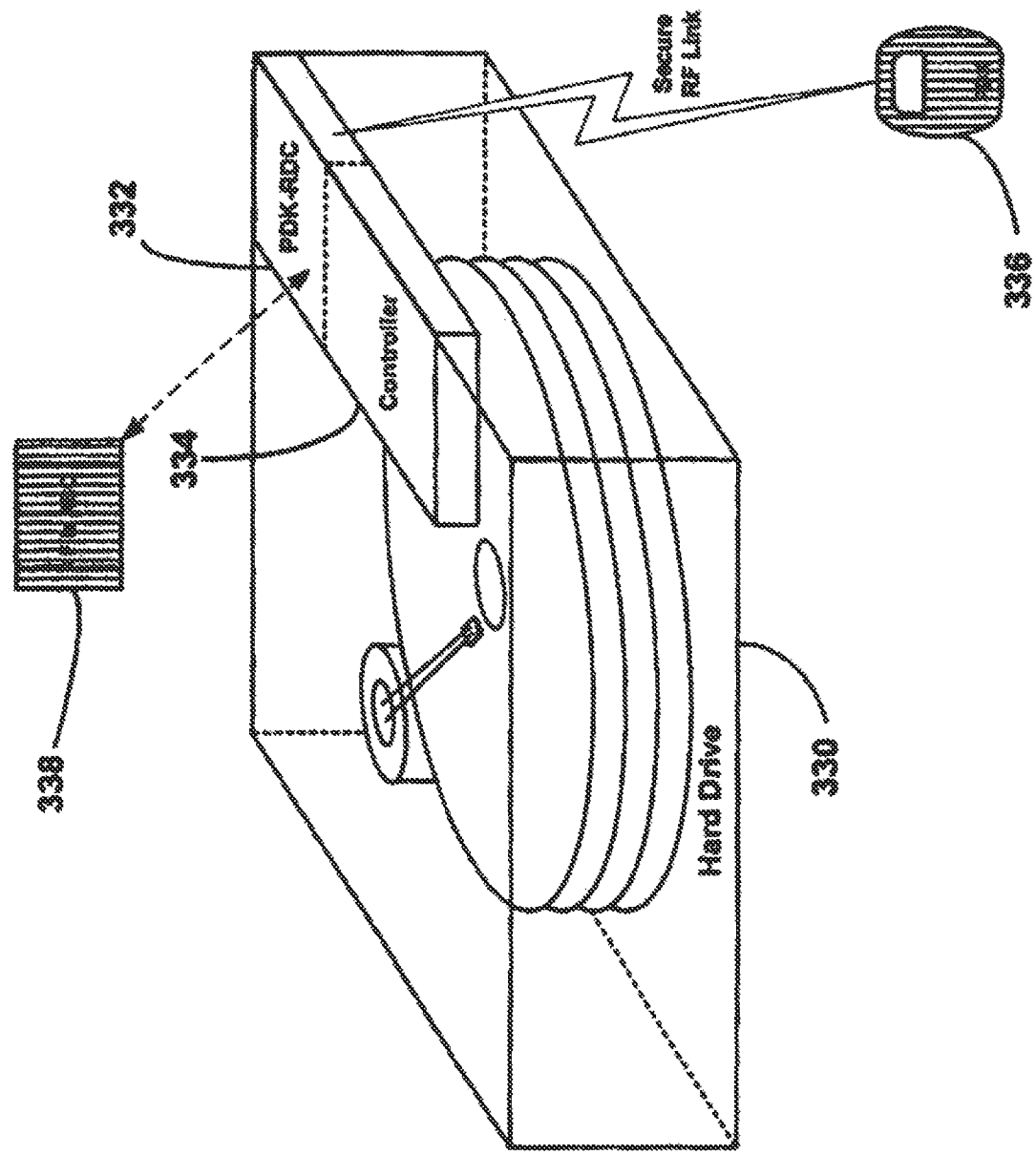
FIG. 14 is a block diagram for implementing File-Level protection in connection with the computer hard drive.

Referring to FIG. 14 for File-Level protection, implemented as an OS-level software driver utilizing the PDK-RDC 332 integrated in the PDK hard drive 330, File-Level protection provides standard PDK digital rights management services and functionality as described above. As needed, the driver instructs the RDC 332 to acquire PDK-Key information, validate the key-to-file match, and use the key's information to perform actual encryption/decryption of the file (as a whole, not at the sector level). In the illustrated example, the file ABC 338 (which can reside on any storage device, in memory, etc.) is compared to any PDK-Key 336 within range of the PDK-RDC 332. If a match is found, the PDK-RDC 332 will decrypt the file 338 for use with whatever playback mechanism placed the request. Any PDK-Key 336 can be utilized, not just the key 336 associated with the PDK hard drive 330. When employed for File-Level protection (and Network-Level protection as described below), the PDK-RDC 332 functions independently of the hard drive 330 in which it resides. While PDK-compliant files it encrypts or decrypts may reside on the resident hard drive 330 and may be associated with the drive's PDK-Key 336, they do not have to be. The PDK-RDC 332 can work with other PDK-Keys and files residing on other mediums. When used in this manner, the PDK-RDC 332 can be thought of as just coincidently residing within the hard drive 330. For File-Level and Network-Level protection, the RDC 332 may be implemented as a separate circuit board (not integrated within the hard drive 330) and still provide identical functionality.

The primary use of File-Level protection is to secure and protect private or copyrighted material from wrongful copying and distribution. Because copies of any PDK-compliant files can only be accessed when the associated PDK-Key is present, File-Level protection enables copies (intended for use by the holder of the associated key) to be produced effortlessly and securely. In addition to the distribution of copyrighted content such as music and movies as described above, software developers can distribute their software products via the Internet with the same ease and security. Software distributed in this manner would allow the legal recipient to make unlimited copies (for backup purposes, use on a home computer, etc.), yet the copies would only function when the associated key is present, preventing unauthorized copies from being wrongfully distributed and used.

The File-Level protection feature is designed to protect publishers of private or copyrighted material. Users can protect any file by converting it to PDK-compliant format; however, security of document files can be compromised by key holders not wishing to maintain the file's integrity. Because, while a Microsoft Word document (as an example) may be stored in the PDK-compliant protected format, once opened the contents could be cut and pasted into another application (e.g., an email program) thereby defeating the protection. Therefore the use of File-Level protection for use with documents is only applicable for entrusted recipients (individuals desiring to protect the content of which they are in possession). Non-document files, however, are not subject to these limitations.

Figure 15:
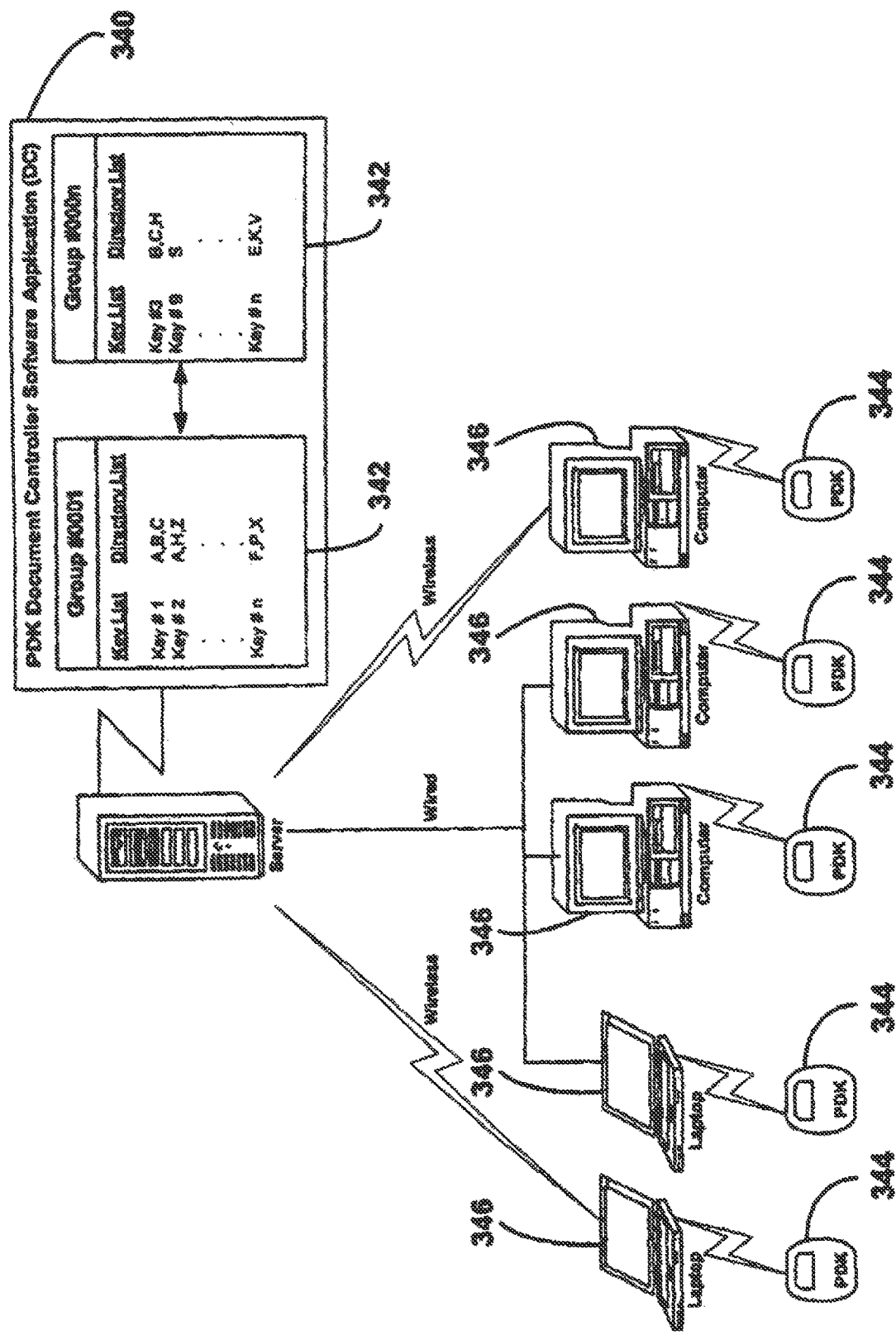
FIG. 15 is a block diagram for implementing Network-Level protection by expanding File-Level protection to a network environment.

Referring to FIG. 15 for Network-Level protection, File-Level Protection can be expanded to a network environment by employing a centralized software application/database called a PDK Document Controller (DC) 340 running on a server 342. A DC 340 enables the creation of Groups 342 that list which PDK-Keys 344 are allowed access to files in specific directories. All files stored in directories controlled by the DC 340 are automatically encrypted using the DC administrator's PDK-Key and thereby become PDK-compliant files. This process places all files stored in the DC 340 in a uniformly encrypted format.

Each user request for a file residing in a directory listed in a DC Group 342 results in the following steps. An RDC located in the requester's workstation 346 acquires information from the user's PDK-Key 344 and relays that information to the DC 340. The DC then enables appropriate access as defined by the DC's Group database information. Specifically, the DC 340 performing a lookup of the requester's PDK-Key 344 in the appropriate Group's tables. If the DC 340 determines that the PDK-Key 344 is listed in a Group 342 that also lists the directory containing the file the user wishes to access, the DC 340 knows that a valid PDK-Key 344 was used in the file request and grants access. The requested file is first decrypted with the administrator's PDK-Key, re-encrypted with the requester's PDK-Key 344, and then downloaded to the user's workstation 346. The foregoing process mirrors the process employed when using PDK to download digital media files from the Internet.

The Network-Level protection feature is designed to protect publishers of private or copyrighted material. Users can protect any file by converting it to PDK-compliant format; however, security of document files can be compromised by key holders not wishing to maintain the file's integrity. Because, while a Microsoft Word document (as an example) may be stored in the PDK-compliant protected format, once opened the contents could be cut and paste into another application (e.g., an email program) thereby defeating the protection. Therefore, the use of File-Level protection for use with documents is only applicable for entrusted recipients (individuals desiring to protect the content of which they are in possession). Non-document files, however, are not subject to these limitations. The system is well suited for establishing centralized databases of secure documents intended for distribution to entrusted recipients such as personnel in a law firm or medical facility.

While the present invention has been described with reference to one or more particular embodiments, those skilled in the art will recognize that many changes may be made thereto without departing from the spirit and scope of the present invention. A number of enhancements and variations can be implemented/utilized that effectively broaden the PDK technology's scope and utility. These enhancements and alternative embodiments are summarized below.

Integration of RDCs into Alternative Storage Devices. This embodiment involves integrating RDCs into alternative storage mechanisms beyond those of basic hard drives. These storage mechanisms include pure RAM/ROM-based storage commonly included/used in devices such as PDAs, cell phones, printer, copiers, faxes, scanners, MP3 players, GPS systems, digital cameras, computer motherboards, and DVR players, as well as portable storage devices such as Memory Sticks, Secure Digital memory cards, or any similar such product, in which case the RDC is either directly installed on the device, or integrated into the device in which the memory cards/sticks are inserted.

When an RDC is utilized in this manner, File-Level and Network-Level security function in the same manner as that described above for PDK hard drives. Drive-Level and Sector-Level security function in the same logical manner as that described for hard drives, but the physical implementation varies so as to control the bus structure that provides the communications path between the storage mechanisms and their hosting devices. As with PDK hard drives, access to the storage is enabled/disabled by interrupting the communications path, signaling to the hosting device that the storage is either "ready" or "busy," effectively enabling/disabling the device itself. To save batteries, RDCs used in this manner may only check for the presence of the associated PDK-Key on some periodic basis (versus every read or write sequence). And similar to PDK hard drives, Sector-Level security can be optionally utilized to encrypt/decrypt data traveling over the bus prior to writes and after reads to provide PDK's standard Sector-Level data encoding functionality.

As when utilized in PDK hard drives, the PDK's security features provide the same convenient, non-intrusive, wireless security mechanism for the above-defined devices. This security mechanism protects any data stored on such devices in the event they are ever stolen, left unattended, or even purposely "disabled" to prevent access to sensitive content (i.e. preventing minors from accessing adult files, websites, etc.). When the associated PDK-Key(s) is not present, these devices and their storage means are locked and disabled.

Dynamic PDK-Key Management. Utilizing dynamic PDK-Key management, PDK-Keys can be assigned to an RDC (whether integrated into a PDK hard drive or some other hosting device, or implemented independently) by a user (versus requiring such assignment at time of production). This capability is accomplished by including the required logic within the RDC's internal firmware (versus using an externally-based software driver to supply such capability).

Using this capability, a user can optionally assign any PDK-Key to act as the RDC's master key (the first key assigned to the device). Then by involving this master key (to prove the original "owner's" validation of the process), the user can assign (or remove) additional keys to the PDK-device. The general benefits of this feature include:

The ability for the individual possessing the master key to create backup keys (to be stored and later retrieved in the event the master is ever lost), and to allow other users (those possessing additional keys) to also access their PDK device(s).

The option to ship PDK-RDCs (in any configuration, host devices, etc.) without any PDK-Keys. And to allow such devices containing these RDCs (such as PDK hard drives) to optionally function with all or part of the PDK-technology never enabled or utilized. For instance, a user may elect to not enable Drive-Level and Sector-Level security features, but still utilize the functionalities of File-Level and Network-Level security.

Giving users the option to purchase and associate a PDK-Key at a later time, or importantly, assign a PDK-Key they already utilize for another PDK-based device. This allows a user to utilize a single PDK-Key to provide access to all their PDK-based devices. This built-in (firmware-based) PDK-Key configuration/ management capability greatly enhances PDK's overall flexibility and ease of setup/use.

Independent RDC configuration. While integrating an RDC into a hard drive offers numerous benefits, RDCs may exist separately from hard drive mechanisms. In this configuration (as previously defined) an RDC's physical circuitry may exist in the form of a PC Card, a PC expansion board that plugs into a standard PC expansion slot, a USB-based plug-in board, or any other similar design able to interface with a hosting device. Used in this manner, RDCs provide all previously defined functionalities with the exception of basic hard drive access-control.

Buffer Flush & Notification Software Driver. This enhancement involves using a simple software device driver to recognize when a PDK-Key is out of range (by "watching" for signals from the RDC), and when such a condition is detected to flush (empty) the host system's "read" buffer (effectively clearing any data the system may have been cached in internal memory in order to speed data access), and display a simple message indicating the PDK-Key is IO in/out of range. This optional mechanism can be utilized with any RDC configuration and on any PDK-protected device.

Each of these embodiments and obvious variations thereof is contemplated as falling within the spirit and scope of the claimed invention, which is set forth in the following claims.

The invention claimed is:

1. A system comprising:
a portable user device storing an activation code based on a user label and an account number, the portable user device including a first wireless transceiver to wirelessly transmit the activation code; and
a computing device including a second wireless transceiver with a wireless coverage range, the computing device comprising:
a processor; and
a memory including instructions, that when executed by the processor, cause the processor to:
receive the activation code wirelessly transmitted from the portable user device within the wireless coverage range;
receive, from a user of the portable user device, a request to purchase a product, the request including a selection of a payment method;
transmit the activation code and the request including the selection of the payment method to a trusted service provider for authentication; and
responsive to the trusted service provider authenticating the activation code and the request including the selection of the payment method, complete a purchase of the product using the payment method and receive the product encrypted with an encryption key, the product marked with an unlock code;
receive a subsequent activation code wirelessly transmitted from the portable user device within the wireless coverage range;
determine whether the subsequent activation code is associated with the unlock code;
responsive to determining that the subsequent activation code is associated with the unlock code, receive a decryption key wirelessly transmitted from the portable user device within the wireless coverage range; and
decrypting the product for access using the decryption key.

2. The system of claim 1, wherein the instructions when executed by the processor, further cause the processor to:

responsive to the trusted service provider failing to authenticate the activation code and the request including the selection of the payment method, reject the purchase of the product.

3. The system of claim 1, wherein the instructions when executed by the processor, further cause the processor to:
responsive to the purchase of the product, download the product marked with the unlock code and encrypted with the encryption key, the unlock code associated with the activation code.

4. The system of claim 3, wherein to download the product marked with the unlock code and encrypted with the encryption key, the instructions when executed by the processor, further cause the processor to:
transmit the activation code to a product provider service, the product provider service further transmitting the activation code to the trusted service provider for authentication; and
responsive to the trusted service provider authenticating the activation code, download the product marked with the unlock code associated with the activation code and encrypted with the encryption key from the product provider service.

5. The system of claim 4, wherein the activation code is the unlock code.

6. The system of claim 4, wherein the wireless coverage range is based on a wireless connection between the first wireless transceiver and the second wireless transceiver.

7. The system of claim 3, wherein the instructions when executed by the processor, further cause the processor to:
determine whether the portable user device is within the wireless coverage range of the computing device;
responsive to determining that the portable user device is within the wireless coverage range of the computing device, receive the subsequent activation code from the portable user device;
determine whether the user label in the subsequent activation code matches with that of the product;
responsive to the user label in the subsequent activation code matching with that of the product, receive the decryption key from the portable user device within the wireless coverage range, partially decrypt the product using the decryption key, and determine whether the account number in the subsequent activation code matches with that of the partially decrypted product; and
responsive to the account number in the subsequent activation code matching with that of the partially decrypted product, decrypt a remainder of the product for access.

8. The system of claim 1, wherein the user label is unencrypted and the account number is encrypted.

9. The system of claim 1, wherein the user label is used to select the portable user device from a plurality of portable user devices within the wireless coverage range of the computing device.

10. The system of claim 1, wherein the product is at least one of music, movies, software, or e-books.

11. A method comprising:
wirelessly receiving, from a portable user device in a wireless coverage range of a computing device, an activation code based on a user label and an account number, a first wireless transceiver of the portable user device wirelessly transmitting the activation code to a second wireless transceiver of the computing device in the wireless coverage range;
receiving, by the computing device, a request to purchase a product from a user of the portable user device, the request including a selection of a payment method;
transmitting, by the computing device, the activation code and the request including the selection of the payment method to a trusted service provider for authentication;
responsive to the trusted service provider authenticating the activation code and the request including the selection of the payment method, completing a purchase of the product using the payment method and receiving the product encrypted with an encryption key, the product marked with an unlock code;
wirelessly receiving, from the portable user device in the wireless coverage range of the computing device, a subsequent activation code;
determining whether the subsequent activation code is associated with the unlock code;
responsive to determining that the subsequent activation code is associated with the unlock code, wirelessly receiving, from the portable user device in the wireless coverage range of the computing device, a decryption key; and
decrypting the product for access using the decryption key.

12. The method of claim 11, further comprising:
responsive to the trusted service provider failing to authenticate the activation code and the request including the selection of the payment method, rejecting the purchase of the product.

13. The method of claim 11, further comprising:
responsive to the purchase of the product, downloading the product marked with the unlock code and encrypted with the encryption key, the unlock code associated with the activation code.

14. The method of claim 13, wherein downloading the product marked with the unlock code and encrypted with the encryption key comprises:
transmitting the activation code to a product provider service, the product provider service further transmitting the activation code to the trusted service provider for authentication; and
responsive to the trusted service provider authenticating the activation code, downloading the product marked with the unlock code associated with the activation code and encrypted with the encryption key from the product provider service.

15. The method of claim 14, wherein the activation code is the unlock code.

16. The method of claim 13, further comprising:
determining whether the portable user device is within the wireless coverage range of the computing device;
responsive to determining that the portable user device is within the wireless coverage range of the computing device, receiving the subsequent activation code from the portable user device;
determining whether the user label in the subsequent activation code matches with that of the product;
responsive to the user label in the subsequent activation code matching with that of the product, receiving the decryption key from the portable user device within the wireless coverage range, partially decrypting the product using the decryption key, and determining whether the account number in the subsequent activation code matches with that of the partially decrypted product; and responsive to the account number in the subsequent activation code matching with that of the partially decrypted product, decrypting a remainder of the product for access.

17. The method of claim 16, further comprising decrypting the product while the portable user device is within the wireless coverage range of the computing device to wirelessly communicate the subsequent activation code to the computing device, and wherein decryption is unavailable when the portable user device is no longer within the wireless coverage range of the computing device to wirelessly communicate the subsequent activation code to the computing device.

18. The method of claim 11, wherein the wireless coverage range is based on a wireless connection between the portable user device and the computing device.

19. The method of claim 11, wherein the user label is unencrypted and the account number is encrypted.

20. The method of claim 11, wherein the product is at least one of music, movies, software, or e-books.

\* \* \* \* \*